US010559172B1

(12) United States Patent
Lemberger et al.

(10) Patent No.: US 10,559,172 B1
(45) Date of Patent: *Feb. 11, 2020

(54) CUSTOMIZED NOTIFICATIONS BASED ON DEVICE CHARACTERISTICS

(71) Applicant: Amazon Technologies, Inc., Seattle, WA (US)

(72) Inventors: Elliott Lemberger, Santa Monica, CA (US); John Modestine, Los Angeles, CA (US); Sang Min Park, Los Angeles, CA (US); Juan Gabriel Aliotta, Buenos Aires (AR); Julio Andres Carrettoni, Buenos Aires (AR); George Alexander Oliver Cochrane, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/533,341

(22) Filed: Aug. 6, 2019

Related U.S. Application Data

(63) Continuation of application No. 16/104,359, filed on Aug. 17, 2018.

(51) Int. Cl.
B60Q 9/00 (2006.01)
G08B 3/10 (2006.01)
G08B 13/00 (2006.01)

(52) U.S. Cl.
CPC .............. G08B 3/10 (2013.01); G08B 13/00 (2013.01)

(58) Field of Classification Search
CPC ................................ G08B 3/10; G08B 13/00
See application file for complete search history.

(56) References Cited

U.S. PATENT DOCUMENTS

| 4,764,953 | A | 8/1988 | Chern et al. |
| 5,428,388 | A | 6/1995 | von Bauer et al. |
| 5,760,848 | A | 6/1998 | Cho |
| 6,072,402 | A | 6/2000 | Kniffin et al. |
| 6,192,257 | B1 | 2/2001 | Ray |
| 6,271,752 | B1 | 8/2001 | Vaios |

(Continued)

FOREIGN PATENT DOCUMENTS

| CN | 2585521 | 11/2003 |
| CN | 2792061 | 6/2006 |

(Continued)

Primary Examiner — Munear T Akki
(74) Attorney, Agent, or Firm — Lee & Hayes, P.C.

(57) ABSTRACT

The application describes customized notifications based at least in part on device characteristics. For example, a client device may identify information for populating an audio tone list associated with an electronic device, wherein the information includes a type of electronic device, a name of the electronic device; and/or a setting of the electronic device. The client device may then display audio tones that are based at least in part on the information. While displaying the audio tones, the client device may receive input selecting at least one of the audio tones to be associated with the electronic device. The client device may then receive a message indicating that the electronic device detected an object. Based at least in part on the message, the client device may output sound represented by an audio tone of the at least one audio tone.

20 Claims, 23 Drawing Sheets

(56) References Cited

U.S. PATENT DOCUMENTS

| | | |
|---|---|---|
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2005/0258938 A1* | 11/2005 | Moulson ............... H04M 1/575 340/7.58 |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2010/0225455 A1 | 9/2010 | Claiborne et al. |
| 2013/0057695 A1 | 3/2013 | Huisking |
| 2014/0267716 A1 | 9/2014 | Child et al. |
| 2015/0035987 A1 | 2/2015 | Fernandez |
| 2015/0054652 A1* | 2/2015 | Crochet ................... G08B 5/36 340/815.4 |
| 2015/0163463 A1 | 6/2015 | Hwang et al. |
| 2017/0153607 A1* | 6/2017 | Li ........................ G04G 13/026 |
| 2017/0291543 A1* | 10/2017 | Goldman-Shenhar ... B60Q 9/00 |
| 2019/0035242 A1* | 1/2019 | Vazirani ................ G08B 7/066 |

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |

* cited by examiner

1200

```
┌─────────────────────────────────────────────────────┐
│ RECEIVE A FIRST INPUT REPRESENTATIVE OF A FIRST     │
│ SELECTION OF AN ELECTRONIC DEVICE                   │
│ B1202                                               │
└─────────────────────────────────────────────────────┘
                          │
                          ▼
┌─────────────────────────────────────────────────────┐
│ IDENTIFY INFORMATION ASSOCIATED WITH THE ELECTRONIC │
│ DEVICE                                              │
│ B1204                                               │
└─────────────────────────────────────────────────────┘
                          │
                          ▼
┌─────────────────────────────────────────────────────┐
│ DETERMINE A SUBSET OF AUDIO TONES                   │
│ B1206                                               │
└─────────────────────────────────────────────────────┘
                          │
                          ▼
┌─────────────────────────────────────────────────────┐
│ GENERATE A LIST USING THE SUBSET OF AUDIO TONES     │
│ B1208                                               │
└─────────────────────────────────────────────────────┘
                          │
                          ▼
┌─────────────────────────────────────────────────────┐
│ DISPLAY A GRAPHICAL USER INTERFACE THAT INCLUDES AT │
│ LEAST A PORTION OF THE LIST                         │
│ B1210                                               │
└─────────────────────────────────────────────────────┘
                          │
                          ▼
┌─────────────────────────────────────────────────────┐
│ RECEIVE A SECOND INPUT REPRESENTATIVE OF A SECOND   │
│ SELECTION OF AT LEAST ONE AUDIO TONE FROM THE LIST  │
│ B1212                                               │
└─────────────────────────────────────────────────────┘
                          │
                          ▼
┌─────────────────────────────────────────────────────┐
│ ASSOCIATE THE AT LEAST ONE AUDIO TONE WITH THE      │
│ ELECTRONIC DEVICE                                   │
│ B1214                                               │
└─────────────────────────────────────────────────────┘
                          │
                          ▼
                       ( 12B )
```

DETERMINE A TYPE OF AN ELECTRONIC DEVICE
B1302

DETERMINE A NAME OF THE ELECTRONIC DEVICE
B1304

DETERMINE A SETTING ASSOCIATED WITH THE ELECTRONIC DEVICE
B1306

OBTAIN AUDIO TONES BASED AT LEAST IN PART ON AT LEAST ONE OF THE TYPE, THE NAME, OR THE SETTING
B1308

GENERATE A LIST THAT INCLUDES THE AUDIO TONES
B1310

DISPLAY AT LEAST A PORTION OF THE LIST
B1312

RECEIVE AN INPUT SELECTING AN AUDIO TONE FROM THE LIST
B1314

ASSOCIATE THE SELECTED AUDIO TONE WITH AT LEAST ONE OF THE ELECTRONIC DEVICE OR THE SETTING
B1316

```
┌─────────────────────────────────────────────────────────────┐
│ RECEIVE, FROM A CLIENT DEVICE, FIRST DATA REPRESENTING A    │
│                  REQUEST FOR AUDIO TONES                    │
│                          B1402                              │
└─────────────────────────────────────────────────────────────┘
                              │
                              ▼
┌─────────────────────────────────────────────────────────────┐
│   DETERMINE INFORMATION ASSOCIATED WITH AN ELECTRONIC DEVICE│
│                          B1404                              │
└─────────────────────────────────────────────────────────────┘
                              │
                              ▼
┌─────────────────────────────────────────────────────────────┐
│ SELECT AT LEAST A FIRST AUDIO TONE AND A SECOND AUDIO TONE  │
│    BASED AT LEAST IN PART ON THE DETERMINED INFORMATION     │
│                          B1406                              │
└─────────────────────────────────────────────────────────────┘
                              │
                              ▼
┌─────────────────────────────────────────────────────────────┐
│  GENERATE A LIST USING THE FIRST AUDIO TONE AND THE SECOND  │
│                        AUDIO TONE                           │
│                          B1408                              │
└─────────────────────────────────────────────────────────────┘
                              │
                              ▼
┌─────────────────────────────────────────────────────────────┐
│  TRANSMIT, TO THE CLIENT DEVICE, SECOND DATA REPRESENTING   │
│                         THE LIST                            │
│                          B1410                              │
└─────────────────────────────────────────────────────────────┘
                              │
                              ▼
┌─────────────────────────────────────────────────────────────┐
│ RECEIVE, FROM THE CLIENT DEVICE, THIRD DATA REPRESENTING A  │
│             SELECTION OF THE FIRST AUDIO TONE               │
│                          B1412                              │
└─────────────────────────────────────────────────────────────┘
                              │
                              ▼
┌─────────────────────────────────────────────────────────────┐
│  TRANSMIT FOURTH DATA REPRESENTING THE FIRST AUDIO TONE TO  │
│                    AT LEAST ONE DEVICE                      │
│                          B1414                              │
└─────────────────────────────────────────────────────────────┘
                              │
                              ▼
                           ( 14B )
```

```
        ┌─────┐
        │ 14A │
        └──┬──┘
           ▼
┌──────────────────────────────────────────────────┐
│ RECEIVE FIFTH DATA INDICATING THAT THE ELECTRONIC│
│              DEVICE HAS DETECTED AN OBJECT       │
│                       B1416                      │
└──────────────────────┬───────────────────────────┘
                       ▼
┌──────────────────────────────────────────────────┐
│ TRANSMIT SIXTH DATA TO THE AT LEAST ONE DEVICE   │
│ THAT CAUSES THE AT LEAST ONE DEVICE TO OUTPUT    │
│              THE FIRST AUDIO TONE                │
│                       B1418                      │
└──────────────────────────────────────────────────┘
```

```
        ┌─────┐
        │ 15A │
        └──┬──┘
           ▼
┌──────────────────────────────────────────────────┐
│ DETERMINE THAT THE CRITERION IS SATISFIED BASED  │
│           AT LEAST IN PART ON THE THIRD DATA     │
│                      B1516                       │
└──────────────────────┬───────────────────────────┘
                       ▼
┌──────────────────────────────────────────────────┐
│ TRANSMIT FOURTH DATA THAT CAUSES THE CLIENT      │
│         DEVICE TO OUTPUT THE FIRST AUDIO TONE    │
│                      B1518                       │
└──────────────────────────────────────────────────┘
```

CUSTOMIZED NOTIFICATIONS BASED ON DEVICE CHARACTERISTICS

RELATED APPLICATION

This application claims priority to, and is a continuation of, U.S. patent application Ser. No. 16/104,359, filed on Aug. 17, 2018, the entire contents of which are incorporated herein by reference.

BACKGROUND

Home security is a concern for many homeowners and renters. Those seeking to protect or monitor their homes often wish to have video and audio communications with visitors, for example, those visiting an external door or entryway. A/V recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Additionally, the presence of one or more A/V recording and communication devices on the exterior of a home, such as a doorbell unit at the entrance to the home, acts as a powerful deterrent against would-be burglars. Furthermore, the occupant(s) of the home may receive notifications from the A/V recording and communications devices when the would-be burglars are near the home. Based at least in part on the notifications, the homeowner or renter may take responsive actions to deter the would-be burglars from entering the home.

BRIEF DESCRIPTION OF THE DRAWINGS

The various embodiments of the present disclosure are directed to customized notifications based at least in part on device characteristics, which will now be discussed in detail with an emphasis on highlighting the advantageous features. These embodiments depict the novel and non-obvious embodiments of customized notifications based at least in part on device characteristics, as shown in the accompanying drawings, which are for illustrative purposes only. These drawings include the following figures, in which like numerals indicate like parts:

FIG. 12A-12B are a flowchart illustrating an example embodiment of a process for associating an audio tone with an electronic device and then outputting the audio tone based at least in part on an object being detected by the electronic device, according to various aspects of the present disclosure;

FIG. 13 is a flowchart illustrating an example embodiment of a process for associating an audio tone with an electronic device, according to various aspects of the present disclosure;

FIGS. 14A-14B are a flowchart illustrating one example embodiment of a process for network device(s) associating an audio tone with an electronic device and then causing a client device to output the audio tone, according to various aspects of the present disclosure;

FIGS. 15A-15B are a flowchart of another example embodiment of a process for network device(s) associating an audio tone with an electronic device and then causing a client device to output the audio tone, according to various aspects of the present disclosure;

DETAILED DESCRIPTION

Figure 1A:
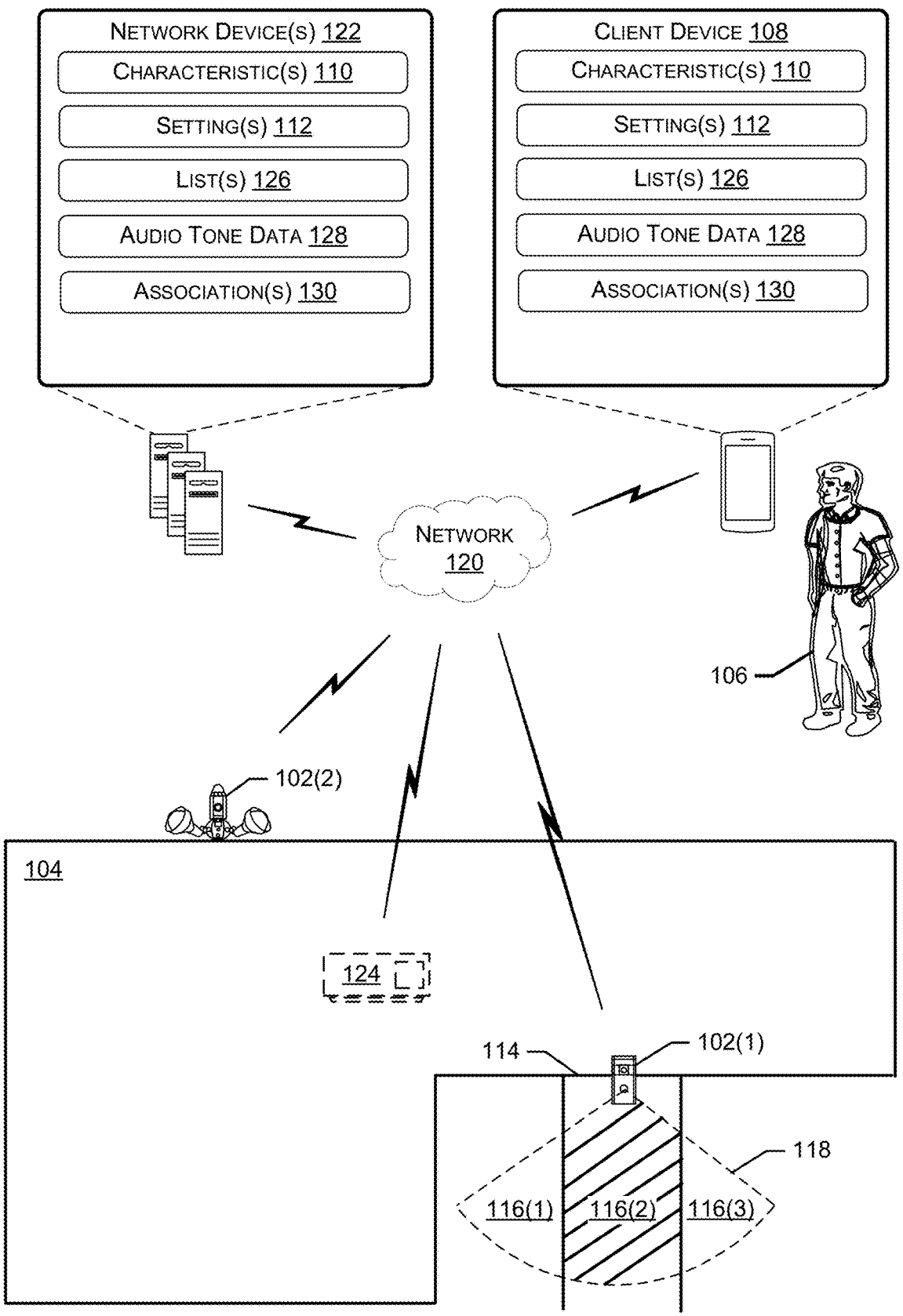
FIGS. 1A-1B are schematic diagrams illustrating examples of associating A/V devices located at a property with audio tones, and then using the audio tones to notify a user of an event occurring at the property, according to various aspects of the present disclosure.

The present disclosure describes, in part, a system for customizing notifications based at least in part on device characteristics and/or settings. For example, a user may install one or more A/V devices at the user's property, such as the user's home. While installing an A/V device (referred to, in this example, as a "first A/V device"), the user may select one or more audio tones to be associated with the first A/V device. For example, such as during a configuration process, a client device associated with the user may receive input indicating information associated with the first A/V device. The information may include, but is not limited to, characteristic(s) associated with the first A/V device and/or setting(s) associated with the first A/V device. The characteristic(s) may include, but are not limited to, a location of the first A/V device, a type of the first A/V device, a name associated with the first A/V device, and/or the like. The setting(s) may include, but are not limited to, types of objects that the first A/V device is configured to monitor, motion zone(s) that the first A/V device is configured to monitor, whether the A/V device is configured to detect objects based at least in part on motion and/or receiving input (e.g., if the first A/V device is an A/V doorbell), time(s) of the day during which the first A/V device is configured to monitor, and/or the like.

The client device and/or network device(s) (e.g., backend server(s), a hub device, a virtual assistant (VA) device, etc.) may then use the information to generate a list of audio tones for the first A/V device. For example, the client device and/or the network device(s) may store audio data (e.g., also referred to as "audio tone data") representing audio tones (e.g., a set of audio tones), such is within a database. The client device and/or the network device(s) may then analyze the audio data to identify one or more audio tones that are related to the information. For a first example, the client device and/or the network device(s) may identify at least one audio tone (referred to, in this example, as a "first audio tone") that is associated with the location of the first A/V device. For instance, if the first A/V device is located at a back of the property, such that the first A/V device monitors the backyard, the first audio tone may include sound (e.g., one or more words) indicating that motion was detected in the backyard.

For a second example, the client device and/or the network device(s) may identify at least one audio tone (referred to, in this example, as a "second audio tone") that is associated with the name of the first A/V device. For instance, if the first A/V device is named "backyard camera," the second audio tone may include sound (e.g., one or more words) indicating that motion was detected by the backyard camera. For a third example, the client device and/or the network device(s) may identify at least one audio tone (referred to, in this example, as a "third audio tone") that is associated with the type of the first A/V device. For instance, if the first A/V device is an A/V doorbell, the third audio tone may include sound (e.g., one or more words) indicating that motion was detected by the A/V doorbell.

For a fourth example, the client device and/or the network device(s) may identify at least one audio tone (referred to, in this example, as a "fourth audio tone") that is associated with the types of objects that the first A/V device is configured to monitor. For instance, if the first A/V device is configured to monitor for motion of people (e.g., not other objects, such as animals), the fourth audio tone may include sound (e.g., one or more words) indicating that the first A/V device has detected motion of a person. For a fifth example, the client device and/or the network device(s) may identify at least one audio tone (referred to, in this example, as a "fifth audio tone") that is associated with the motion zone(s) that the first A/V device is configured to monitor. For instance, if the first A/V device is configured to monitor a motion zone that includes the front porch of the property, the fifth audio tone may include sound (e.g., one or more words) indicating that motion was detected at the front porch of the property.

After generating the list of audio tones, the client device may display at least a portion of the list of audio tones for the user. The client device may then receive input selecting at least one audio tone(s), from the list of audio tones, to be associated with the first A/V device. Additionally, the client device may receive input associating at least one of the selected audio tone(s) with the setting(s) of the first A/V device. For a first example, the input may indicate that a selected audio tone is to be associated with a first motion zone and another selected audio tone is to be associated with a second motion zone. For a second example, the input may indicate that a selected audio tone is to be associated with a first type of object (e.g., people) detected by the first A/V device and another selected audio tone is to be associated with a second type of object (e.g., animals) detected by the first A/V device. For a third example, the input may indicate that a selected audio tone is to be associated with the first A/V device detecting motion and another selected audio tone is be associated with the first A/V device receiving input (e.g., a button press when the first A/V device is an A/V doorbell). The client device and/or the network device(s) may then store data associated the selected audio tone(s) with the first A/V device and/or the setting(s) of the first A/V device.

In some examples, the client device and/or the network device(s) may perform similar techniques and/or processes to associate additional audio tones with one or more additional A/V devices and/or setting(s) of the one or more additional A/V devices. For example, the client device and/or the network device(s) may perform similar techniques and/or processes to associate audio tone(s) with a second A/V device located on the property and/or setting(s) of the second A/V device, associate audio tone(s) with a third A/V device located on the property and/or setting(s) of the third A/V device, and so forth. The client device and/or the network device(s) may then use the associations to notify the user that the A/V devices have detected an object.

For a first example, the client device may receive, from the first A/V device (which may be via the network device(s)), data indicating that the first A/V device detected an object (and/or motion). Based at least in part on the data, the client device may determine that the first A/V device is associated with an audio tone (e.g., the first audio tone, the second audio tone, the third audio tone, etc.). The client device may then output the audio tone using one or more speaker(s). For a second example, the client device may receive, from the first A/V device (which may be via the network device(s)), data indicating that the first A/V device detected motion within a first motion zone. Based at least in part on the data, the client device may determine that the first motion zone is associated with an audio tone (e.g., the fifth audio tone). The client device may then output the audio tone using the speaker(s). For a third example, the client device may receive, from the first A/V device (which may be via the network device(s)), data indicating that the first A/V device received an input via a button. Based at least in part on the data, the client device may determine that the first A/V device receiving input via the button is associated with an audio tone (e.g., the fourth audio tone). The client device may then output the audio tone using the speaker(s).

Additionally, the network device(s) may perform similar techniques and/or processes as the client device. For example, the network device(s) may receive, from the first A/V device, data indicating that the first A/V device detected an object (and/or motion). Based at least in part on the data, the network device(s) may determine that the first A/V device is associated with an audio tone (e.g., the first audio tone, the second audio tone, the third audio tone, etc.). The network device(s) may then transmit, to the client device, data that is configured to cause the client device to output the audio tone. In some examples, the data may include audio data representing the audio tone. In some examples, such as when the client device already stores the audio data representing the audio tone, the data may include a message indicating that the client device is to output the audio tone.

In some examples, the client device and/or the network device(s) may further cause one or more other electronic devices to notify the user. The one or more other electronic devices may include, but are not limited to, a hub device, a VA device, an A/V device (e.g., the first A/V device, the second A/V device, etc.), a device with a display (e.g., a television), a device that controls light emitters (e.g., a transformer), light emitters, and/or the like. For a first example, the client device and/or the network device(s) may receive, from the first A/V device, data indicating that the first A/V device detected an object (and/or motion). Based at least in part on the data, the client device and/or the network device(s) may determine that the first A/V device is associated with an audio tone. The client device and/or the network device(s) then may transmit, to an electronic device, data that is configured to cause the electronic device to output the audio tone. In some examples, the data may include audio data representing the audio tone. In some examples, such as when the electronic device already stores the audio data representing the audio tone, the data may include a message indicating that the electronic device is to output the audio tone. In either of the examples, the electronic device may receive the data and, in response, output the audio tone using the speaker(s).

For a second example, the client device and/or the network device(s) may again receive, from the first A/V device, data indicating that the first A/V device detected an object (and/or motion). Based at least in part on the data, the client device and/or the network device(s) may determine that the first A/V device is associated with an audio tone, where the audio tone indicates that the first A/V device detected motion. The client device and/or the network device(s) then may transmit, to an electronic device, data that is configured to cause the electronic device to display content indicating that the first A/V device detected the motion. In some examples, the data may include image data representing the content. In some examples, such as when the electronic device already stores the image data representing the content, the data may include a message indicating that the electronic device is to display the content. In either of the examples, the electronic device may receive the data and, in response, display the content.

Although the above describes associating audio tones with A/V devices, in other examples the techniques and/or processes may be used to associate audio tones with other types of devices. For example, the techniques and/or processes may be used to associate audio tones with sensors, automation devices, hub devices, VA devices, light emitters, and/or any other type of electronic device that may detect an object through motion and/or receiving input. As such, in such examples, each time a device detects an object, the client device (and/or the one or more other electronic devices) may provide a notification to the user such that the user may easily determine which device detected the object.

As described herein, an audio tone may include any type of sound that may be output by an electronic device, such as by using speakers. In some examples, an audio tone (may also be referred to as an audio output) may include one or more words indicating that an event is occurring. For a first example, if an audio tone is associated with an A/V device, the audio tone may include one or more words such as "the A/V device has detected motion." For a second example, if an audio tone is associated with a setting of an A/V device, such as the A/V device detecting people, the audio tone may include one or more words such as "the A/V device has detected a person." Still further, for a third example, and again if an audio tone is associated with a setting of an A/V device, such as the A/V device receiving input to a button, the audio tone may include one or more words such as "the A/V device has received an input to the button." Additionally, or alternatively, in some examples, an audio tone may include sound that represents that an event is occurring. For example, if an audio tone is associated with an A/V device, the audio tone may include sound that the user associates with the A/V device detecting motion.

In some examples, one or more audio tones may be associated with a language that a user speaks. For example, the network device(s) and/or the client device may receive data indicating the language that user speaks. In some examples, the user may input the language into the client device, which may then transmit the data indicating the language to the network device(s). The network device(s) and/or the client device may then select audio tone(s), using the processes described above, which are further associated with the language. For example, if the user speaks Spanish, then the network device(s) and/or the client device may select audio tone(s) that include one or more words spoken in Spanish. For another example, if the user speaks French, then the network device(s) and/or the client device may select audio tone(s) that include one or more words spoken in French.

The remaining detailed description describes the present embodiments with reference to the drawings. In the drawings, reference numbers label elements of the present embodiments. These reference numbers are reproduced below in connection with the discussion of the corresponding drawing features.

Figure 1B:
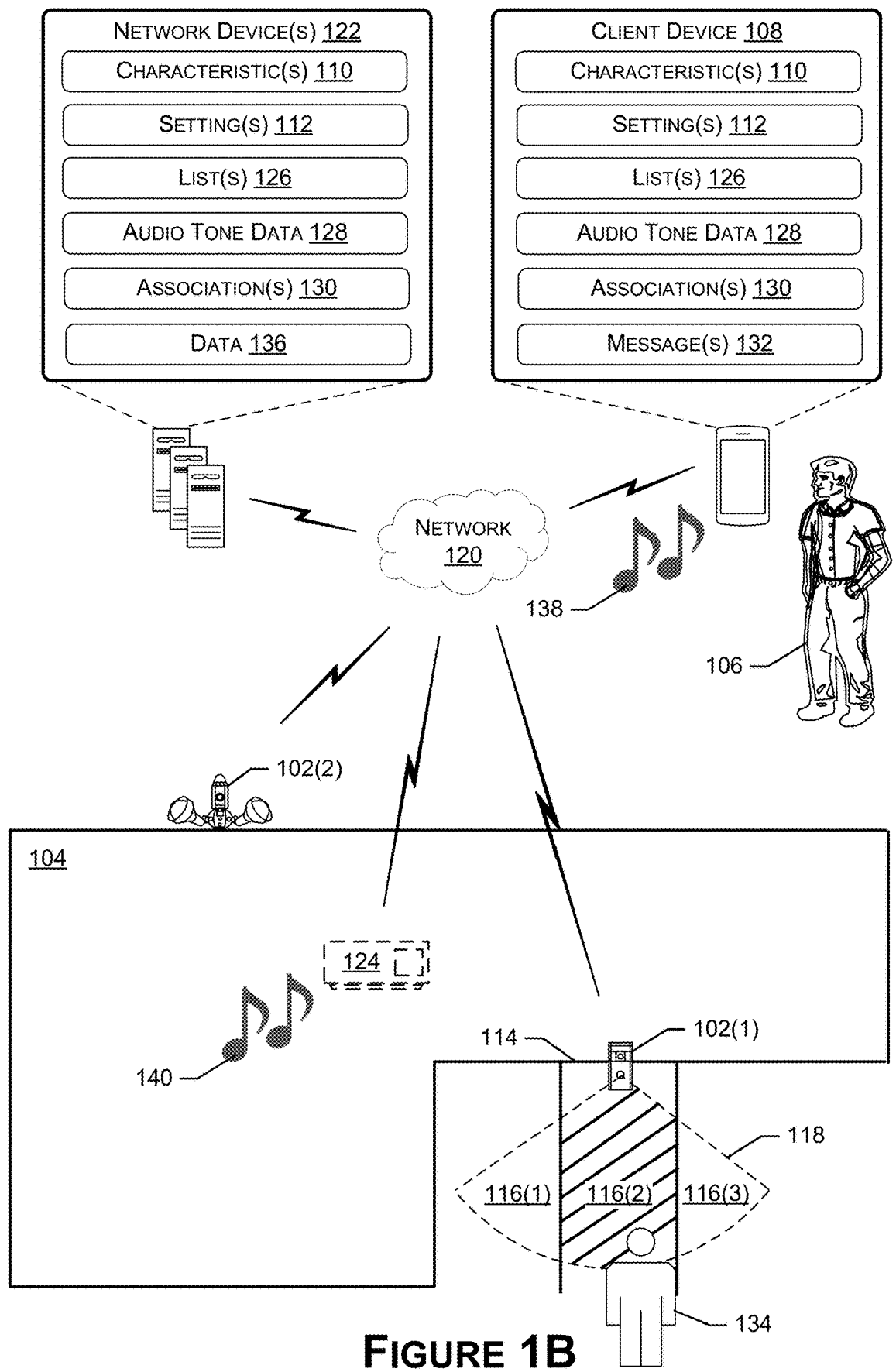

FIGS. 1A-1B illustrate examples of associating A/V devices 102(1)-(2) located at a property 104 with audio tones, and then using the audio tones to notify a user 106 of an event occurring at the property 104, according to various aspects of the present disclosure. For example, while installing the first A/V device 102(1) at the property 104, the user 106 may select one or more of the audio tones to be associated with the first A/V device 102(1). For example, such as during a configuration process, a client device 108 associated with the user 106 (and/or associated with the first A/V device 102(1)) may receive input indicating information associated with the first A/V device 102(1). The information may include, but is not limited to, characteristic(s) 110 associated with the first A/V device 102(1) and/or setting(s) 112 associated with the first A/V device 102(1). For example, the characteristic(s) 110 for the first A/V device 102(1) may indicate that the first A/V device 102(1) is located at a front entrance 114 of the property 104 (e.g., the location of the first A/V device 102(1)), that the first A/V device 102(1) is an A/V doorbell (e.g., the type of the first A/V device 102(1)), and/or that the first A/V device 102(1) is called "Primary Device" (e.g., the name of the first A/V device 102(1)). Additionally, the setting(s) 112 for the first A/V device 102(1) may indicate that the first A/V device 102(1) is configured to monitor for people (e.g., a type of object), that the first A/V device 102(1) is configured to monitor a second motion zone 116(2) (from the first, second, and third motion zones 116(1)-(3)) of the field of view 118 of the first A/V device 102(1), which includes the front path to the front entrance 114 (where the second motion zone 116(2) is indicated by the diagonal lines), and/or that the first A/V device 102(1) is configured to detect objects based at least in part on both detecting motion and receiving input.

In some examples, the client device 108 may then transmit, over the network 120, data representing the information (e.g., the characteristic(s) 110 and/or the setting(s) 112) to at least one network device(s) 122 (and/or similarly, in some examples, a hub device 124). The client device 108 and/or the network device(s) 122 may then use the information to identify audio tones to be included in a list 126 of audio tones. For example, the client device 108 and/or the network device(s) 122 may store data (e.g., the audio tone data 128) representing a set of audio tones, such is within a database. The client device 108 and/or the network device(s) 122 may then analyze the audio tone data 128 to identify one or more audio tones that are related to the information. For a first example, the client device 108 and/or the network device(s) 122 may identify at least a first audio tone that is associated with A/V devices that are located at front entrances of properties (e.g., associated with the location of the first A/V device 102(1)). For instance, the first audio tone may include sound (e.g., one or more words) indicating that an object (and/or motion) was detected at the front entrance 114 of the property 104.

For a second example, the client device 108 and/or the network device(s) 122 may identify at least a second audio tone that is associated with a "Primary Device" (e.g., the name of the first A/V device 102(1)). For instance, the second audio tone may include sound (e.g., one or more words) indicating that an object (and/or motion) was detected by the Primary Device. For a third example, the client device 108 and/or the network device(s) 122 may identify at least a third audio tone that is associated with A/V doorbells (e.g., the type of the first A/V device 102(1)). For instance, the third audio tone may include sound (e.g., one or more words) indicating that an object (and/or motion) was detected by the A/V doorbell.

For a fourth example, the client device 108 and/or the network device(s) 122 may identify at least a fourth audio tone that is associated with A/V devices detecting people (e.g., the types of objects that the first A/V device 102(1) is configured to monitor). For instance, the fourth audio tone may include sound (e.g., one or more words) indicating that the first A/V device 102(1) has detected motion of a person. For a fifth example, the client device 108 and/or the network device(s) 122 may identify at least a fifth audio tone that is associated with motion zones that includes front paths of properties (e.g., the second motion zone 116(2) that the first A/V device 102(1) is configured to monitor). For instance, the fifth audio tone may include sound (e.g., one or more words) indicating that an object (and/or motion) was detected at the front porch of the property 104. Still further, for a sixth example, the client device 108 and/or the network device(s) 122 may identify at least a sixth audio tone that is associated with A/V devices that receive inputs via buttons. For instance, the sixth audio tone may include sound (e.g., one or more words) indicating that input was received via the button.

After identifying the audio tones, the client device 108 and/or the network device(s) 122 may generate the list 126 to include the audio tones. In some examples, the network device(s) 122 may then transmit, over the network 120, data representing the list 126 to the client device 108. The client device 108 may display at least a portion of the list 126 to the user 106. The client device 108 may then receive input selecting audio tone(s), from the list 126, to be associated with the first A/V device 102(1). Additionally, the client device 108 may receive input associating at least one of the selected audio tone(s) with the setting(s) 112 of the first A/V device 102(1). For a first example, the input may indicate that the fifth audio tone is to be associated with the second motion zone 116(2). For a second example, the input may indicate that the fourth audio tone is to be associated with the first A/V device 102(1) detecting people. For a third example, the input may indicate that the sixth audio tone is to be associated with the first A/V device 102(1) receiving input via the button. The client device may then store data that indicates association(s) 130 between the selected audio tone(s) and the first A/V device 102(1) and/or the setting(s) 112. Additionally, in some examples, the client device 108 may transmit, over the network 120, data that indicates the selections by the user 106 and/or data that indicates the association(s) 130 to the network device(s) 122.

In some examples, the client device 108 and/or the network device(s) 122 may perform similar techniques and/or processes to create association(s) 130 between additional audio tone(s) and the second A/V device 102(2) and/or setting(s) 112 associated with the second A/V device 102(2). The client device 108 and/or the network device(s) 122 may then use the association(s) 130 to notify the user 106 that the A/V devices 102(1)-(2) have detected an object.

For a first example, and as illustrated in FIG. 1B, the client device 108 may receive, from the network device(s) 122 and over the network 120, a message 132 indicating that the first A/V device 102(1) detected motion of an object 134. Based at least in part on the message 132, the client device 108 may determine that there is an association 130 between the first A/V device 102(1) and an audio tone (e.g., the first audio tone, the second audio tone, and/or the third audio tone). The client device 108 may then output the audio tone using speaker(s) (which may be represented by 138). For a second example, the client device 108 may receive, from the network device(s) 122 and over the network 120, a message 132 indicating that the first A/V device 102(1) detected the object 134 (and/or motion of the object 134) within the second motion zone 116(2). Based at least in part on the message 132, the client device 108 may determine that the second motion zone 116(2) is associated with an audio tone (e.g., the fifth audio tone). The client device 108 may then output the audio tone using the speaker(s) 138. For a third example, the client device 108 may receive, from the network device(s) 122 and over the network 120, a message 132 indicating that the first A/V device 102(1) detected a person. Based at least in part on the message 132, the client device 108 may determine that there is an association 130 between the type of object and an audio tone (e.g., the fourth audio tone). The client device 108 may then output the audio tone using the speaker(s) 138.

Additionally, in some examples, the network device(s) 122 may perform similar techniques and/or processes as the first A/V device 102(1). For example, the network device(s) 122 may receive, from the first A/V device 102(1) and over the network 120, data 136 indicating that the first A/V device 102(1) detected the object 134 (and/or motion of the object 134). Based at least in part on the data 136, the network device(s) 122 may determine that there is an association 130 between the first A/V device 102(1) and an audio tone (e.g., the first audio tone, the second audio tone, and/or the third audio tone). The network device(s) 122 may then transmit, to the client device 108 and over the network 120, data that is configured to cause the client device 108 to output the audio tone. In some examples, the data may include the audio tone data 128 representing the audio tone (e.g., if the client device 108 does not already store the audio tone data 128). In some examples, the client device 108 may already store the audio tone data 128 representing the audio tone, and the data may include a message 132 indicating that the client device 108 is to output the audio tone.

In some examples, the client device 108 and/or the network device(s) 122 may further cause one or more other electronic devices to notify the user 106. For example, the network device(s) 122 may further transmit, to the hub device 124, data that is configured to cause the hub device 124 to output the audio tone. In some examples, the data may include audio tone data 128 representing the audio tone. In some examples, the hub device 124 may already store the audio tone data 128 representing the audio tone, and the data may include a message indicating that the hub device 124 is to output the audio tone. In either of the examples, the hub device 124 may receive the data and, in response, output the audio tone using speaker(s) (which may be represented by 140).

Figure 2:
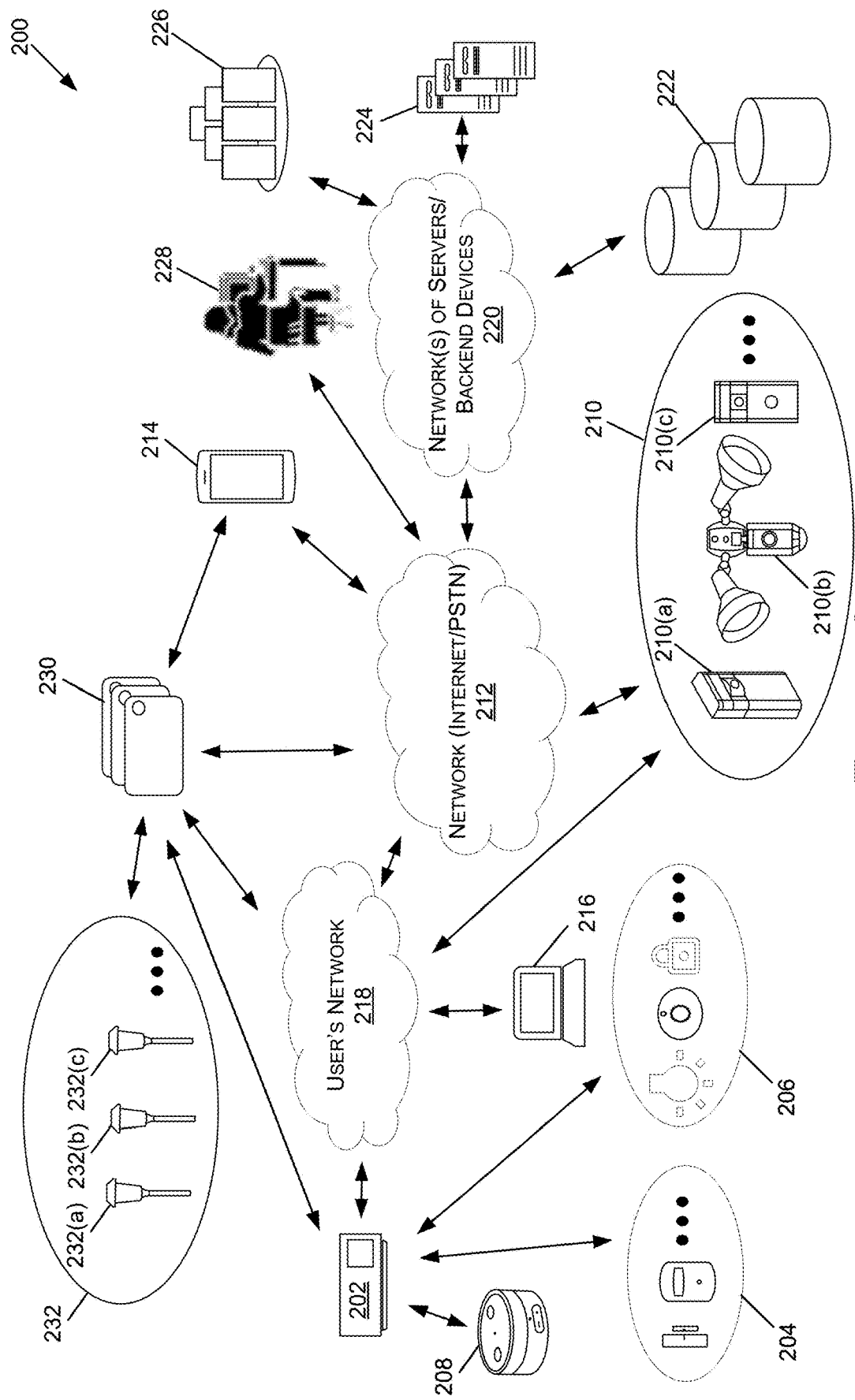
FIG. 2 is a functional block diagram illustrating a system for communicating in a network, according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, an electronic device 230, light emitters 232, etc.), when remotely monitored and controlled via a network (Internet/a public switched telephone network (PSTN)) 212 (which may be similar to, and represent the network 120), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, the electronic devices 230, the light emitters 232, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (which may represent, and/or be similar to, the first A/V device 102(1) and/or the second A/V device 102(2) (FIGS. 1A-1B), and which may alternatively be referred to herein as "A/V devices 210" or "A/V device 210"). The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 4.

The system 200 may further include a smart-home hub device 202 (which may represent, and/or be similar to, the hub device 124 (FIGS. 1A-1B), and which may alternatively be referred to herein as the "hub device 202") connected to the user's network 218 and/or the network (Internet/PSTN) 212. The smart-home hub device 202 (also known as a home automation hub, gateway device, or network device(s)), may comprise any device that facilitates communication with and control of the sensors 204, automation devices 206, the VA device 208, the electronic devices 230, the light emitters 232, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, the electronic devices 230, the light emitters 232, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, the electronic devices 230, the light emitters 232, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, the electronic devices 230, the light emitters 232, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices. In some examples, the electronic devices 230 and/or the light emitters 232 may be considered automation devices and/or may be considered part of an automation device or system (e.g., an outdoor lighting system, an indoor lighting system, and indoor/outdoor lighting system, etc.).

As described herein, in some of the present embodiments, some or all of the client devices 214, 216, the A/V device(s) 210, the smart-home hub device 202, the VA device 208, the sensors 204, the automation devices 206, the electronic devices 230, and/or the light emitters 232 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216 (which may represent, and/or be similar to, the client device 108 (FIGS. 1A-1B)). The client devices 214, 216 may communicate with and/or be associated with (e.g., capable of access to and control of) the A/V devices 210, a smart-home hub device 202, the VA device 208, sensors 204, automation devices 206, and/or the electronic devices 230. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, the electronic devices 230, the light emitters 232, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), backend server(s) 224, and one or more backend application programming interfaces (APIs) 226. While FIG. 2 illustrates the storage device 222, the backend server(s) 224, and the backend API 226 as components separate from the network 220, it is to be understood that the storage device 222, the backend server(s) 224, and/or the backend API 226 may be considered to be components of the network 220. For example, the network 220 may include a data center with a plurality of computing resources used to implement the storage device 222, the backend server(s) 224, and the backend API 226.

The backend server(s) 224 may comprise a computer program or other computer executable code that, when executed by processor(s) of the backend server(s) 224, causes the backend server(s) 224 to wait for requests from other computer systems or software (clients) and provide responses. In an embodiment, the backend server(s) 224 shares data and/or hardware and/or software resources among the client devices 214, 216. This architecture is called the client-server model. The client devices 214, 216 may run on the same computer or may connect to the backend server(s) 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based at least in part on application-layer network protocols. Each service may be provided by a server component (e.g., the backend server(s) 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned components, devices, components, and/or systems as illustrated in FIG. 2. For example, the network 220 (and/or the user's network 218) (and/or the network (Internet PSTCN) 212) may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, the electronic device 230, the A/V devices 210, any of the components of the network(s) of servers/backend devices 220 (e.g., the backend server(s) 224, the backend API 226, the storage devices 222, etc.), and/or any other electronic device may be referred to herein as a "network device(s)" or "network device(s)s".

With further reference to FIG. 2, the system 200 may also include a security monitoring service 228. The security monitoring service 228 may be operated by the same company that manufactures, sells, and/or distributes the A/V devices 210, the hub device 202, the VA device 208, the electronic devices 230, the light emitters 232, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the electronic devices 230, the light emitters 232, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, turn on and off one or more of the light emitters 232, etc.). For example, the security monitoring service 228 may operate and control their own client devices and/or network of servers/backend devices for monitoring and/or controlling security systems. In such an example, the A/V devices 210, the hub device 202, the VA device 208, the electronic devices 230, the light emitters 232, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

The system 200 may also include the electronic devices 230. The electronic devices 230 may be configured to control the light emitters 232 using conditions set by a user. The light emitters 232 may include at least a first type of light emitter 232(a), a second type of light emitter 232(b), and a third type of light emitter 232(c). The light emitters 232 may include pathway lights, walkway lights, floodlights, spotlights, security lights, dome lights, entryway lights, garden lights, outdoor lights, indoor lights, landscape lighting, accent lighting, wall sconces, bullets, globes, and/or any other type of light emitter.

For example, the first type of light emitters 232(a) may be configured to receive power from the electronic devices 230. To control the first type of light emitters 232(a), the electronic devices 230 may begin to provide power to the first type of light emitters 232(a) to activate the first type of light emitters 232(a) and cease providing the power the deactivate the first type of light emitters 232(a). Additionally, the second type of light emitters 232(b) may be configured to receive power from the electronic devices 230. To control the second type of light emitters 232(b), the electronic devices 230 may transmit first control signals to the second type of light emitters 232(b) that are configured to cause the second type of light emitters 232(b) to activate, and transmit second control signals to the second type of light emitters 232(b) that are configured to cause the second type of light emitters 232(b) to deactivate. Furthermore, the third type of light emitters 232(c) may be configured to receive power from a source that is external to the electronic devices 230, such as a battery. To control the third type of light emitters 232(c), the electronic devices 230 may transmit first control signals to the third type of light emitters 232(c) that are configured to cause the third type of light emitters 232(c) to activate, and transmit second control signals to the third type of light emitter 232(c) that are configured to cause the third type of light emitters 232(c) to deactivate.

In some examples, the light emitters 232 may include a string of light emitters 232. For example, where referring to a first type of light emitter 232(a), the first type of light emitter 232(a) may include two or more light emitter(s) 232(a) connected together using a wire. In such an example, when the electronic device 230 begins providing power to the first type of light emitter 232(a), the power is provided to each of the two or more light emitter(s) 232(a) connected together within the string of light emitter(s) 232(a). Additionally, when referring to a second type of light emitter 232(b), the second type of light emitter 232(b) may include two or more light emitter(s) 232(b) connected together using a wire. The electronic device 230 may continuously be providing power to each of the two or more light emitter(s) 232(b), but activate and/or deactivate the two or more light emitter(s) 232(b) using signals, as described herein.

Figure 3:
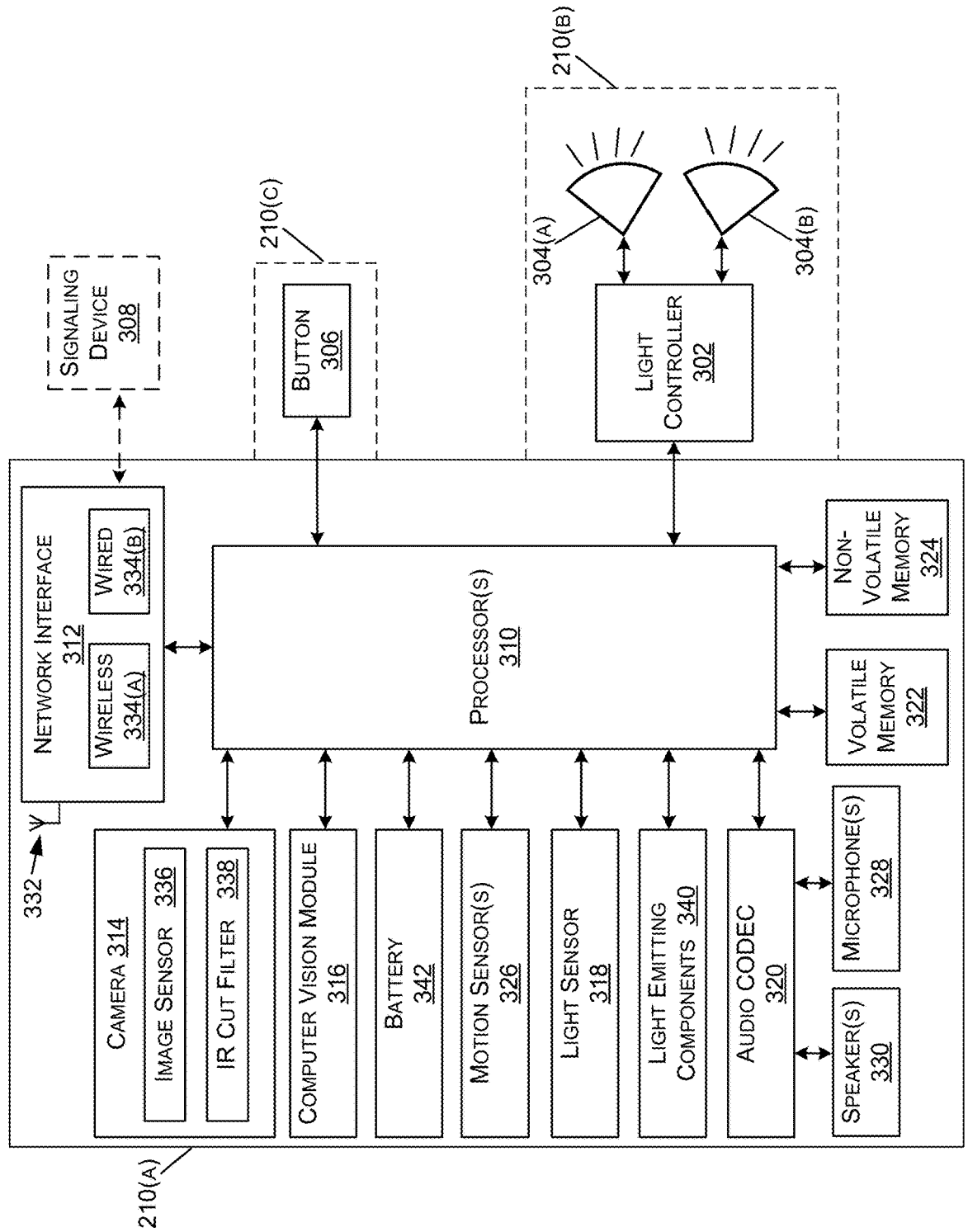
FIG. 3 is a functional block diagram illustrating one example embodiment of an A/V device, according to various aspects of the present disclosure.

FIG. 3 is a functional block diagram for an audio/video (A/V) device according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or another wireless communication protocol).

With further reference to FIG. 3, the A/V device 210 may include a processor(s) 310, a network interface 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller) may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the network interface 312, and may perform various functions as described in the present disclosure. In various embodiments, when the processor(s) 310 is triggered by the motion sensor(s) 326, the camera 314, the speaker(s) 330, the microphone(s) 328, the network interface 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the network interface 312 and the camera 314.

With further reference to FIG. 3, the network interface 312 may comprise an integrated circuit including a processor core, memory, and programmable input/output peripherals. The network interface 312 may be operatively connected to the processor(s) 310. In some embodiments, the network interface 312 is configured to handle communication links between the A/V device 210 and other, external devices, external receivers, external transmitters, and/or external transceivers, and to route incoming/outgoing data appropriately. For example, inbound data from an antenna 332 of the network interface 312 may be routed through the network interface 312 before being directed to the processor(s) 310, and outbound data from the processor(s) 310 may be routed through the network interface 312 before being directed to the antenna 332 of the network interface 312. As another example, the network interface 312 may be configured to transmit data to and/or receive data from a remote network device(s) (e.g., one or more components of the network(s) of servers/backend devices 220 described in FIG. 2). The network interface 312 may include wireless 334(a) and wired 334(b) adapters. For example, the network interface 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The network interface 312 may receive inputs, such as power and/or data, from the camera 314, the processor(s) 310, the button 306 (in embodiments where the A/V device 210 is the video doorbell 210(c)), the motion sensors 326, a reset button (not shown in FIG. 3 for simplicity), and/or the non-volatile memory 324. The network interface 312 may also include the capability of communicating over wired connections, such as with a signaling device 308. For example, when the button 306 of the video doorbell 210(c) is pressed, the network interface 312 may be triggered to perform one or more functions, such as to transmit a signal over the wired 334(b) connection to the signaling device 308 (although, in some embodiments, the signal be transmitted over a wireless 334(a) connection to the signaling device) to cause the signaling device 308 to emit a sound (e.g., a doorbell tone, a user customized sound, a ringtone, a seasonal ringtone, etc.). The network interface 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722$p$, 1800$p$, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the network interface 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the network interface 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the network interface 312 to the network 212 via the user's network 218, routed by the backend server(s) 224 and/or the backend API 226 and delivered to the client device(s) 214, 216 as described above in connection with FIG. 2. When the user speaks, after being transferred through the network 212, the user's network 218, and the network interface 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 108-220 VAC, for example. The incoming AC power may be received by an AC/DC adapter (not shown), which may convert the incoming AC power to DC (direct-current) and may step down the voltage from 108-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still further, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based at least in part on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based at least in part on relatively simple and fast computations is sometimes used for finding smaller regions of interesting image data that can be further analyzed by more computationally demanding techniques to produce a correct interpretation.

Several specialized tasks based at least in part on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition 1 identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based at least in part on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the network interface 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the network interface 312, to the client device(s) 214, 216 to indicate to the user(s) of the client device(s) 214, 216 that a person is present at the A/V device 210 (in some embodiments, via at least one of the hub device 202, the VA device 208, and/or one or more component of the network of servers/backend devices 220).

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
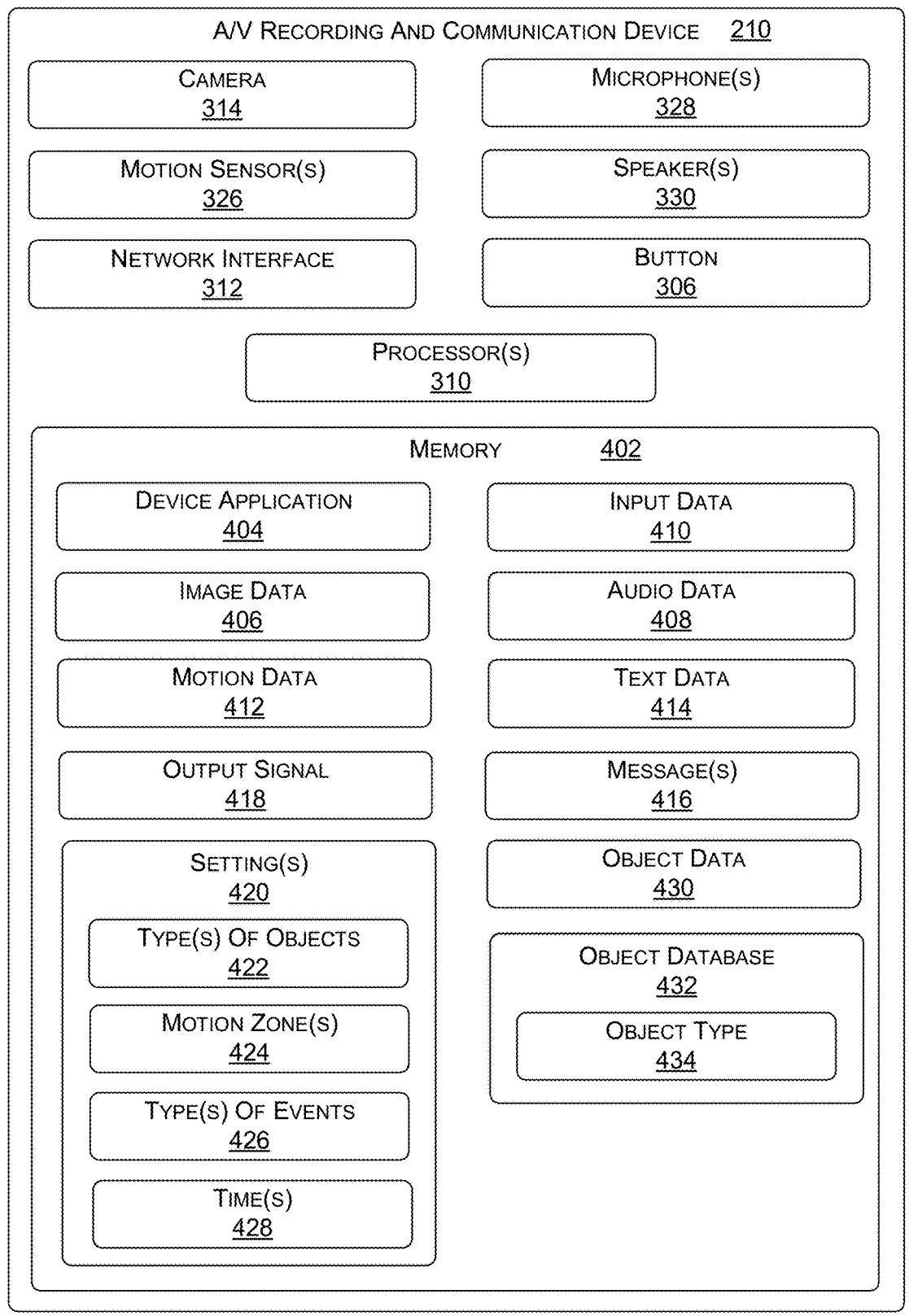
FIG. 4 is a functional block diagram illustrating one example embodiment of an A/V device, according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V recording and communication doorbell 210(c), the A/V recording and communication security camera 210(a), and/or the floodlight controller 210(b). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may include instructions that, when executed by the processor(s) 310, cause the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may include instructions that, when executed by the processor(s) 310, cause the processor(s) 310 to transmit the image data 406, the audio data 408, the motion data 412, the input data 410, the text data 414, and/or message(s) 416 to the client devices 214, 216, the hub device 202, and/or the backend server(s) 224 using the network interface 312. In various embodiments, the device application 404 may also include instructions that, when executed by the processor(s) 310, cause the processor(s) 310 to generate and transmit an output signal 418 that may include the image data 406, the audio data 408, the text data 414, the input data 410, and/or the motion data 412. In some of the present embodiments, the output signal 418 may be transmitted to the backend server(s) 224 and/or the hub device 202 using the network interface 312. The backend server(s) 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the backend server(s) 224, and the backend server(s) 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314. The image data 406 may be representative of (e.g., depict) a physical environment in a field of view of the camera 314. In some embodiments, the physical environment may include one or more objects (e.g., persons, vehicles, animals, items, etc.), and the image data 406 may be representative of the one or more objects, such as the one or more objects within the physical environment.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based at least in part on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(c)), the A/V device 210 may not include the button 306, and the A/V device 210 may not generate the input data 410.

With further reference to FIG. 4, a message 416 may be generated by the processor(s) 310 and transmitted, using the network interface 312, to the client device 214, 216, the backend server(s) 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia messages (MMS), voicemail messages, video signals, audio signals, data transmissions, and/or any other type of electronic communication that an electronic device can send to another electronic device.

The image data 406, the audio data 408, the text data 414, and/or the motion data 412 may be tagged with (e.g., a time stamp, based at least in part on clock data) and/or stored separately (e.g., on the backend server(s) 224, the hub device 202, and/or the A/V device 210) based at least in part on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server(s) 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As further illustrated in FIG. 4, the A/V device 210 may store setting(s) 420 (which may represent, and/or be similar to, the setting(s) 112 (FIGS. 1A-1B), and which may also be referred to as "filtering objects") associated with the A/V device 210. In some examples, the setting(s) 420 may indicate type(s) of objects 422 that the A/V device 210 is configured to monitor for when detecting objects (and/or motion). Type(s) of objects 422 may include, but are not limited to, people, animals, vehicles, parcels (e.g., packages), electronic devices (e.g., remote control vehicles, drones, etc.), and/or any other type of object that can be represented by the image data 406 and/or cause motion that can be detected by the A/V device 210. For a first example, the type(s) of objects 422 may indicate that the A/V device 210 is configured to monitor for motion that is caused by people (e.g., a type of object 422). For a second example, the type(s) of objects 422 may indicate that the A/V device 210 is configured to monitor for motion that is caused by people (e.g., a first type of object 422) and/or animals (e.g., a second type of object 422), but the A/V device 210 is not configured to monitor for other types of objects 422. As will be discussed below, the A/V device 210 may generate and/or transmit message(s) 416 when the A/V device 210 detects the type(s) of objects 422 indicated by the setting(s) 420.

In some examples, the setting(s) 420 may indicate motion zone(s) 424 that the A/V device 210 is configured to monitor when detecting objects (and/or motion). For example, a field of view of the A/V device 210 (e.g., field of view of the camera 314 and/or field of view of the motion sensor(s) 326) may include multiple motion zones. As described herein, the motion zones may include areas located within the field of view of the camera 314 and/or the field of view of the motion sensor(s) 326 of the A/V device 210 that are monitored for motion by the A/V device 210, the hub device 202, and/or the backend server(s) 224. As such, the motion zone(s) 424 may indicate one or more of the motion zones that the A/V device 210 is configured to monitor for objects (and/or motion). For example, if the A/V device is associated with five motion zones, the motion zone(s) 424 may indicate that the A/V device 210 is configured to monitor a first motion zone 424 and a second motion zone 424 (e.g., but not the other motion zones). The A/V device 210 may generate and/or transmit message(s) 416 when the A/V device 210 detects motion within the motion zone(s) 424. In some examples, the message(s) 416 may indicate that the A/V device 210 detected the motion within the motion zone(s) 424.

In some examples, the setting(s) 420 may indicate type(s) of events 426 that the A/V device 210 is configured to monitor. The type(s) of events 426 may include, but are not limited to, motion being detected by the A/V device 210, input being received by the A/V device 210 via the button 306, and/or the like. For a first example, the type(s) of events 426 may indicate that the A/V device 210 is configured to monitor for both motion detection and input received via the button 306. For a second example, the type(s) of events 426 may indicate that the A/V device 210 is configured to monitor for one, but not both, of motion detection or input received via the button 306. The A/V device 210 may generate and/or transmit message(s) 416 when the A/V device 210 detects the type(s) of events 426 occurring. In some examples, the message(s) 416 may indicate the type of event 426 (e.g., motion, input received via the button 306, etc.) that is detected by the A/V device 210.

In some examples, the setting(s) 420 may include time(s) 428 that the A/V device 210 is configured to monitor for objects. The time(s) 428 may include, but are not limited to, days of the year (e.g., March 1, April 7, October 19, etc.), days of the week (e.g., Monday, Tuesday, Wednesday, etc.), time periods of the day (e.g., between 9:00 a.m. and 10:00 a.m., between 1:00 p.m. and 5:00 p.m., etc.), and/or the like. For example, the time(s) 428 may indicate that the A/V device 210 is configured to monitor for objects (and/or motion) between 8:00 p.m. and 8:00 a.m. each day. The A/V device 210 may generate and/or transmit message(s) 416 when the A/V device 210 detects objects (and/or motion) during the time(s) 428. In some examples, the message(s) 416 may indicate the time 428 at which the object (and/or the motion) was detected by the A/V device 210.

As described herein, at least some of the processes of the backend server(s) 224, the hub device 202, and/or the client device 214, 216 may be executed by the A/V device 210. For example, the device application 404 may include instructions that, when executed by the processor(s) 310, cause the processor(s) 310 to analyze the image data 406 in order to determine if the image data 406 represents an object. As discussed above, objects may include, but are not limited to, people, animals, vehicles, parcels (e.g., packages), electronic devices (e.g., remote control vehicles, drones, etc.), and/or any other type of object that can be represented by the image data 406 and/or cause motion that can be detected by the A/V device 210. In some examples, the processor(s) 310 of the A/V device 210 may analyze the image data 406 whenever the A/V device 210 generates the image data 406. In some examples, the processor(s) 310 of the A/V device 210 may analyze the image data 406 based at least in part on detecting motion of an object.

In some examples, to analyze the image data 406, computer vision processing and/or image processing, as described herein, for example, may be performed by the processor(s) 310 of the A/V device 210 to determine that the image data 406 represents one or more objects. For example, in any of the present embodiments, the image data 406 generated by the A/V device 210 may be analyzed to determine object data 430. In some of the present embodiments, one or more of the image data 406, the motion data 412, and the audio data 408 may be used to determine the object data 430. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor(s) 310 of the A/V device 210 may compare the object data 430 to an object database 432 to determine what, if any, object(s) the image data 406 represents in the field of view of the A/V device 210. For example, the object database 432 may store image data corresponding to images and/or video footage that represent various objects, where the image data may be labeled (e.g., tagged, such as in the form of metadata) to indicate an object type 434 (alternatively referred to herein as the "type of object 434") represented by each image and/or video footage. For a first example, the object database 432 may store image data representing a person, where the image data is labeled to indicate that the type of object 434 includes a person. For a second example, the object database 432 may store image data representing an animal (e.g., a dog, a cat, a coyote, etc.), where the image data is labeled to indicate that the type of object 434 includes the animal (e.g., the dog, the cat, the coyote, etc.). For a third example, the object database 432 may store image data representing a vehicle, where the image data is labeled to indicate the type of object 434 includes the vehicle.

Based at least in part on the comparing, the processor(s) 310 of the A/V device 210 may match the object data 430 from the image data 406 to the image data stored in the object database 432. The processor(s) 310 of the A/V device 210 may then use the match to determine that the object data 430 represents an object and/or to determine the type of object 434 that the object data 430 represents. For example, if the processor(s) 310 of the A/V device 210 match the object data 430 from the image data 406 to image data stored in the object database 432 that represents a person, then the processor(s) 310 of the A/V device 210 may determine that the image data 406 represents an object and/or that the image data 406 represents a person. In some examples, when the object data 430 represents multiple objects, the processor(s) 310 of the A/V device 210 may perform a similar analysis to identify each object represented by the object data 430 and/or the respective type of object 434 associated with each of the objects represented by the object data 430.

In some examples, in addition to, or alternatively from, comparing the image data 406 to the image data stored in the object database 432, features and/or characteristics of various objects may be stored in the object database 432, and the features and/or characteristics of the objects in the image data 406 may be determined (e.g., using computer vision processing, image processing, or the like) and compared against the features and/or characteristics from the object database 432. For example, sizes, volumes, weights, colors, movement types, and/or other features and/or characteristics of various objects may be stored in the object database 432. The size, volume, weight, color, movement type, and/or other features and/or characteristics of an object represented by the image data 406 may then be compared to the sizes, volumes, weights, colors, movement types, and/or other features and/or characteristics stored in the object database 432 to identify the type of object 434 represented by the image data 406.

In some examples, the message(s) 416 transmitted by the A/V device 210 may indicate that the image data 406 represents an object and/or indicate the type of object 434 represented by the image data 406. In some examples, the message(s) 416 transmitted by the A/V device 210 may indicate that the A/V device 210 detected an object and/or indicate the type of object 434 that the A/V device 210 detected. In some examples, the A/V device 210 may generate and/or transmit the message(s) 416 based at least in part on the type of object 434 represented by the image data 406 corresponding to the type(s) of objects 422 included in the setting(s) 420. For example, if the type of object 434 represented by the image data 406 includes a person, and a type of object 422 includes people, A/V device 210 may generate a message 416 indicating that the person was detected and/or indicating that the image data 406 represents the person. The A/V device 210 may then transmit, using the network interface 312, the message 416 to the client device 214, 216, the hub device 202, and/or the backend server(s) 224.

Figure 5:
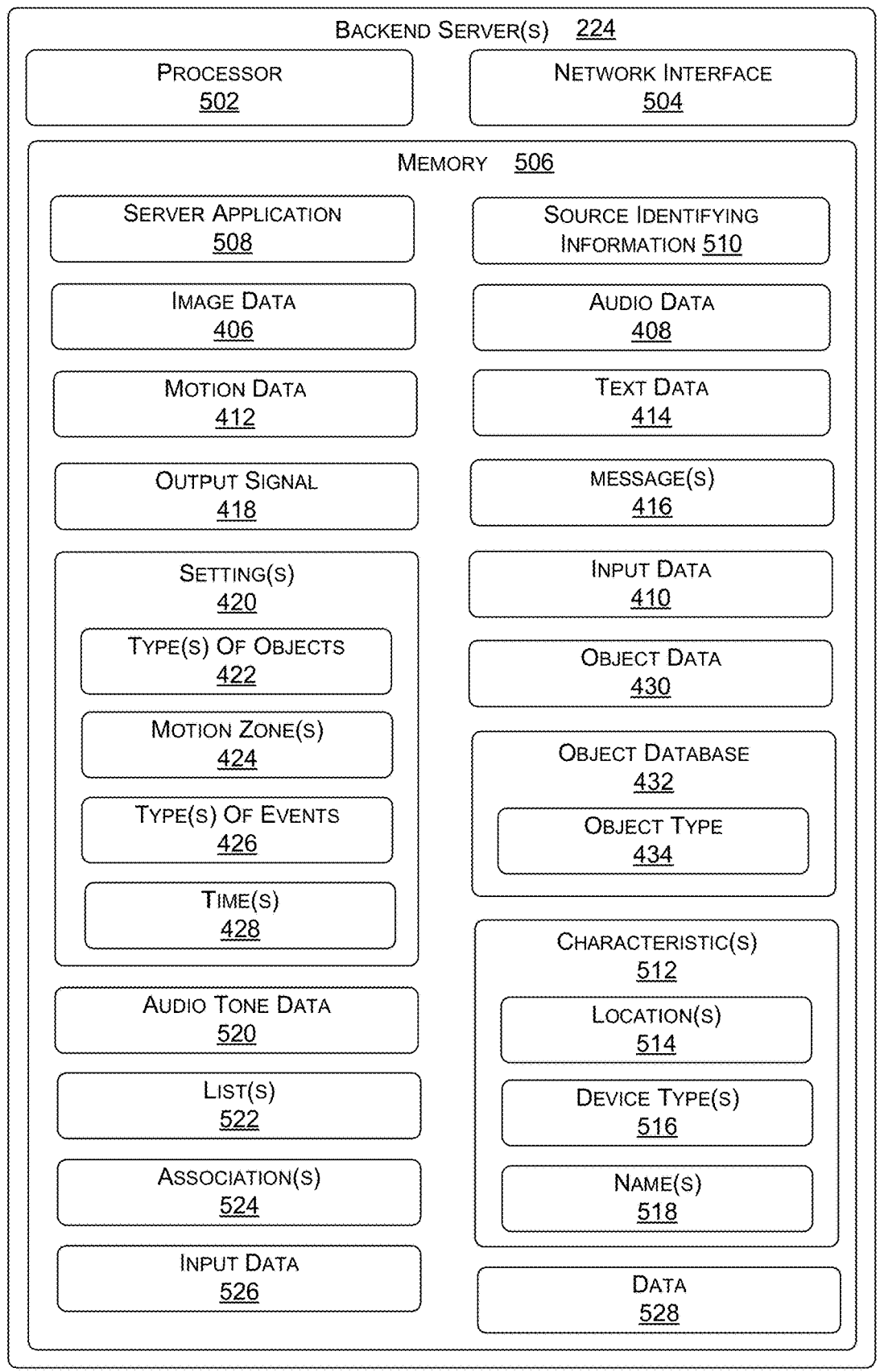
FIG. 5 is a functional block diagram illustrating one example embodiment of a backend server, according to various aspects of the present disclosure.

FIG. 5 is a functional block diagram illustrating one embodiment of the backend server(s) 224 according to various aspects of the present disclosure. The backend server(s) 224 may comprise processor(s) 502 (which may be similar to, and/or include similar functionality as, the processor(s) 310), a network interface 504 (which may be similar to, and/or include similar functionality as, the network interface 312), and a memory 506 (which may be similar to, and/or include similar functionality as, the memory 402). The network interface 504 may allow the backend server(s) 224 to access and communicate with devices connected to the network (Internet/PSTN) 212 (e.g., the A/V device 210, the hub device 202, the client devices 214, 216, a device controlled by the security monitoring service 228, the A/V devices 230, the client devices 232, and/or the one or more remote systems 234).

The memory 506 may include a server application 508 that includes instructions that, when executed by the processor(s) 502, cause the processor(s) 502 to receive and/or retrieve the audio data 408, the text data 414, the input data 410, the message(s) 416, the image data 406, and/or the motion data 412 from the A/V device 210 (e.g., in the output signal 418) and/or the hub device 202. The server application 508 may also include instructions that, when executed by the processor(s) 502, cause the processor(s) 502 to transmit (and/or forward) the audio data 408, the text data 414, the input data 410, the message(s) 416, the image data 406, and/or the motion data 412 to the client devices 214, 216 using the network interface 504.

Although referred to as the backend server(s) 224 with reference to the processes described herein, the backend server(s) 224 may additionally, or alternatively, include one or more of the devices from the network(s) of servers/backend devices 220. For example, the processes described herein with respect to the backend server(s) 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the backend server(s) 224 to determine the client devices 214, 216 are associated with the A/V device 210 and/or the hub device 202.

In some embodiments, the server application 508 may further includes instructions that, when executed by the processor(s) 502, cause the processor(s) 502 to generate and transmit a report signal (not shown) to a third-party client device, which may be associated with a law enforcement agency or the security monitoring service 228, for example. The report signal, which may be the message 416, in some examples, may include the image data 406, the audio data 408, and/or the text data 414.

As described herein, at least some of the processes of the A/V device 210, the hub device 202, and/or the client device 214, 216 may be executed by the backend server(s) 224. For example, the backend server(s) 224 may analyze the image data 406 (e.g., using computer vision and/or image processing) in order to determine if the image data 406 represents an object and/or determine the type of object 434 represented by the image data 406. In some examples, the backend server(s) 224 analyze the image data 406 using the object database 432. In some examples, the backend server(s) 224 may then determine whether the type of object 434 represented by the image data 406 corresponds to a type of object 422 as indicated by the setting(s) 420. Based at least in part on determining that the type of object 434 corresponds to the type of object 422, the backend server(s) 224 may generate a message 416 indicating that the A/V device 210 detected an object (and/or motion) and/or indicating that the A/V device 210 detected the type of object 422. The backend server(s) 224 may then transmit, using the network interface 504, the message 416 to the client device 214, 216, the hub device 202, and/or another device.

Additionally, in some examples, the backend server(s) 224 may analyze the motion data 412 and/or the image data 406 to determine if motion detected by the A/V device 210 occurred within one of the motion zone(s) 424. For a first example, the motion data 412 may indicate which motion sensor 326 of the A/V device 210 detected the motion, where each motion sensor 326 is associated with one or more motion zones. As such, the backend server(s) 224 may determine if the motion sensor 326 that detected the motion is associated with one of the motion zone(s) 424. For a second example, the backend server(s) 224 may analyze the image data 406 to determine a portion of the image data 406 that represents the object. The backend server(s) 224 may then determine if the portion of the image data 406 corresponds to one of the motion zone(s) 424. In either example, based at least in part on determining that the motion occurred within one of the motion zone(s) 424, the backend server(s) 224 may generate a message 416 indicating that the A/V device 210 detected an object (and/or motion) and/or indicating that the A/V device 210 detected the object (and/or motion) within the motion zone 424. The backend server(s) 224 may then transmit, using the network interface 504, the message 416 to the client device 214, 216, the hub device 202, and/or another device.

Furthermore, in some examples, the backend server(s) 224 may analyze the motion data 412, the image data 406, and/or the input data 410 to determine if the A/V device 210 detected one of the type(s) of events 426. For example, the backend server(s) 224 may analyze the motion data 412, the image data 406, and/or the input data 410 to determine if the A/V device 210 detected motion of an object and/or the A/V device 210 received an input via the button 306. Based at least in part on determining that the A/V device 210 detected one of the type(s) of events 426, the backend server(s) 224 may generate a message 416 indicating that the A/V device 210 detected an object (and/or motion) and/or indicating that the A/V device 210 detected the type of event 426. The backend server(s) 224 may then transmit, using the network interface 504, the message 416 to the client device 214, 216, the hub device 202, and/or another device.

Moreover, in some examples, the backend server(s) 224 may analyze the motion data 412, the image data 406, and/or the input data 410 to determine if the A/V device 210 detected an object (and/or motion) during one of the time(s) 428. For example, the backend server(s) 224 may determine a time (e.g., using a time stamp) at which the motion data 412, the image data 406, and/or the input data 410 was generated by the A/V device 210. The backend server(s) 224 may then determine if the time is during one of the time(s) 428. Based at least in part on determining that the A/V device 210 detected the object (and/or motion) during one of the time(s) 428, the backend server(s) 224 may generate a message 416 indicating that the A/V device 210 detected an object (and/or motion) and/or indicating that the A/V device 210 detected the object (and/or motion) during the time 428. The backend server(s) 224 may then transmit, using the network interface 504, the message 416 to the client device 214, 216, the hub device 202, and/or another device.

In some examples, the backend server(s) 224 may associate audio tones with A/V devices 210 (and/or other devices) and/or setting(s) 420 of A/V devices 210. For example, the backend server(s) 224 may receive, using the network interface 504, data representing the setting(s) 420 and/or data representing characteristic(s) 512 (which may represent, and/or be similar to, the characteristic(s) 110 (FIGS. 1A-1B)) from the client device 214, 216, the A/V device 210, the hub device 202, and/or another device. In some examples, the characteristic(s) 512 may include a location 514 of the A/V device 210 (and/or another device). In some examples, the location 514 may correspond to an address, GNSS coordinates, GPS coordinates, and/or the like, of where the A/V device 210 is located. Additionally, or alternatively, in some examples, the location 514 may correspond to a relative location of the A/V device 210 at a property. For example, the location 514 may indicate that the A/V device 210 is located at a front of the property, a back of the property, a side of the property, inside the property, and/or the like. For another example, the location 514 may indicate that the A/V device 210 is located at a front door of the property, a back door of the property, a side door of the property, and/or the like.

In some examples, the characteristic(s) 512 may include a device type 516 (also referred to as "type of device 516") associated with the A/V device 210 (and/or another device). For example, the type of device 516 may include, but is not limited to, a security camera, a light camera (e.g., floodlight cameras, spotlight cameras, etc.), a video doorbell, and/or the like. For another example, and if the characteristic(s) 512 are associated with a device other than an A/V device 210, the type of device 516 may include, but is not limited to, a motion sensor, a door sensor, a window sensor, an automation device, a transformer, a light emitter, and/or any other type of device. In some examples, the characteristic(s) 512 may indicate an identifier associated with the A/V device 210 (and/or another device). The identifier may include, but is not limited to, a stock keeping unit (SKU) number, an Internet Protocol (IP) address, a media access control (MAC) address, a numerical identifier, an alphabetic identifier, a mixed numerical and alphabetic identifier, and/or any other type of identifier that may be used to identify the A/V device 210 (and/or the other device). In such examples, the backend server(s) 224 may then determine the type of device 516 based at least in part on the identifier. For example, the backend server(s) 224 may store a table that associates identifiers with devices (and/or types of devices 516), where the backend server(s) 224 use the table to match the identifier to a device (and/or type of device 516).

In some examples, the characteristic(s) 512 may include a name 518 associated with the A/V device 210 (and/or another device). In some examples, the name 518 may indicate functionality associated with the A/V device 210, such as the area of the property that the A/V device 210 is monitoring. For example, the name 518 may include front yard device, backyard device, porch device, garage device, doorbell, and/or the like. For another example, and if the device is not an A/V device 210, the name 518 may include front door sensor, backdoor sensor, bedroom window sensor, basement motion sensor, and/or the like. Additionally, or alternatively, in some examples, the name 518 may include an arbitrary name created by the user of the A/V device 210. For example, the name 518 may include, but is not limited to, first device, second device, primary device, and/or the like.

The backend server(s) 224 may then use the setting(s) 420 and/or the characteristic(s) 512 to identify audio tones for the A/V device 210. For example, the backend server(s) 224 may store audio tone data 520 representing a set of audio tones. The backend server(s) 224 may then analyze the audio tone data 520 in order to identify one or more audio tones that are related to the setting(s) 420 and/or the characteristic(s) 512. In some examples, an audio tone may be related to a setting 420 and/or a characteristic 512 when the audio tone includes sound (e.g., one or more words) describing the setting 420 and/or characteristic 512. For a first example, the backend server(s) 224 may identify at least one audio tone (referred to, in this example, as a "first audio tone") that is related to the location 514 of the A/V device 210. For instance, if the A/V device 210 is located at a back of the property, such that the A/V device 210 monitors the backyard, the first audio tone may include sound (e.g., one or more words) indicating that an object (and/or motion) was detected in the backyard. Alternatively, if the A/V device 210 is located on the front of the property, such that the A/V device 210 monitors the front yard, the first audio tone may include sound (e.g., one or more words) indicating that an object (and/or motion) was detected in the front yard.

For a second example, the backend server(s) 224 may identify at least one audio tone (referred to, in this example, as a "second audio tone") that is related to the name 518 of the A/V device 210. For instance, if the A/V device 210 is named "backyard device," the second audio tone may include sound (e.g., one or more words) indicating that an object (and/or motion) was detected by the backyard device. Alternatively, if the A/V device 210 is named "front yard device," the second audio tone may include sound (e.g. one or more words) indicating that an object (and/or motion) was detected by the front yard device. For a third example, the backend server(s) 224 may identify at least one audio tone (referred to, in this example, as a "third audio tone") that is related to the type of device 516. For instance, if the A/V device 210 includes a video doorbell, the third audio tone may include sound (e.g., one or more words) indicating that an object (and/or motion) was detected by the video doorbell. Alternatively, if the A/V device 210 includes a security camera, the third audio tone may include sound (e.g., one or more words) indicating that an object (and/or motion) was detected by the security camera.

For a fourth example, the backend server(s) 224 may identify at least one audio tone (referred to, in this example, as a "fourth audio tone") that is related to the type(s) of objects 422 that the A/V device 210 is configured to monitor. For instance, if the A/V device 210 is configured to monitor for motion of people (e.g., not other objects, such as animals), the fourth audio tone may include sound (e.g., one or more words) indicating that the A/V device 210 has detected motion of a person. Alternatively, if the A/V device 210 is configured to monitor for motion of animals (e.g., not other objects, such as people), the fourth audio tone may include sound (e.g., one or more words) indicating that the A/V device 210 has detected motion of an animal. For a fifth example, the backend server(s) 224 may identify at least one audio tone (referred to, in this example, as a "fifth audio tone") that is related to the motion zone(s) 424 that the A/V device 210 is configured to monitor. For instance, if the A/V device 210 is configured to monitor a motion zone that includes the front porch of the property, the fifth audio tone may include sound (e.g., one or more words) indicating that an object (and/or motion) was detected at the front porch of the property. Alternatively, if the A/V device 210 is configured to monitor a motion zone that includes the driveway, the fifth audio tone may include sound (e.g., one or more words) indicating that an object (and/or motion) was detected at the driveway.

For a sixth example, the backend server(s) 224 may identify at least one audio tone (referred to, in this example, as a "sixth audio tone") that is related to the type(s) of events 426 associated with the A/V device 210. For instance, if the A/V device 210 is configured to monitor for motion, the sixth audio tone may include sound (e.g., one or more words) indicating that the A/V device 210 has detected motion. Alternatively, if the A/V device 210 is configured to monitor for input to the button 306, the sixth audio tone may include sound (e.g., one or more words) indicating that the A/V device 210 has received input to the button 306. For a seventh example, the backend server(s) 224 may identify at least one audio tone (referred to, in this example, as a "seventh audio tone") that is related to the time(s). For instance, if the A/V device 210 is configured to monitor for events (e.g., motion, input to the button 306, etc.) during a period of time, the seventh audio tone may include sound (e.g., one or more words) indicating that an object (and/or motion) was detected during the period of time.

After identifying the audio tones, the backend server(s) 224 may generate a list 522 (which may represent, and/or be similar to, the list(s) 126 (FIGS. 1A-1B)) that includes the audio tones (e.g., populate the list 522 to generate a populated list 522 of audio tones). The backend server(s) 224 may then transmit, using the network interface 504, data representing the list 522 to the client device 214, 216. Additionally, in some examples, the backend server(s) 224 may receive, using the network interface 504, data indicating association(s) 524 (which may represent, and/or be similar to, the association(s) 130 (FIGS. 1A-1B)) from the client device 214, 216. The association(s) 130 may indicate one or more associations between audio tone(s) included in the list 522 and one or more both of the A/V device 210 or the setting(s) 420. For example, the association(s) 524 may include an association 524 between an audio tone (e.g., the first audio tone, the second audio tone, the third audio tone, etc.) and the A/V device 210. For a second example, the association(s) 524 may include an association 524 between an audio tone (e.g., the fourth tone) and the type(s) of objects 422. Still further, for a third example, the association(s) 524 may include an association 524 between an audio tone (e.g., the fifth audio tone) and one of the motion zone(s) 424.

Additionally to, or alternatively from, the backend server(s) 224 receiving the data representing the association(s) 524, in some examples, the backend server(s) 224 may receive data (e.g., input data 526) indicating input(s) received by the client device 214, 216 while displaying the list 522. The backend server(s) 224 may then generate the association(s) 524 based at least in part on the input data 526. For example, if the input data 526 indicates that the client device 214, 216 received an input indicating a selection of an audio tone (e.g., the fifth audio tone) for at least one of the motion zone(s) 424, the backend server(s) 224 may generate an association 524 between the audio tone and the at least one of the motion zone(s) 424. In either of the examples herein, the backend server(s) 224 may transmit, using the network interface 504, data representing the association(s) 524 to the client device 214, 216, the hub device 202, the VA device 208, the A/V device 210, an additional A/V device, and/or another device. Additionally, in some examples, the backend server(s) 224 may transmit, using the network interface 504, the audio tone data 520 representing the audio tones included in the association(s) 524 to the client device 214, 216, the hub device 202, the VA device 208, the A/V device 210, an additional A/V device, and/or another device.

The backend server(s) 224 may then use the association(s) 524 to notify a user when an event occurs with the A/V device 210. In some examples, the association(s) 524 may create criterion(s) that need to be satisfied in order for the notifications to occur. For example, if an audio tone includes an association 524 with the A/V device 210, a criterion may be satisfied when the A/V device 210 detects motion and/or input via the button 306. For another example, if an audio tone includes an association 524 with a setting 520, a criterion may be satisfied based at least in part on the A/V device 210 detecting motion and/or input via the button that satisfied the setting 420. In some examples, the input data 526 may indicate the criterion. For example, if the input data 526 indicates that the client device 214, 216 received a selection of an audio tone and a setting 420, the setting 420 may correspond to the criterion since the setting 420 in order to notify the user using the audio tone. In either example, the user may be notified when the criterion is satisfied.

For a first example, the backend server(s) 224 may receive, using the network interface 504, data (image data 406, motion data 412, input data 410, etc.) indicating that the A/V device 210 detected motion. Based at least in part on the data, the backend server(s) 224 may determine that there is an association 524 between the A/V device 210 and an audio tone (e.g., the first audio tone, the second audio tone, the third audio tone, etc.). The backend server(s) 224 may then transmit, using the network interface 504, data to the client device 214, 216 that causes the client device 214, 216 to output the audio tone. In some examples, the data may include the audio tone data 520 representing the audio tone. In some examples, such as when the client device 214, 216 stores the audio tone data 520 representing the audio tone, the data may include data 528 (and/or a message 416) that causes the client device 214, 216 to output the audio tone (e.g., the data 528 and/or the message 416 may include a command to output the audio tone).

For a second example, the backend server(s) 224 may receive, using the network interface 504, data (image data 406, motion data 412, input data 410, etc.) indicating that the A/V device 210 detected motion within a motion zone 424. Based at least in part on the data, the backend server(s) 224 may determine that there is an association 524 between the motion zone 424 and an audio tone (e.g., the fifth audio tone). The backend server(s) 224 may then transmit, using the network interface 504, data to the client device 214, 216 that causes the client device 214, 216 to output the audio tone. In some examples, the data may include the audio tone data 520 representing the audio tone. In some examples, such as when the client device 214, 216 stores the audio tone data 520 representing the audio tone, the data may include data 528 (and/or a message 416) that causes the client device 214, 216 to output the audio tone (e.g., the data 528 and/or the message 416 may include a command to output the audio tone).

In some examples, the backend server(s) 224 may further cause one or more other electronic devices to provide notifications. For a first example, the backend server(s) 224 may transmit, using the network interface 504, data to the hub device 202 that causes the hub device 202 to output the audio tone. In some examples, the data may include the audio tone data 520 representing the audio tone. In some examples, such as when the hub device 202 stores the audio tone data 520 representing the audio tone, the data may include data 528 (and/or a message 416) that causes the hub device 202 to output the audio tone (e.g., the data 528 and/or the message 416 may include a command to output the audio tone). For a second example, the backend server(s) 224 may transmit, using the network interface 504, data to an additional A/V device 210 that causes the additional A/V device 210 to output the audio tone. In some examples, the data may include the audio tone data 520 representing the audio tone. In some examples, such as when the additional A/V device 210 stores the audio tone data 520 representing the audio tone, the data may include data 528 (and/or a message 416) that causes the additional A/V device 210 to output the audio tone (e.g., the data 528 and/or the message 416 may include a command to output the audio tone).

For a third example, the backend server(s) 224 may transmit, using the network interface 504, data 528 (which may be via the hub device 202) to a device that includes a display (e.g., a television), where the data 528 causes the device to display content indicating that the A/V device 210 detected an object (and/or motion) and/or indicating that one of the setting(s) 420 has been satisfied. For a fourth example, the backend server(s) 224 may transmit, using the network interface 504, data 528 (which may be via the hub device 202) to an electronic device 230 that causes the electronic device 230 to activate (e.g., provide power to, cause to emit light, etc.) the light emitters 232. For a fifth example, the backend server(s) 224 may transmit, using the network interface 504, data 528 (which may be via the hub device 202) to the light emitters 232 that causes the light emitters 232 to activate (e.g., emit light).

Although the above describes associating audio tones with A/V devices 210, in other examples, the techniques and/or processes may be used to associate audio tones with other types of devices. For example, the techniques and/or processes may be used to associate audio tones with sensors 204, automation devices 206, the hub device 202, the VA device 208, light emitters 232, and/or any other type of electronic device that may detect an object through motion and/or receiving input. As such, in such examples, each time a device detects an object, the backend server(s) 224 may cause the client device 214, 216 to output an audio tone associated with the device.

The hub device 202, the backend server(s) 224, the A/V device 210, one or more additional or alternative components of the network(s) of servers/backend devices 220, and/or another electronic device may alternatively be referred to herein as "network device(s)".

Figure 6:
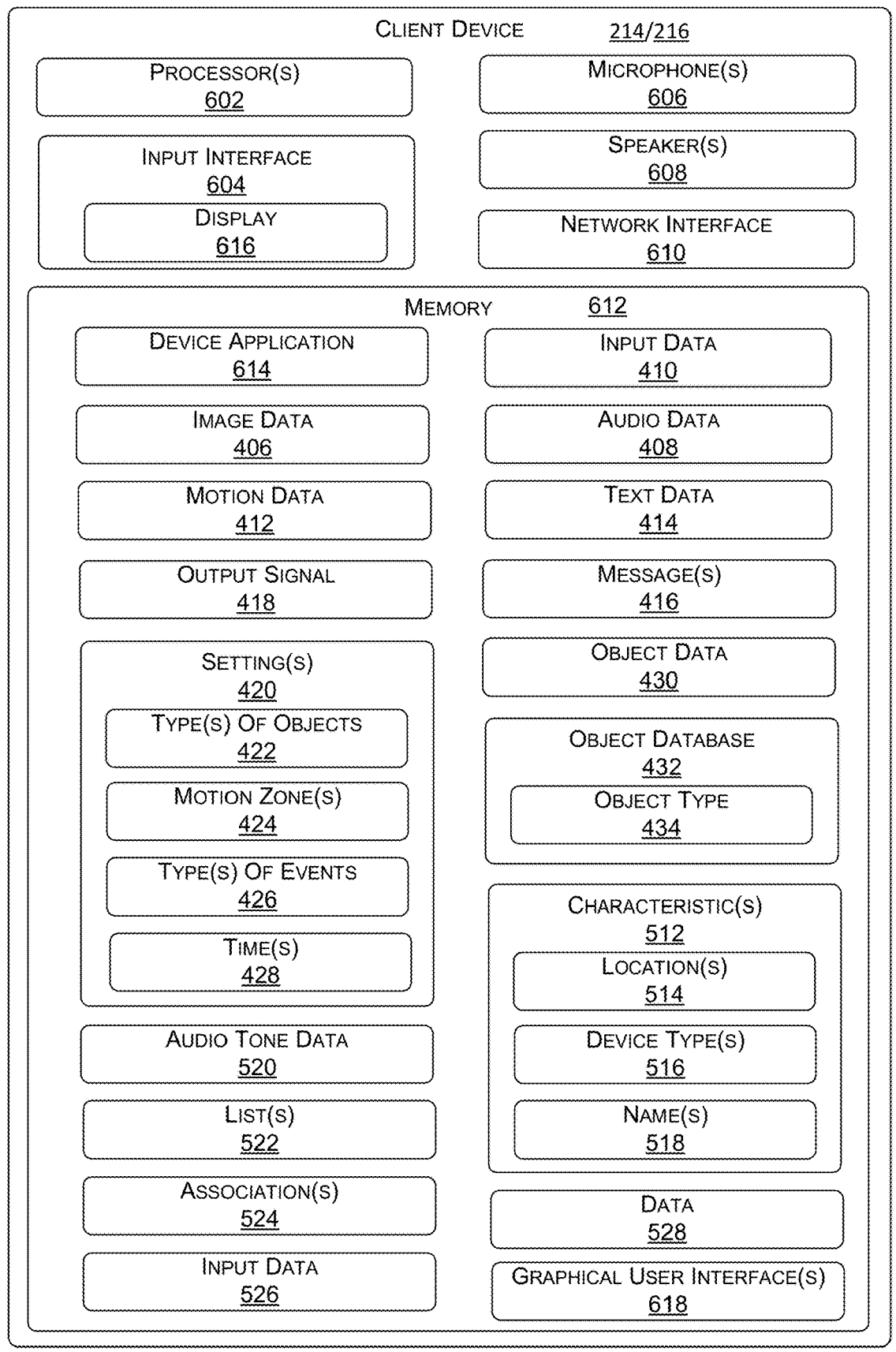
FIG. 6 is a functional block diagram illustrating one example embodiment of a client device, according to various aspects of the present disclosure.

Now referring to FIG. 6, FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606 (which may be similar to, and/or include similar functionality as, the microphone(s) 328), speaker(s) 608 (which may be similar to, and/or include similar functionality as, the speaker(s) 330), a network interface 610 (which may be similar to, and/or include similar functionality as, network interface 312), and memory 612 (which may be similar to, and/or include similar functionality as, the memory 402). The client device 214, 216 may further comprise a camera (not shown) operatively connected to the processor(s) 602.

The memory 612 may store a device application 614. In various embodiments, the device application 614 may include instructions that, when executed by the processor(s) 602, cause the processor(s) 602 to receive input(s) to the input interface 604 (e.g., indications to associate audio tones with A/V devices 210, indications to associate audio tones with setting(s) 420 of A/V devices 210, etc.). In addition, the device application 614 may include instructions that, when executed by the processor(s) 602, cause the processor(s) 602 to receive, using the network interface 610, the input data 410, the image data 406, the audio data 408, the output signal 418, the message(s) 416, the data representing the setting(s) 420, the data representing the characteristic(s) 512, the data representing the association(s) 524, the audio tone data 520, the data representing the list(s) 522, and/or the data 528 from one or more of the A/V device 210, the hub device 202, or the backend server(s) 224. Furthermore, the device application 614 may include instructions that, when executed by the processor(s) 602, cause the processor(s) 602 to transmit, using the network interface 610, the data representing the setting(s) 420, the data representing the characteristic(s) 512, the audio tone data 520, the data representing the list(s) 522, the data representing the association (s) 524, the data representing the input(s), and/or the data 528 to one or more of the A/V device 210, the hub device 202, and/or the backend server(s) 224.

With further reference to FIG. 6, the input interface 604 may include a display 616. The display 616 may include a touchscreen, such that the user of the client device 214, 216 may provide inputs directly to the display 616 (e.g., indications to associate audio tones with A/V devices 210, indications to associate audio tones with setting(s) 420 of A/V devices 210, etc.). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 614 may include instructions that, when executed by the processor(s) 602, cause the processor(s) 602 to cause the display 616 to display the message 416. The message 416 may indicate that the A/V device 210 detected motion. While displaying the message 416, the input interface 604 may receive input from the user to answer the message 416. In response, the device application 614 may include instructions that, when executed by the processor(s) 602, cause the processor(s) 602 to display image(s) represented by the received image data 406 on the display 616.

In some examples, the client device 214, 216 may receive, using the input interface 604, input indicating setting(s) 420 and/or characteristic(s) 512. For example, the client device 214, 216 may receive input(s) indicating the type(s) of object 422, input(s) indicating motion zone(s) 424, input(s) indicating type(s) of events 426, input(s) indicating time(s) 428, input(s) indicating location(s) 512, input(s) indicating device type(s) 516, and/or input(s) indicating name(s) 518. In some examples, the client device 214, 216 may receive the input(s) during a configuration process associated with the A/V device 210 (and/or another device). In some examples, the client device 214, 216 may then transmit, using the network interface 610, data representing the setting(s) 420 and/or data representing the characteristic(s) 512 to the backend server(s) 224, the hub device 202, the A/V device 210, and/or another device.

As described herein, at least some of the processes of the A/V device 210, the hub device 202, and/or the backend server(s) 224 may be executed by the client device 214, 216. For example, the client device 214, 216 may analyze the image data 406 (e.g., using computer vision and/or image processing) in order to determine if the image data 406 represents an object and/or determine the type of object 434 represented by the image data 406. In some examples, the client device 214, 216 analyzes the image data 406 using the object database 432. In some examples, the client device 214, 216 may then determine whether the type of object 434 represented by the image data 406 corresponds to a type of object 422 as indicated by the setting(s) 420.

Additionally, in some examples, the client device 214, 216 may analyze the motion data 412 and/or the image data 406 to determine if motion detected by the A/V device 210 occurred within one of the motion zone(s) 424. Furthermore, in some examples, the client device 214, 216 may analyze the motion data 412, the image data 406, and/or the input data 410 to determine if the A/V device 210 detected one of the type(s) of events 426. For example, the client device 214, 216 may analyze the motion data 412, the image data 406, and/or the input data 410 to determine if the A/V device 210 detected motion of an object and/or the A/V device 210 received an input via the button 306. Moreover, in some examples, the client device 214, 216 may analyze the motion data 412, the image data 406, and/or the input data 410 to determine if the A/V device 210 detected an object (and/or motion) during one of the time(s) 428.

In some examples, the client device 214, 216 may identify audio tones that are related to the setting(s) 420 and/or the characteristic(s) 512, using the processes described herein. The client device 214, 216 may then generate a list 522 that includes the audio tones. Additionally, or alternatively, in some examples, the client device 214, 216 may receive, using the network interface 604, data representing the list 522 from the backend server(s) 224 and/or the hub device. In either example, the client device 214, 216 may display a graphical user interface (GUI) 618 that includes at least a portion of the list 522 using the display 616. The client device 214, 216 may then receive, using the input interface 604, input(s) associating audio tone(s) with the A/V device 210 and/or input(s) associating audio tone(s) with the setting(s) 420. Based at least in part on the input(s), the client device 214, 216 may generate the association(s) 524.

For a first example, the client device 214, 216 may receive, using the input interface 604, an input indicating that an audio tone, from the list 522, is to be associated with the A/V device 210. Based at least in part on the input, the client device 214, 216 may generate an association 524 between the audio tone and the A/V device 210. For a second example, the client device 214, 216 may receive, using the input interface 604, an input indicating that an audio tone, from the list 522, is to be associated with the type(s) of objects 422. Based at least in part on the input, the client device 214, 216 may generate an association 524 between the audio tone and the type(s) of objects 422. For a third example, the client device 214, 216 may receive, using the input interface 604, an input indicating that an audio tone, from the list 522, is to be associated with a motion zone 424. Based at least in part on the input, the client device 214, 216 may generate an association 524 between the audio tone and the motion zone 424.

The client device 214, 216 may then use the association(s) 524 to provide notifications. For a first example, the client device 214, 216 may receive, using the network interface 610, a message 416 indicating that the A/V device 210 detected motion of an object 134. Based at least in part on the message 416, the client device 214, 216 may determine that there is an association 524 between the A/V device 210 and an audio tone. The client device 214, 216 may then output the audio tone using speaker(s) 608. For a second example, the client device 214, 216 may receive, using the network interface 610, a message 416 indicating that the A/V device 210 detected motion within a motion zone 424. Based at least in part on the message 416, the client device 214, 216 may determine that there is an association 524 between the motion zone 424 and an audio tone. The client device 214, 216 may then output the audio tone using the speaker(s) 608.

For a third example, the client device 214, 216 may receive, using the network interface 610, image data 406 generated by the A/V device 210. The client device 214, 216 may then analyze the image data 406 to determine that the image data 406 represents a type of object 422. Based at least in part on the determination, the client device 214, 216 may determine that there is an association 524 between the type of object 422 and an audio tone. The client device 214, 216 may then output the audio tone using the speaker(s) 608. Still further, for a fourth example, the client device 214, 216 may receive, using the network interface 610, input data 410 generated by the A/V device 210. The client device 214, 216 may then analyze the input data 410 to determine that the A/V device 210 received an input via the button 306. Additionally, the client device 214, 216 may determine that a type of event 426 includes the A/V device 210 receiving inputs via the button 306. Based at least in part on the determination, the client device 214, 216 may determine that there is an association 524 between the type of event 426 and an audio tone. The client device 214, 216 may then output the audio tone using the speaker(s) 608.

Additionally, or alternatively, in some examples, the client device 214, 216 may provide notifications in response to receiving data from the backend server(s) 224, the hub device 202, and/or another device. For a first example, the client device 214, 216 may receive, using the network interface 610, audio tone data 520 from the backend server(s) 224. The client device 214, 216 may then output, using the speaker(s) 608, the audio tone represented audio tone data 520. For a second example, the client device 214, 216 may receive, using the network interface 610, data 528 from the backend server(s) 224, where the data 528 indicates an audio tone to be output by the client device 214, 216. Based at least in part on receiving the data 528, the client device 214, 216 may identify audio tone data 520 that represents the audio tone. The client device 214, 216 may then output, using the speaker(s) 608, the audio tone represented audio tone data 520.

In some examples, the client device 214, 216 may further cause one or more other electronic devices to provide notifications. For a first example, the client device 214, 216 may transmit, using the network interface 610, data to the hub device 202 that causes the hub device 202 to output the audio tone. In some examples, the data may include the audio tone data 520 representing the audio tone. In some examples, such as when the hub device 202 stores the audio tone data 520 representing the audio tone, the data may include data 528 (and/or a message 416) that causes the hub device 202 to output the audio tone (e.g., the data 528 and/or the message 416 may include a command to output the audio tone). For a second example, the client device 214, 216 may transmit, using the network interface 610, data to an additional A/V device 210 that causes the additional A/V device 210 to output the audio tone. In some examples, the data may include the audio tone data 520 representing the audio tone. In some examples, such as when the additional A/V device 210 stores the audio tone data 520 representing the audio tone, the data may include data 528 (and/or a message 416) that causes the hub device 202 to output the audio tone (e.g., the data 528 and/or the message 416 may include a command to output the audio tone).

For a third example, the client device 214, 216 may transmit, using the network interface 610, data 528 (which may be via the hub device 202 and/or the backend server(s) 224) to a device that includes a display (e.g., a television), where the data 528 causes the device to display content indicating that the A/V device 210 detected an object (and/or motion) and/or indicating that one of the setting(s) 420 has been satisfied. For a fourth example, the client device 214, 216 may transmit, using the network interface 504, data 528 (which may be via the hub device 202 and/or the backend server(s) 224) to an electronic device 230 that causes the electronic device 230 to activate (e.g., provide power to, cause to emit light, etc.) the light emitters 232. For a fifth example, the client device 214, 216 may transmit, using the network interface 504, data 528 (which may be via the hub device 202 and/or the backend server(s) 224) to the light emitters 232 that causes the light emitters 232 to activate (e.g., emit light).

Figure 7:
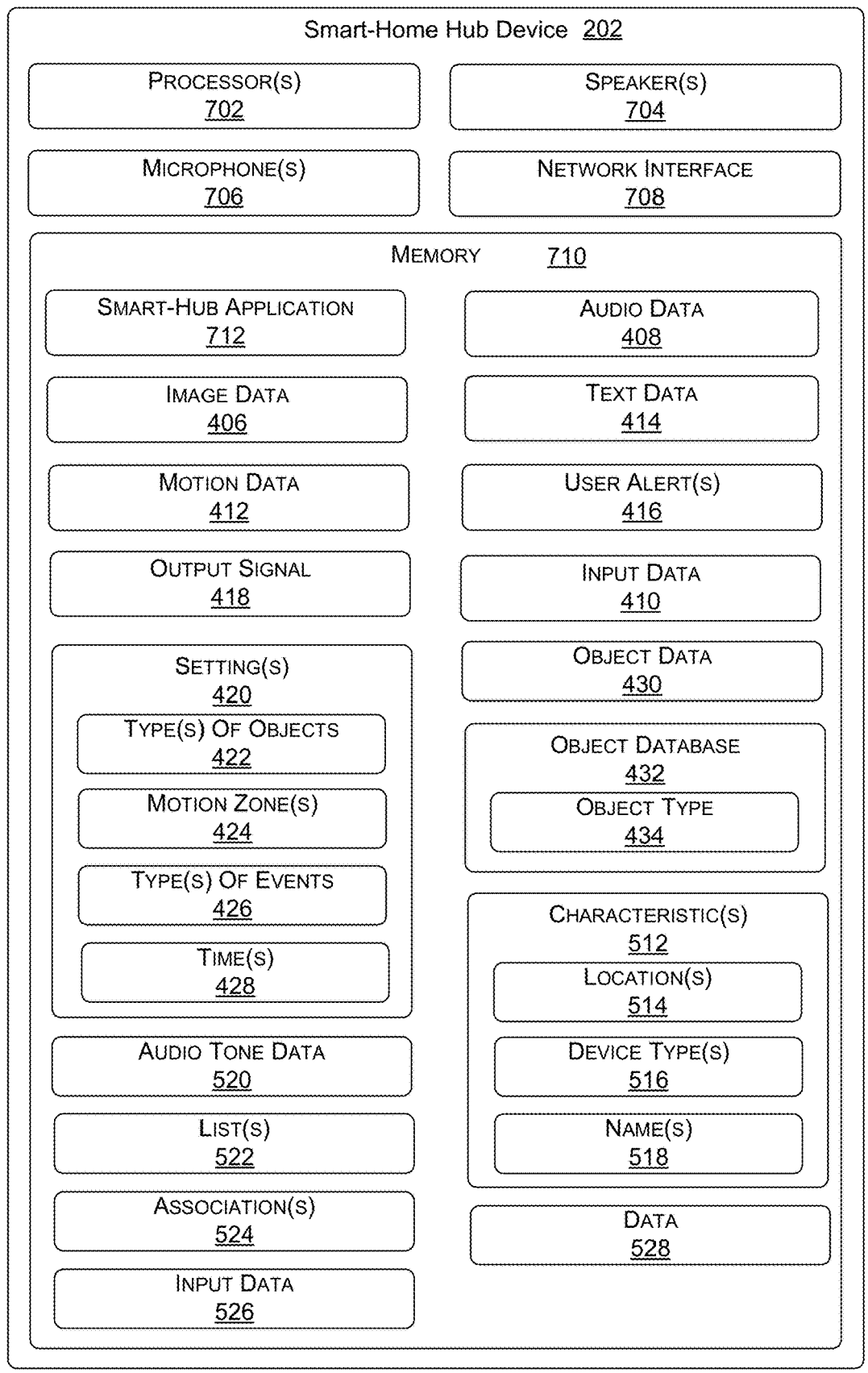
FIG. 7 is a functional block diagram illustrating one example embodiment of a hub device, according to various aspects of the present disclosure.

FIG. 7 is a functional block diagram illustrating an embodiment of the smart-home hub device 202 (alternatively referred to herein as the "hub device 202") according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. In some examples, the hub device 202 may include the functionality of a light controller, a light bridge, a transformer, an LED driver, a ballast, and/or the like. For example, in some embodiments, the hub device 202 may include the components, features, and/or functionality of the electronic device 230. The hub device 202 may comprise processor(s) 702 (which may be similar to, and/or include similar functionality as, the processor(s) 310) that are operatively connected to speaker(s) 704 (which may be similar to, and/or include similar functionality as, the speaker(s) 330), microphone(s) 706 (which may be similar to, and/or include similar functionality as, the microphone(s) 328), a network interface 708 (which may be similar to, and/or include similar functionality as, the network interface 312), and memory 710 (which may be similar to, and/or include similar functionality as, the memory 402). In some embodiments, the hub device 202 may further comprise one or more cameras (not shown). In some embodiments, the hub device 202 may not include one or more of the components shown in FIG. 7, such as the speaker(s) 704 and/or the microphone(s) 706.

As shown in the example of FIG. 7, the memory 710 stores a smart-home hub application 712. In various embodiments, the smart-home hub application 712 may include instructions that, when executed by the processor(s) 702, cause the processor(s) 702 to receive the sensor data from the sensors 204, the automation devices 206, the A/V device 210, and/or the electronic device 230. For example, the sensor data may include a current state (e.g., opened/closed for door and window sensors, motion detected for motion sensors, living room lights on/off for a lighting automation system, etc.) of each of the sensors 204 and/or the automation devices 206. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors 204 and/or the automation devices 206 as well as any updates to the current state based at least in part on sensor triggers.

With further reference to FIG. 7, the smart-home hub application 712 may include instructions that, when executed by the processor(s) 702, cause the processor(s) 702 to receive the audio data 408, the text data 414, the image data 406, the input data 410, and/or the messages 416 from the A/V device 210 (in some embodiments, via the backend server(s) 224) using the network interface 708. For example, the hub device 202 may receive and/or retrieve (e.g., after receiving a signal from the A/V device 210 that the A/V device 210 has been activated) the audio data 408, the text data 414, the image data 406, and/or the input data 410 from the A/V device 210 and/or the backend server(s) 224 in response to motion being detected by the A/V device 210.

The smart-hub application 712 may also include instructions that, when executed by the processor(s) 602, cause the processor(s) 602 to transmit, using the network interface 708, the audio data 408, the text data 414, the image data 406, the input data 410, and/or the messages 416 to the client device 214, 216 and/or the backend server(s) 224.

As described herein, at least some of the processes of the A/V device 210, the backend server(s) 224, and/or the client device 214, 216 may be executed by the hub device 202. For example, the hub device 202 may analyze the image data 406 (e.g., using computer vision and/or image processing) in order to determine if the image data 406 represents an object and/or determine the type of object 434 represented by the image data 406. In some examples, the hub device 202 analyzes the image data 406 using the object database 432. In some examples, the hub device 202 may then determine whether the type of object 434 represented by the image data 406 corresponds to a type of object 422 as indicated by the setting(s) 420.

Additionally, in some examples, the hub device 202 may analyze the motion data 412 and/or the image data 406 to determine if motion detected by the A/V device 210 occurred within one of the motion zone(s) 424. Furthermore, in some examples, the hub device 202 may analyze the motion data 412, the image data 406, and/or the input data 410 to determine if the A/V device 210 detected one of the type(s) of events 426. For example, the hub device 202 may analyze the motion data 412, the image data 406, and/or the input data 410 to determine if the A/V device 210 detected motion of an object and/or the A/V device 210 received an input via the button 306. Moreover, in some examples, the hub device 202 may analyze the motion data 412, the image data 406, and/or the input data 410 to determine if the A/V device 210 detected an object (and/or motion) during one of the time(s) 428.

In some examples, the hub device 202 may receive, using the network interface 708, data representing the setting(s) 420 and/or data representing the characteristic(s) 512 from the A/V device 210, the client device 214, 216, the backend server(s) 224, and/or another device. The hub device 202 may then identify audio tones that are related to the setting(s) 420 and/or the characteristic(s) 512 and generate a list 522 that includes the audio tones. After generating the list 522, the hub device 202 may transmit, using the network interface 708, data representing the list 522 to the client device 214, 216 (which may be via the backend server(s) 224). In some examples, the hub device 202 may then receive, using the network interface 708, data representing the association(s) 524 from the client device 214, 216 (which may be via the backend server(s) 224). Additionally, or alternatively, in some examples, the hub device 202 may receive, using the network interface 708, input data 526 representing the input(s) from the client device 214, 216 (which may be via the backend server(s) 224). The hub device 202 may then generate the association(s) 524 based at least in part on the input data 526, using the processes described herein.

The hub device 202 may then use the association(s) 524 to notify a user when an event occurs with the A/V device 210. For a first example, the hub device 202 may receive, using the network interface 708, data (image data 406, motion data 412, input data 410, etc.) indicating that the A/V device 210 detected motion. Based at least in part on the data, the hub device 202 may determine that there is an association 524 between the A/V device 210 and an audio tone. The hub device 202 may then transmit, using the network interface 708, data to the client device 214, 216 (which may be via the backend server(s) 224) that causes the client device 214, 216 to output the audio tone. In some examples, the data may include the audio tone data 520 representing the audio tone. In some examples, such as when the client device 214, 216 stores the audio tone data 520 representing the audio tone, the data may include data 528 (and/or a message 416) that causes the client device 214, 216 to output the audio tone (e.g., the data 528 and/or message 416 may include a command to output the audio tone). In some examples, the hub device 202 may further output the audio tone using the speaker(s) 704.

For a second example, the hub device 202 may receive, using the network interface 708, data (image data 406, motion data 412, input data 410, etc.) indicating that the A/V device 210 detected motion within a motion zone 424. Based at least in part on the data, the hub device 202 may determine that there is an association 524 between the motion zone 424 and an audio tone. The hub device 202 may then transmit, using the network interface 708, data to the client device 214, 216 (which may be via the backend server(s) 224) that causes the client device 214, 216 to output the audio tone. In some examples, the data may include the audio tone data 520 representing the audio tone. In some examples, such as when the client device 214, 216 stores the audio tone data 520 representing the audio tone, the data may include data 528 (and/or a message 416) that causes the client device 214, 216 to output the audio tone (e.g., the data 528 and/or the message 416 may include a command to output the audio tone). In some examples, the hub device 202 may further output the audio tone using the speaker(s) 704.

In some examples, the hub device 202 may further cause one or more other electronic devices to provide notifications. For a first example, the hub device 202 may transmit, using the network interface 708, data to an additional A/V device 210 that causes the additional A/V device 210 to output the audio tone. In some examples, the data may include the audio tone data 520 representing the audio tone. In some examples, such as when the additional A/V device 210 stores the audio tone data 520 representing the audio tone, the data may include data 528 (and/or a message 416) that causes the additional A/V device 210 to output the audio tone (e.g., the data 528 and/or the message 416 may include a command to output the audio tone). For a second example, the hub device 202 may transmit, using the network interface 708, data 528 (which may be via the backend server(s) 224) to a device that includes a display (e.g., a television), where the data 528 causes the device to display content indicating that the A/V device 210 detected an object (and/or motion) and/or indicating that one of the setting(s) 420 has been satisfied. For a third example, the hub device 202 may transmit, using the network interface 708, data 528 (which may be via the backend server(s) 224) to an electronic device 230 that causes the electronic device 230 to activate (e.g., provide power to, cause to emit light, etc.) the light emitters 232. For a fourth example, the hub device 202 may transmit, using the network interface 708, data 528 (which may be via the backend server(s) 224) to the light emitters 232 that causes the light emitters 232 to activate (e.g., emit light).

Figure 8:
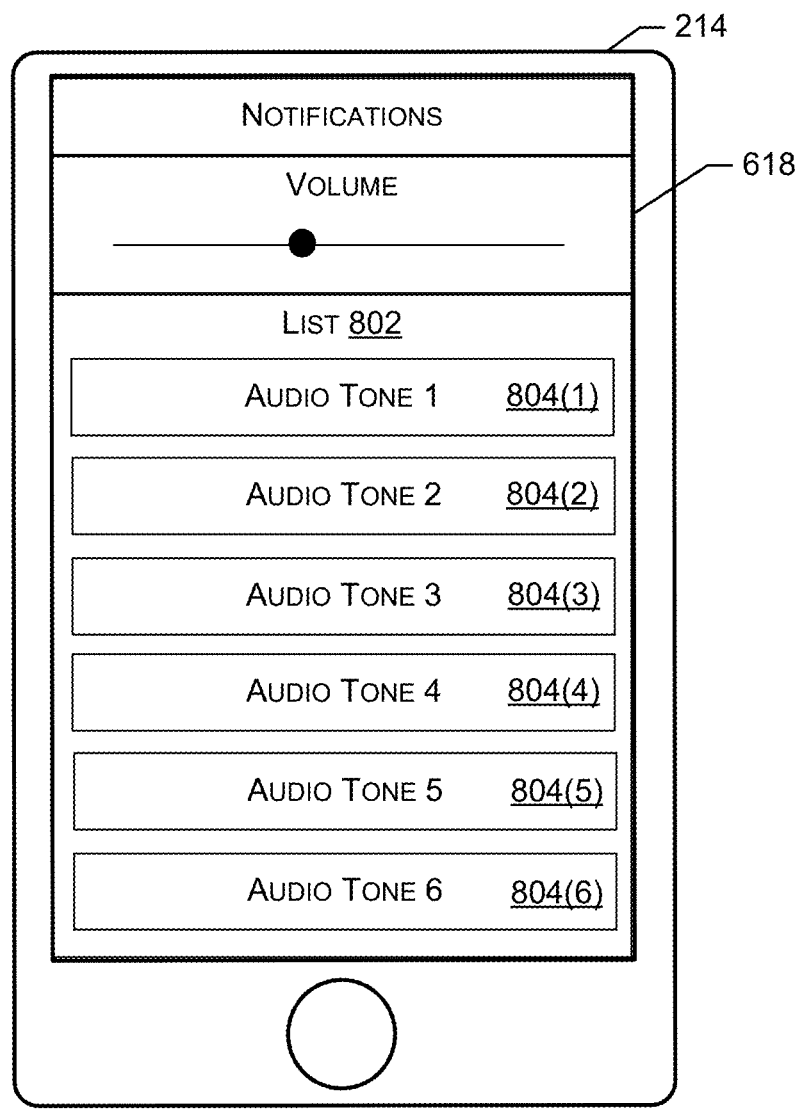
FIG. 8 is a schematic diagram illustrating one example embodiment of a client device displaying a list of audio tones, according to various aspects of the present disclosure.

FIG. 8 is an example of the client device 214 displaying a GUI 618 that includes a list 802 (which may represent one of the list(s) 522) of audio tones, according to various aspects of the present disclosure. As shown, the list 802 includes six different audio tones 804(1)-(6) for selection. One or more of the audio tones 804(1)-(6) may be related to the setting(s) 420 and/or the characteristic(s) 512 associated with the A/V device 210. While displaying the list 802, the client device 214 may receive an input selecting one of the audio tones 804(1)-(6), such as the third audio tone 804(3). In some examples, based at least in part on the selection, the client device 214 may then generate an association 524 between the third audio tone 804(3) and the A/V device 210. Additionally, or alternatively, in some examples, based at least in part on the selection, the client device 214 may transmit input data 526 representing the input to the backend server(s) 224 and/or the hub device 202, where the input data 526 indicates the selection of the third audio tone 804(3).

Figure 9B:
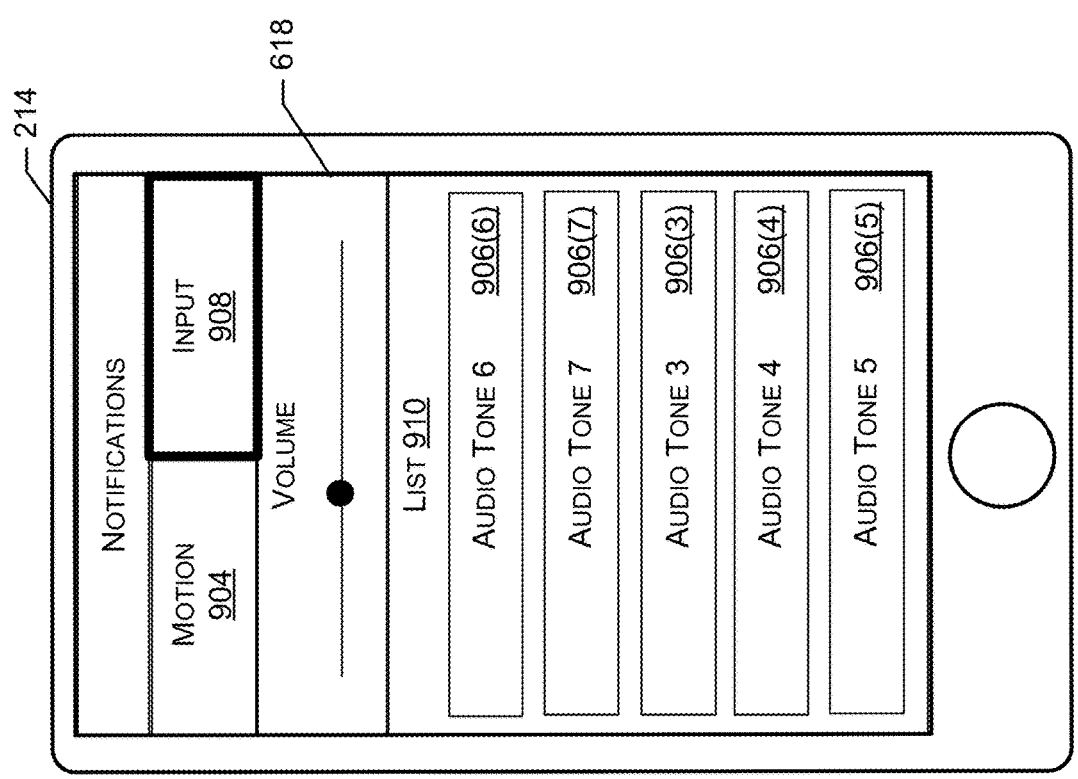
FIGS. 9A-9B are schematic diagrams illustrating example embodiments of a client device displaying lists of audio tones for different types of events, according to various aspects of the present disclosure.
Figure 9A:
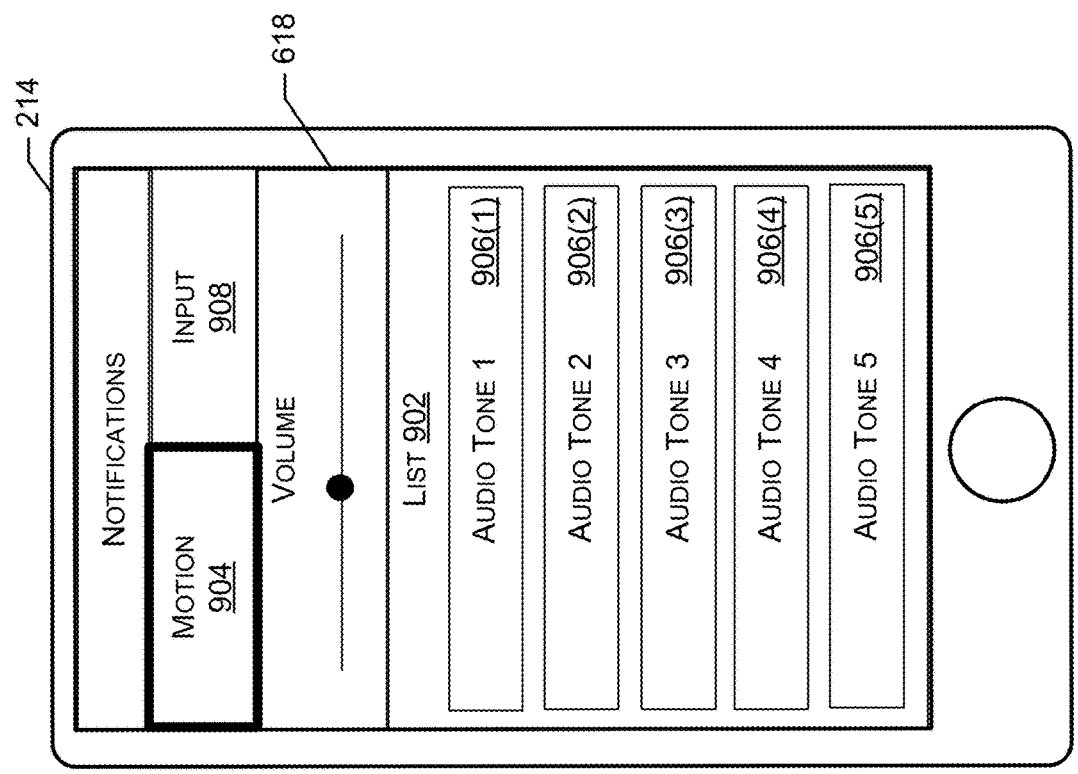

FIGS. 9A-9B are examples of the client device 214 displaying a GUI 618 that includes lists of audio tones for different types of events 426, according to various aspects of the present disclosure. For example, and as illustrated in FIG. 9A, the client device 214 may display a list 902 (which may represent one of the list(s) 522) that is associated with a first type of event 426, such as motion 904 being detected by the A/V device 210. As shown, the list 902 for the first type of event 426 includes five audio tones 906(1)-(5). In the example of FIG. 9A, one or more of the audio tones 906(1)-(5) are related to the first type of event 426. For example, at least the first audio tone 906(1) and the second audio tone 906(2) are related to motion 904 being detected by the A/V device 210. While displaying the list 902, the client device 214, 216 may receive an input selecting one of the audio tones 906(1)-(5), such as the first audio tone 906(1). In some examples, based at least in part on the selection, the client device 214 may then generate an association 524 between the first audio tone 906(1) and the first type of event 426. Additionally, or alternatively, in some examples, based at least in part on the selection, the client device 214 may transmit input data 526 representing the input to the backend server(s) 224 and/or the hub device 202, where the input data 526 indicates the selection of the first audio tone 906(1) for the first type of event 426.

In the example of FIG. 9B, the client device 214 may have received an input selecting a second type of event 426, such as input 908 being received by the A/V device 210. In response, the client device 214 may display a new list 910 (which may represent one of the list(s) 522) that is associated with the second type of event 426. As shown, the list 910 for the second type of event 426 includes five audio tones 906(1)-(3), 906(6), 906(7). In the example of FIG. 9B, one or more of the audio tones 906(1)-(3), 906(6), 906(7) are related to the second type of event 426. For example, at least the sixth audio tone 906(6) and the seventh audio tone 906(7) are related to input 908 being received by the A/V device 210. While displaying the list 910, the client device 214, 216 may receive an input selecting one of the audio tones 906(1)-(3), 906(6), 906(7), such as the sixth audio tone 906(6). In some examples, based at least in part on the selection, the client device 214 may then generate an association 524 between the sixth audio tone 906(6) and the second type of event 426. Additionally, or alternatively, in some examples, based at least in part on the selection, the client device 214 may transmit input data 526 representing the input to the backend server(s) 224 and/or the hub device 202, where the input data 526 indicates the selection of the sixth audio tone 906(6) for the second type of event 426.

Figure 10A:
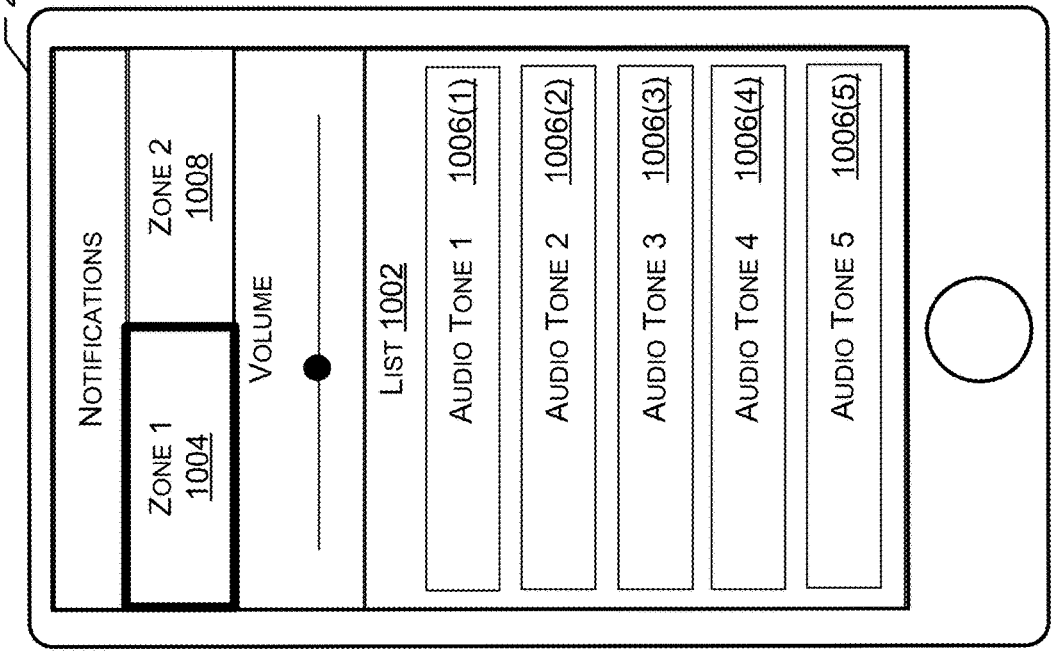
FIGS. 10A-10B are schematic diagrams illustrating example embodiments of a client device displaying lists of audio tones for different motion zones, according to various aspects of the present disclosure.
Figure 10B:
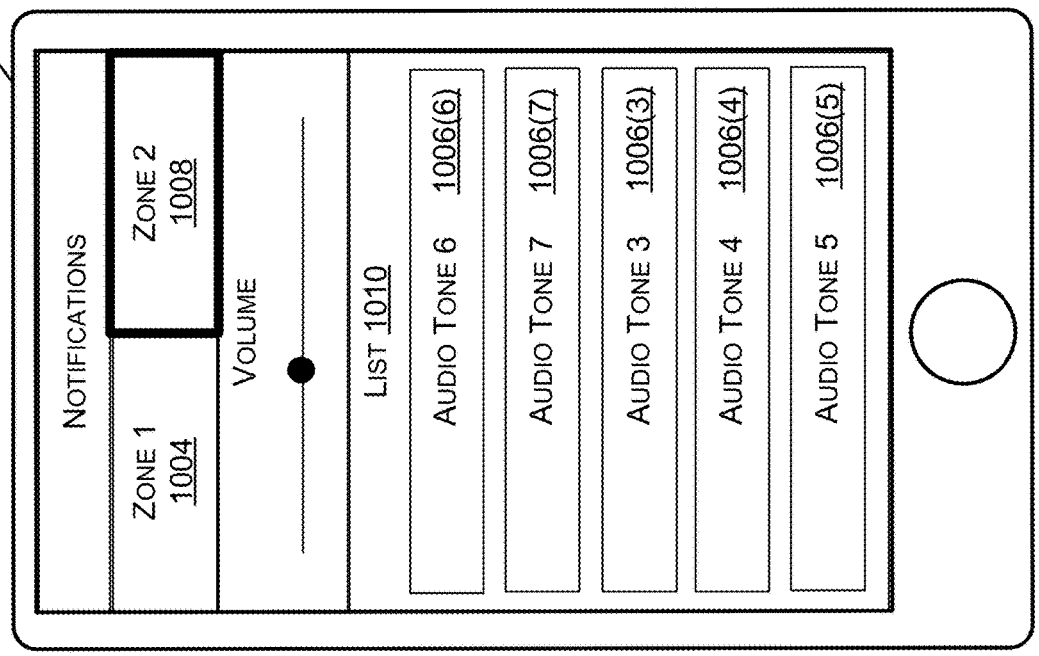

FIGS. 10A-10B are examples of the client device 214 displaying lists of audio tones for different motion zones, according to various aspects of the present disclosure. For example, and as illustrated in FIG. 10A, the client device 214 may display a list 1002 (which may represent one of the list(s) 522) that is associated with a first motion zone 1004 (which may represent one of the motion zone(s) 424). As shown, the list 1002 for the first motion zone 1004 includes five audio tones 1006(1)-(5). In the example of FIG. 10A, one or more of the audio tones 1006(1)-(5) are related to the first motion zone 1004. For example, at least the first audio tone 1006(1) and the second audio tone 1006(2) are related to motion being detected by the A/V device 210 in the first motion zone 1004. While displaying the list 1002, the client device 214 may receive an input selecting one of the audio tones 1006(1)-(5), such as the first audio tone 1006(1). In some examples, based at least in part on the selection, the client device 214 may then generate an association 524 between the first audio tone 1006(1) and the first motion zone 1004. Additionally, or alternatively, in some examples, based at least in part on the selection, the client device 214 may transmit input data 526 representing the input to the backend server(s) 224 and/or the hub device 202, where the input data 526 indicates the selection of the first audio tone 1006(1) for the first motion zone 1004.

In the example of FIG. 10B, the client device 214 may have received an input selecting a second motion zone 1008 (which may represent one of the motion zone(s) 424). In response, the client device 214 may display a new list 1010 (which may represent one of the list(s) 522) that is associated with the second motion zone 1008. As shown, the list 1010 for the second motion zone 1008 includes five audio tones 1006(1)-(3), 1006(6), 1006(7). In the example of FIG. 10B, one or more of the audio tones 1006(1)-(3), 1006(6), 1006(7) are related to the second motion zone 1008. For example, at least the sixth audio tone 1006(6) and the seventh audio tone 1006(7) are related to motion being detected by the A/V device 210 in the second motion zone 1008. While displaying the list 1010, the client device 214 may receive an input selecting one of the audio tones 1006(1)-(3), 1006(6), 1006(7), such as the sixth audio tone 1006(6). In some examples, based at least in part on the selection, the client device 214 may then generate an association 524 between the sixth audio tone 1006(6) and the second motion zone 424. Additionally, or alternatively, in some examples, based at least in part on the selection, the client device 214 may transmit input data 526 representing the input to the backend server(s) 224 and/or the hub device 202, where the input data 526 indicates the selection of the sixth audio tone 1006(6) for the second motion zone 424.

Figure 11B:
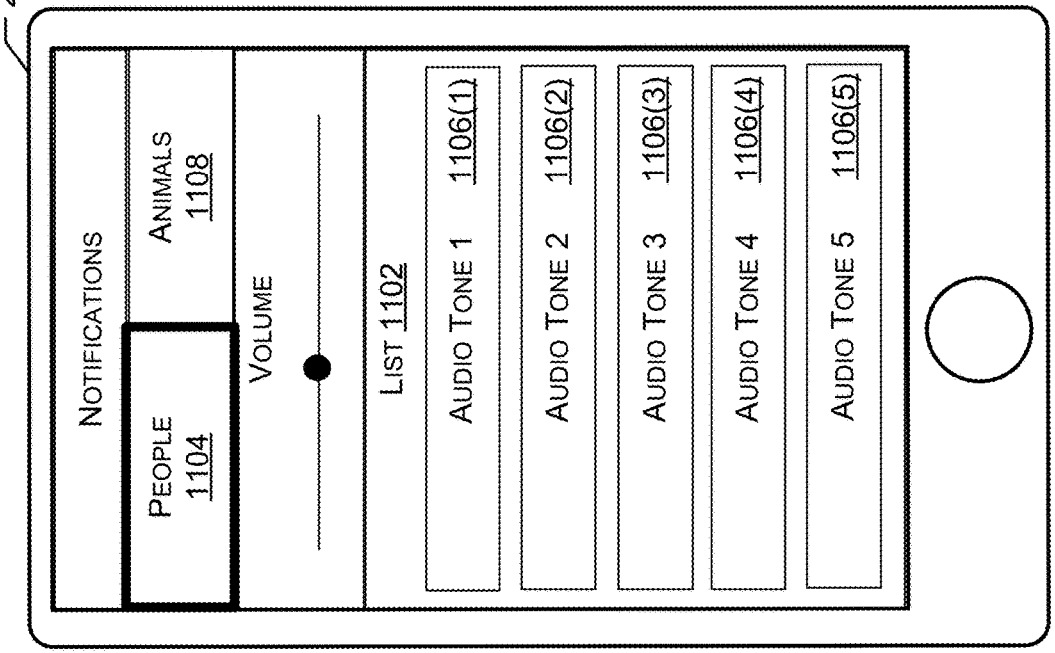
FIGS. 11A-11B are schematic diagrams illustrating example embodiments of a client device displaying lists of audio tones for different types of objects, according to various aspects of the present disclosure.
Figure 11A:
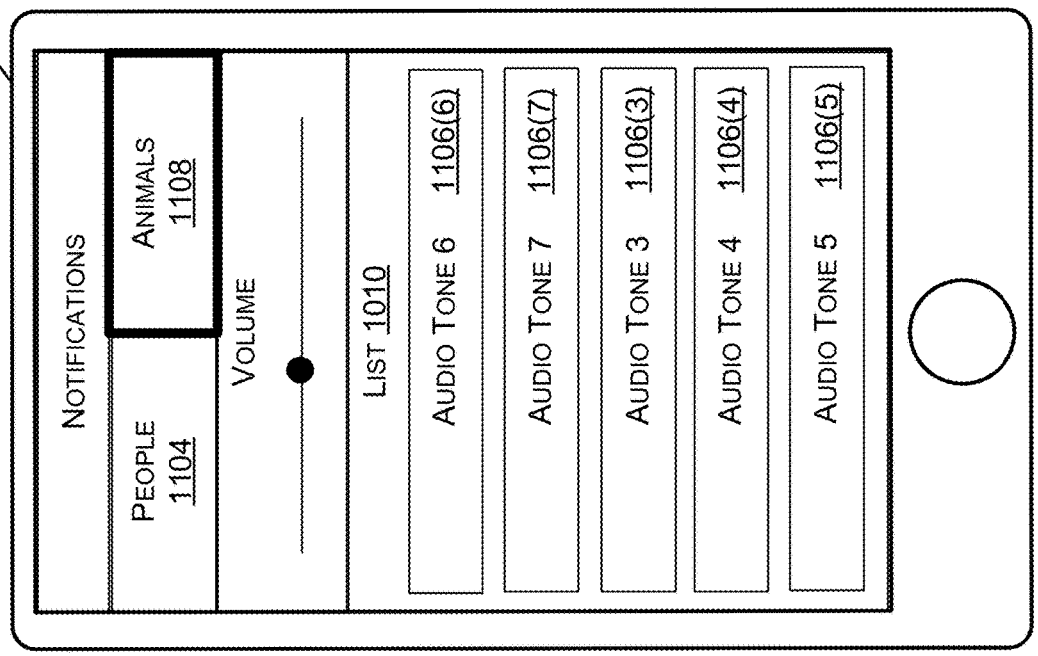

FIGS. 11A-11B are examples of the client device 214 displaying lists of audio tones for different types of objects, according to various aspects of the present disclosure. For example, and as illustrated in FIG. 11A, the client device 214 may display a list 1102 (which may represent one of the list(s) 522) that is associated with a first type of object 422, such as people 1104 being detected by the A/V device 210. As shown, the list 1102 for the first type of object 422 includes five audio tones 1106(1)-(5). In the example of FIG. 11A, one or more of the audio tones 1106(1)-(5) are related to the first type of object 422. For example, at least the first audio tone 1106(1) and the second audio tone 1106(2) are related to people 1104 being detected by the A/V device 210. While displaying the list 1102, the client device 214, 216 may receive an input selecting one of the audio tones 1106(1)-(5), such as the first audio tone 1106(1). In some examples, based at least in part on the selection, the client device 214 may then generate an association 524 between the first audio tone 1106(1) and the first type of object 422. Additionally, or alternatively, in some examples, based at least in part on the selection, the client device 214 may transmit input data 526 representing the input to the backend server(s) 224 and/or the hub device 202, where the input data 526 indicates the selection of the first audio tone 1106(1) for the first type of object 422.

In the example of FIG. 11B, the client device 214 may have received an input selecting a second type of object 422, such as animals 1108 being detected by the A/V device 210. In response, the client device 214 may display a new list 1110 (which may represent one of the list(s) 522) that is associated with the second type of object 422. As shown, the list 1110 for the second type of object 422 includes five audio tones 1106(1)-(3), 1106(6), 1106(7). In the example of FIG. 11B, one or more of the audio tones 1106(1)-(3), 1106(6), 1106(7) are related to the second type of object 422. For example, at least the sixth audio tone 1106(6) and the seventh audio tone 1106(7) are related to animals 1108 being detected by the A/V device 210. While displaying the list 1110, the client device 214, 216 may receive an input selecting one of the audio tones 1106(1)-(3), 1106(6), 1106 (7), such as the sixth audio tone 1106(6). In some examples, based at least in part on the selection, the client device 214 may then generate an association 524 between the sixth audio tone 1106(6) and the second type of object 422. Additionally, or alternatively, in some examples, based at least in part on the selection, the client device 214 may transmit input data 526 representing the input to the backend server(s) 224 and/or the hub device 202, where the input data 526 indicates the selection of the sixth audio tone 1106(6) for the second type of object 422.

Each of the processes described herein, including the processes 1200, 1300, 1400, 1500, 1600, and 1700, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 12B:
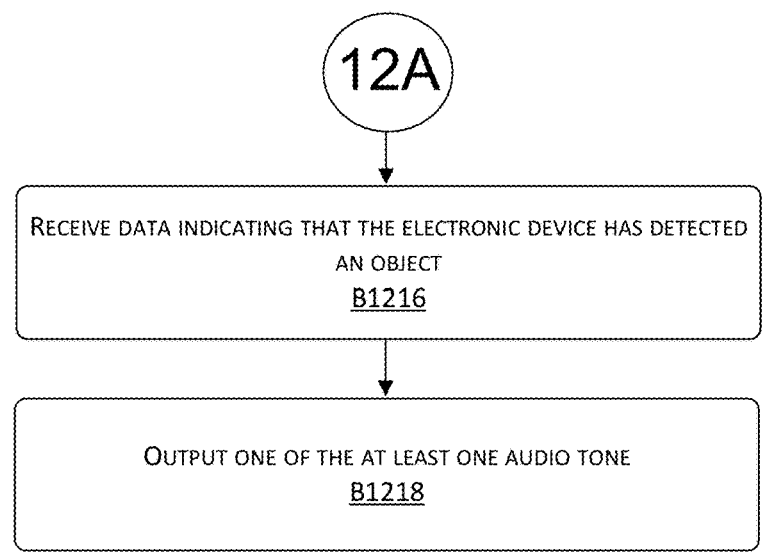

FIG. 12A-12B are a flowchart illustrating an example process 1200 of associating an audio tone with an electronic device and then outputting the audio tone based at least in part on an object being detected by the electronic device, according to various aspects of the present disclosure. The process 1200, at block B1202, includes receiving a first input representative of a first selection of an electronic device. For example, the client device 214, 216 may receive a first input indicating a selection of the A/V device 210. In some examples, the first input may be associated with selecting one or more audio tones for providing notifications when the A/V device 210 detects an object (and/or motion). In some examples, the client device 214, 216 may receive the first input via a GUI 618 displayed by the client device 214, 216.

The process 1200, at block B1204, includes identifying information associated with the electronic device. For example, the client device 214, 216 may identify information associated with the A/V device 210. The information may include setting(s) 420 and/or characteristic(s) 512 associated with the A/V device 210. In some examples, the client device 214, 216 may identify at least a portion of the information by receiving the at least the portion of the information from the A/V device 210, the backend server(s) 224, the hub device 202, and/or another device. Additionally, or alternatively, in some examples, the client device 214, 216 may identify the at least the portion of the information by receiving one or more inputs indicating the at least the portion of the information. For instance, the client device 214, 216 may receive one or more inputs during a configuration process associated with the A/V device 210.

The process 1200, at block B1206, includes determining a subset of audio tones. For example, the client device 214, 216 may determine a subset of audio tones that are related to the information associated with the electronic device (the information identified at block B1204). In some examples, the client device 214, 216 may determine the subset of audio tones by transmitting data representing the information to the backend server(s) 224 and/or the hub device 202. The client device 214, 216 may then receive, from the backend server(s) 224 and/or the hub device 202, audio tone data 520 representing the subset of the audio tones. Additionally, or alternatively, in some examples, the client device 214, 216 may determine the subset of the audio tones by analyzing the audio tone data 520 to identify the subset of the audio tones that are related to the information associated with the electronic device.

The process 1200, at block B1208, includes generating a list using the subset of the audio tones. For example, the client device 214, 216 may generate a list 522 using the subset of the audio tones. In some examples, the client device 214, 216 may generate one list 522 using the subset of the audio tones. In some examples, the client device 214, 216 may generate multiple lists 522 using the subset of the audio tones. For example, the client device 214, 216 may generate a first list 522 that includes audio tones related to the type(s) of objects 422, a second list 522 that includes audio tones related to the motion zone(s) 424, a third list 522 that includes audio tones related to the type(s) of events 426, a fourth list 522 that includes audio tones related to the time(s) 428, and/or one or more other lists.

The process 1200, at block B1210, includes displaying a graphical user interface that includes at least a portion of the list. For example, the client device 214, 216 may display a GUI 618 that includes at least a portion of the list 522 (and/or one of the generated lists 522). In some examples, the GUI 618 may be configured for associating the A/V device 210 with an audio tone. In some examples, the GUI 618 may be configured for associating one of the setting(s) 420 of the A/V device 210 with an audio tone. In such examples, the at least the portion of the list 522 may be associated with the setting 420.

The process 1200, at block B1212, includes receiving a second input representative of a second selection of at least one audio tone from the list. For example, the client device 214, 216 may receive a second input representative of the second selection of at least one audio tone from the list 522 (and/or one of the generated lists 522). In some examples, the client device 214, 216 may further receive an input indicating a setting 420 for associating the at least one audio tone with the setting 420.

The process 1200, at block B1214, includes associating the at least one audio tone with the electronic device. For example, the client device 214, 216 may generate an association 524 between the at least one audio tone and the A/V device 210. In some examples, if the GUI 618 was for associating audio tones with a setting 420, the client device 214, 216 may generate an association 524 between the at least one audio tone and the setting 420. In some examples, the client device 214, 216 may transmit, to the backend server(s) 224 and/or the hub device 202, data representing the association 524.

The process 1200, at block B1216, includes receiving data indicating that the electronic device has detected an object. For example, the client device 214, 216 may receive data indicating that the A/V device 210 has detected an object. In some examples, the data may include a message 416 that the client device 214, 216 receives from the A/V device 210, the backend server(s) 224, and/or the hub device 202, where the message 416 indicates that the A/V device 210 detected the object. In some examples, the data may include image data 406, motion data 412, and/or input data 410 generated by the A/V device 210. In any example, the client device 214, 216 may then analyze the data to determine if one or more of the setting(s) 420 of the A/V device 210 are satisfied. For example, the client device 214, 216 may analyze the message 416, the image data 406, the motion data 412, and/or the input data 410 to determine if the A/V device 210 detected one of the type(s) of objects 422, determine if the detected object (and/or the motion of the object) is within one of the motion zone(s) 424, determine if the A/V device 210 detected one of the type(s) of events 426, and/or determine if the A/V device 210 detected the object (and/or the motion) during one of the time(s) 428.

The process 1200, at block B1218, includes outputting one of the at least one audio tone. For example, the client device 214, 216 may output, using the speaker(s) 608, the audio tone from the at least one audio tone. In some examples, if the audio tone is associated with the A/V device 214, 216, the client device 214, 216 may output the audio tone based at least in part on receiving the data. In some examples, if the audio tone is associated with a setting 420, the client device 214, 216 may first determine that the setting 420 is satisfied using the data. The client device 214, 216 may then output the audio tone based at least in part on determining that the setting 420 is satisfied.

Even though the above description for the process 1200 includes the client device 214, 216 performing each of the blocks B1202-B1218, in some examples, one or more of the blocks B1202-B1218 may be performed by another device. For example, one or more of the blocks B1202-B1218 may be performed by the backend server(s) 224, the hub device 202, the A/V device 210, the VA device 208, and/or any other device.

FIG. 13 is a flowchart illustrating an example process 1300 for associating an audio tone with an electronic device, according to various aspects of the present disclosure. The process 1300, at block B1302, includes determining a type of an electronic device. For example, the client device 214, 216 may determine the type of device 516 associated with the A/V device 210. The type of device 516 may include, but is not limited to, a security camera, a light camera (e.g., floodlight cameras, spotlight cameras, etc.), a video doorbell, and/or the like. In some examples, the client device 214, 216 determines the type of device 516 by receiving an input (e.g., from a user) indicating the type of device 516. In some examples, the client device 214, 216 determines the type of device 516 by receiving, from the backend server(s) 224, the hub device 202, and/or the A/V device 210, data indicating the type of device 516. In some examples, the client device 214, 216 determines the type of device 516 during a configuration process for the A/V device 210.

The process 1300, at block B1304, includes determining a name of the electronic device. For example, the client device 214, 216 may determine the name 518 associated with the A/V device 210. In some examples, the name 518 may indicate functionality associated with the A/V device 210, such as the area of the property that the A/V device 210 is monitoring. In some examples, the client device 214, 216 determines the name 518 by receiving input indicating the name 518. In some examples, the client device 214, 216 determines the name 518 by receiving, from the backend server(s) 224, the hub device 202, and/or the A/V device 210, data indicating the name 518. In some examples, the client device 214, 216 determines the name 518 during a configuration process for the A/V device 210.

The process 1300, at block B1306, includes determining a setting associated with the electronic device. For example, the client device 214, 216 may determine the setting 420 associated with the A/V device 210. The setting 420 may include, but is not limited to, type(s) of objects 422, motion zone(s) 424, type(s) of events 426, time(s) 428, and/or the like. In some examples, the client device 214, 216 determines the setting 420 by receiving input indicating the setting 420. In some examples, the client device 214, 216 determines the setting 420 by receiving, from the backend server(s) 224, the hub device 202, and/or the A/V device 210, data indicating the setting 420. In some examples, the client device 214, 216 determines the setting 420 during a configuration process for the A/V device 210.

The process 1300, at block B1308, includes obtaining audio tones based at least in part on at least one of the type, the name, or the setting. For example, the client device 214, 216 may obtain audio tones based at least in part on at least one of the type of device 516, the name 518, or the setting 420. In some examples, the client device 214, 216 may obtain the audio tones by transmitting data representing the type of device 516, the name 518, and/or the setting 420 to the backend server(s) 224 and/or the hub device 202. The client device 214, 216 may then receive, from the backend server(s) 224 and/or the hub device 202, audio tone data 520 representing the audio tones. Additionally, or alternatively, in some examples, the client device 214, 216 may obtain the audio tones by searching through audio tones represented by the audio tone data 520 to identify audio tones that are related to the type of device 516, the name 518, or the setting 420.

The process 1300, at block B1310, includes generating a list using the audio tones. For example, the client device 214, 216 may generate a list 522 using the audio tones. In some examples, the client device 214, 216 may generate one list 522 using the audio tones. In some examples, the client device 214, 216 may generate multiple lists using the audio tones. For example, the client device 214, 216 may generate a first list 522 that includes audio tones related to the type of device 516, a second list 522 that includes audio tones related to the name 518, a third list 522 that includes audio tones related to the setting 420, and/or one or more other lists.

The process 1300, at block B1312, includes displaying at least a portion of the list. For example, the client device 214, 216 may display a GUI 618 that includes at least a portion of the list 522 (and/or one of the generated lists 522). In some examples, the GUI 618 may be configured for associating the A/V device 210 with an audio tone. In some examples, the GUI 618 may be configured for associating the setting 420 of the A/V device 210 with an audio tone.

The process 1300, at block B1314, includes receiving an input selecting an audio tone from the list. For example, the client device 214, 216 may receive an input representative of a selection of an audio tone from the list 522 (and/or one of the generated lists 522). In some examples, the client device

214, 216 may further receive an input indicating a setting 420 for associating the audio tone with the setting 420.

The process 1300, at block B1316, includes associating the selected audio tone with at least one of the electronic device or the setting. For example, the client device 214, 216 may generate an association 524 between the audio tone and at least one of the A/V device 210 or the setting 420. In some examples, the client device 214, 216 may transmit, to the backend server(s) 224 and/or the hub device 202, data representing the association 524.

Even though the above description for the process 1300 includes the client device 214, 216 performing each of the blocks B1302-B1316, in some examples, one or more of the blocks B1302-B1316 may be performed by another device. For example, one or more of the blocks B1302-B1316 may be performed by the backend server(s) 224, the hub device 202, the A/V device 210, the VA device 208, and/or any other device.

FIGS. 14A-14B are a flowchart of a first example process 1400 for network device(s) associating an audio tone with an electronic device and then causing a client device to output the audio tone, according to various aspects of the present disclosure. The process 1400, at block B1402, includes receiving, from a client device, first data representing a request for audio tones. For example, the backend server(s) 224 (and/or the hub device 202) may receive, from the client device 214, 216, first data representing a request for audio tones. In some examples, the backend server(s) 224 (and/or the hub device 202) may receive the first data during a configuration process of the A/V device 210.

The process 1400, at block B1404, includes determining information associated with an electronic device. For example, based at least in part on the first data, the backend server(s) 224 (and/or the hub device 202) may determine information associated with the A/V device 210. The information may include setting(s) 420 (e.g., type(s) of objects 422, motion zone(s) 424, type(s) of events 426, time(s) 428, etc.) and/or characteristic(s) 512 (e.g., location(s) 514, device type(s) 516, name(s) 518, etc.) associated with the A/V device 210. In some examples, the backend server(s) 224 (and/or the hub device 202) determines the information by receiving data representing the information from the client device 214, 216, the A/V device, and/or another device. In some examples, the backend server(s) 224 (and/or the hub device 202) determines the information by retrieving the information from the memory 402 (and/or another database).

The process 1400, at block B1406, includes selecting at least a first audio tone and a second audio tone based at least in part on the determined information. For example, the backend server(s) 224 (and/or the hub device 202) may select at least the first audio tone and the second audio tone based at least in part on the determined information. In some examples, the backend server(s) 224 (and/or the hub device 202) may select the first audio tone and the second audio tone by analyzing the audio tone data 520 and, based at least in part on the analysis, selecting audio tones that are related to the determined information. For example, the first audio tone and/or the second audio tone may be related to the setting(s) 420 and/or the characteristic(s) 512.

The process 1400, at block B1408, includes generating a list using the first audio tone and the second audio tone. For example, the backend server(s) 224 (and/or the hub device 202) may generate the list 522 using the first audio tone and the second audio tone. In some examples, the list 522 may be associated with the A/V device 210. In some examples, the list 522 may be associated with a portion of the information. For example, the list 522 may be associated with one of the setting(s) 420, such as the type(s) of objects 422, the motion zone(s) 424, the type(s) of events 426, and/or the time(s) 428.

The process 1400, at block B1410, includes transmitting, to the client device, second data representing the list. For example, the backend server(s) 224 (and/or the hub device 202) may transmit, to the client device 214, 216, the second data representing the list 522.

The process 1400, at block B1412, includes receiving, from the client device, third data representing a selection of the first audio tone. For example, the backend server(s) 224 (and/or the hub device 202) may receive, from the client device 214, 216, the third data representing a selection of the first audio tone. In some examples, the second data may include input data 526 representing an input received by the client device 214, 216, where the input includes a selection of the first audio tone. In such examples, the backend server(s) 224 (and/or the hub device 202) may then generate an association 524 between the first audio tone and the A/V device (and/or the setting 420). In some examples, the third data may include data representing an association 524 between the first audio tone and the A/V device 210 (and/or the setting 420).

The process 1400, at block B1414, includes transmitting fourth data representing the first audio tone to at least one device. For example, the backend server(s) 224 (and/or the hub device 202) may transmit audio tone data 520 representing the first audio tone to at least one device. The at least one device may include, but is not limited to, the A/V device 210, another A/V device 210, the hub device 202, the VA device 208, and/or the client device 214, 216. In some examples, the backend server(s) 224 (and/or the hub device 202) may further transmit data representing the association 524 to the at least one device.

The process 1400, at block B1416, includes receiving fifth data indicating that the electronic device has detected an object. For example, the backend server(s) 224 (and/or the hub device 202) may receive the fifth data indicating that the A/V device 210 has detected an object. In some examples, the fifth data may include a message 416 that the backend server(s) 224 (and/or the hub device 202) receive from the A/V device 210, where the message 416 indicates that the A/V device 210 detected the object. In some examples, the fifth data may include image data 406, motion data 412, and/or input data 410 generated by the A/V device 210. In either example, the backend server(s) 224 (and/or the hub device 202) may then analyze the fifth data to determine if the setting 420 is satisfied. For example, the backend server(s) 224 (and/or the hub device 202) may analyze the message 416, the image data 406, the motion data 412, and/or the input data 410 to determine if the A/V device 210 detected one of the type(s) of objects 422, determine if the object (and/or the motion of the object) is within one of the motion zone(s) 424, determine if the A/V device 210 detected one of the type(s) of events 426, and/or determine if the A/V device 210 detected the object during one of the time(s) 428.

The process 1400, at block B1418, includes transmitting sixth data to the at least one device that causes the at least one device to output the first audio tone. For example, the backend server(s) 224 (and/or the hub device 202) may transmit the sixth data to the at least one device that causes the at least one device to output the first audio tone. In some examples, the sixth data may include a message 416 indicating that the A/V device 210 detected the object. In some examples, the sixth data may include a message 416 indicating that the setting 420 is satisfied. Still further, in some examples, the sixth data may include data 528 that includes a command to output the first audio data.

Even though the above description for the process 1400 includes the backend server(s) 224 (and/or the hub device 202) performing each of the blocks B1402-B1418, in some examples, one or more of the blocks B1402-B1418 may be performed by another device. For example, one or more of the blocks B1402-B1418 may be performed by the client device 214, 216, the A/V device 210, the VA device 208, and/or any other device.

Figure 15A:
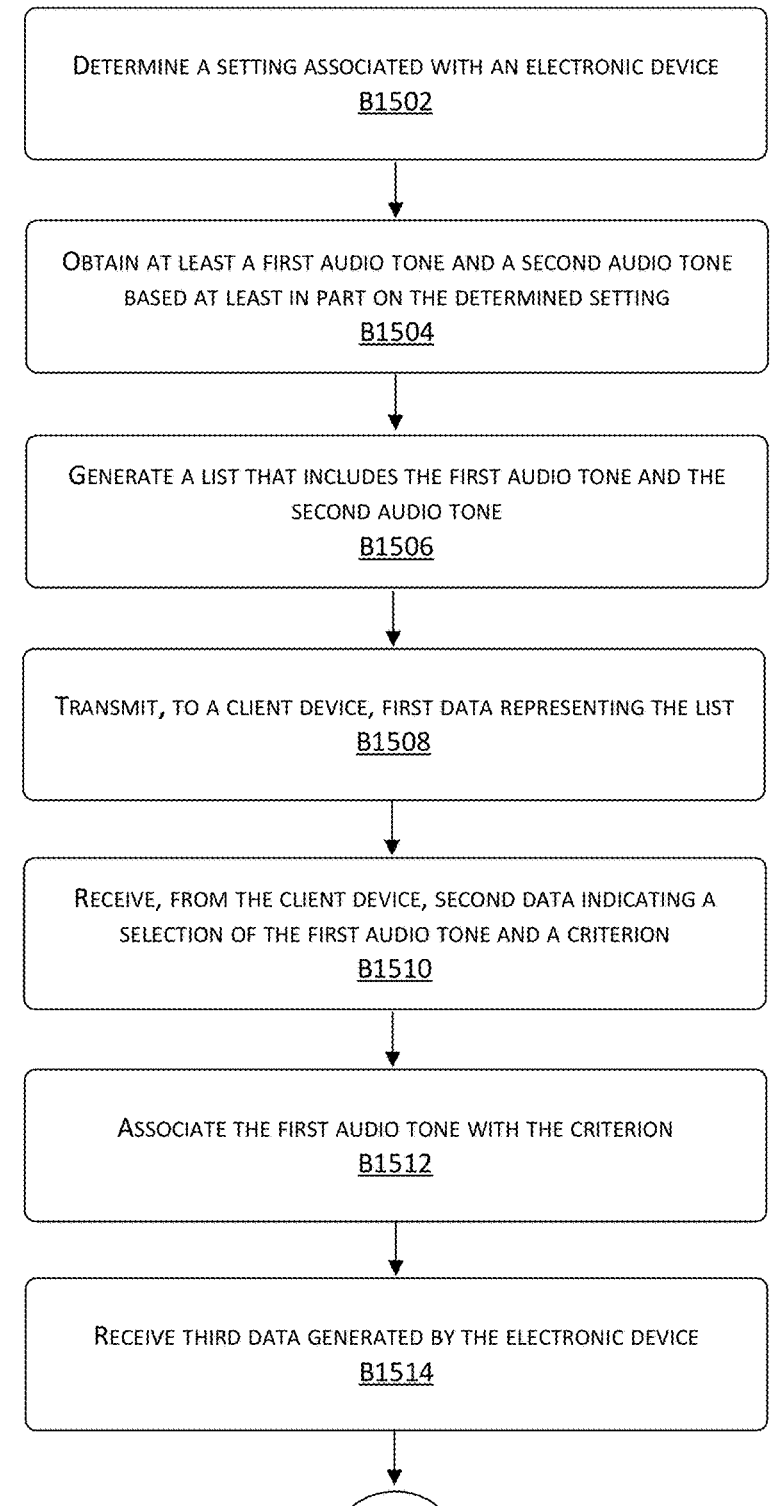

FIGS. 15A-15B are a flowchart of a second example process 1500 for network device(s) associating an audio tone with an electronic device, and then causing a client device to output the audio tone, according to various aspects of the present disclosure. The process 1500, at block B1502, includes determining a setting associated with an electronic device. For example, the backend server(s) 224 (and/or the hub device 202) may determine a setting 420 associated with the A/V device 210. The setting 420 may include type(s) of objects 422, motion zone(s) 424, type(s) of events 426, time(s) 428, and/or the like. In some examples, the backend server(s) 224 (and/or the hub device 202) may determine the setting 420 by receiving data representing the setting. In some examples, the backend server(s) 224 (and/or the hub device 202) may store data representing the setting 420.

The process 1500, at block B1504, includes obtaining at least a first audio tone and a second audio tone based at least in part on the determined setting. For example, the backend server(s) 224 (and/or the hub device 202) may obtain at least the first audio tone and the second audio tone based at least in part on the determined setting 420. In some examples, the backend server(s) 224 (and/or the hub device 202) may obtain the first audio tone and the second audio tone by analyzing a set of audio tones represented by the audio tone data 520 and, based at least in part on the analysis, selecting audio tones that are related to the determined setting 420. For example, the first audio tone and/or the second audio tone may be related to the type(s) of objects 422, the motion zone(s) 424, the type(s) of events 426, the time(s) 428, and/or the like.

The process 1500, at block B1506, includes generating a list that includes the first audio tone and the second audio tone. For example, the backend server(s) 224 (and/or the hub device 202) may generate the list 522 that includes the first audio tone and the second audio tone. In some examples, the list 522 may be associated with the A/V device 210. In some examples, the list 522 may be associated with the setting 420.

The process 1500, at block B1508, includes transmitting, to a client device, first data representing the list. For example, the backend server(s) 224 (and/or the hub device 202) may transmit, to the client device 214, 216, the first data representing the list 522.

The process 1500, at block B1510, includes receiving, from the client device, second data representing a selection of the first audio tone and a criterion. For example, the backend server(s) 224 (and/or the hub device 202) may receive, from the client device 214, 216, the second data representing a selection of the first audio tone and a criterion. In some examples, the second data may include input data 526 representing an input received by the client device 214, 216, where the input includes a selection of the first audio tone and the criterion. In some examples the criterion may include that the A/V device 210 detects an object. In some examples, the criterion may include the setting 420 being satisfied when the A/V device 210 detects an object. For example, the criterion may include that the type(s) of objects 422, the motion zone(s) 424, the type(s) of events 426, and/or the time(s) 428 are satisfied when the A/V device 210 detects an object.

The process 1500, at block B1512, includes associating the first audio tone with the criterion. For example, the backend server(s) 224 (and/or the hub device 202) may generate an association 524 between the first audio tone and the criterion.

The process 1500, at block B1514, includes receiving third data generated by the electronic device. For example, the backend server(s) 224 (and/or the hub device 202) may receive the third data generated by the electronic device. In some examples, the third data may include a message 416 that the backend server(s) 224 (and/or the hub device 202) receive from the A/V device 210, where the message 416 indicates that the A/V device 210 detected the object (and/or motion). In some examples, the third data may include image data 406, motion data 412, and/or input data 410 generated by the A/V device 210.

The process 1500, at block B1516, includes determining that the criterion is satisfied based at least in part on the third data. For example, the backend server(s) 224 (and/or the hub device 202) may determine that the criterion is satisfied based at least in part on the third data. In some examples, if the criterion includes the A/V device 210 detecting an object (and/or motion), the backend server(s) 224 (and/or the hub device 202) may determine that the criterion is satisfied based at least in part on the message 416, the image data 406, the motion data 412, and/or the input data 410 indicating that the A/V device 210 detected an object (and/or motion). In some examples, if the criterion includes the setting 420 being satisfied, the backend server(s) 224 (and/or the hub device 202) may determine that the criterion is satisfied based at least in part on the message 416, the image data 406, the motion data 412, and/or the input data 410 indicating that the A/V device 210 detected the type(s) of objects 422, detected the object (and/or motion) within the motion zone(s) 424, detected the type(s) of events 426, and/or detected the object (and/or motion) during the time(s) 428.

The process 1500, at block B1518, includes transmitting fourth data that causes the client device to output the first audio tone. For example, the backend server(s) 224 (and/or the hub device 202) may transmit, to the client device 214, 216, the fourth data that causes the client device 214, 216 to output the first audio tone. In some examples, the fourth data may include audio tone data 520 representing the first audio tone. In some examples, the fourth data may include data 528 that includes a command to output the first audio tone.

Even though the above description for the process 1500 includes the backend server(s) 224 (and/or the hub device 202) performing each of the blocks B1502-B1518, in some examples, one or more of the blocks B1502-B1518 may be performed by another device. For example, one or more of the blocks B1502-B1518 may be performed by the client device 214, 216, the A/V device 210, the VA device 208, and/or any other device.

Figure 16:
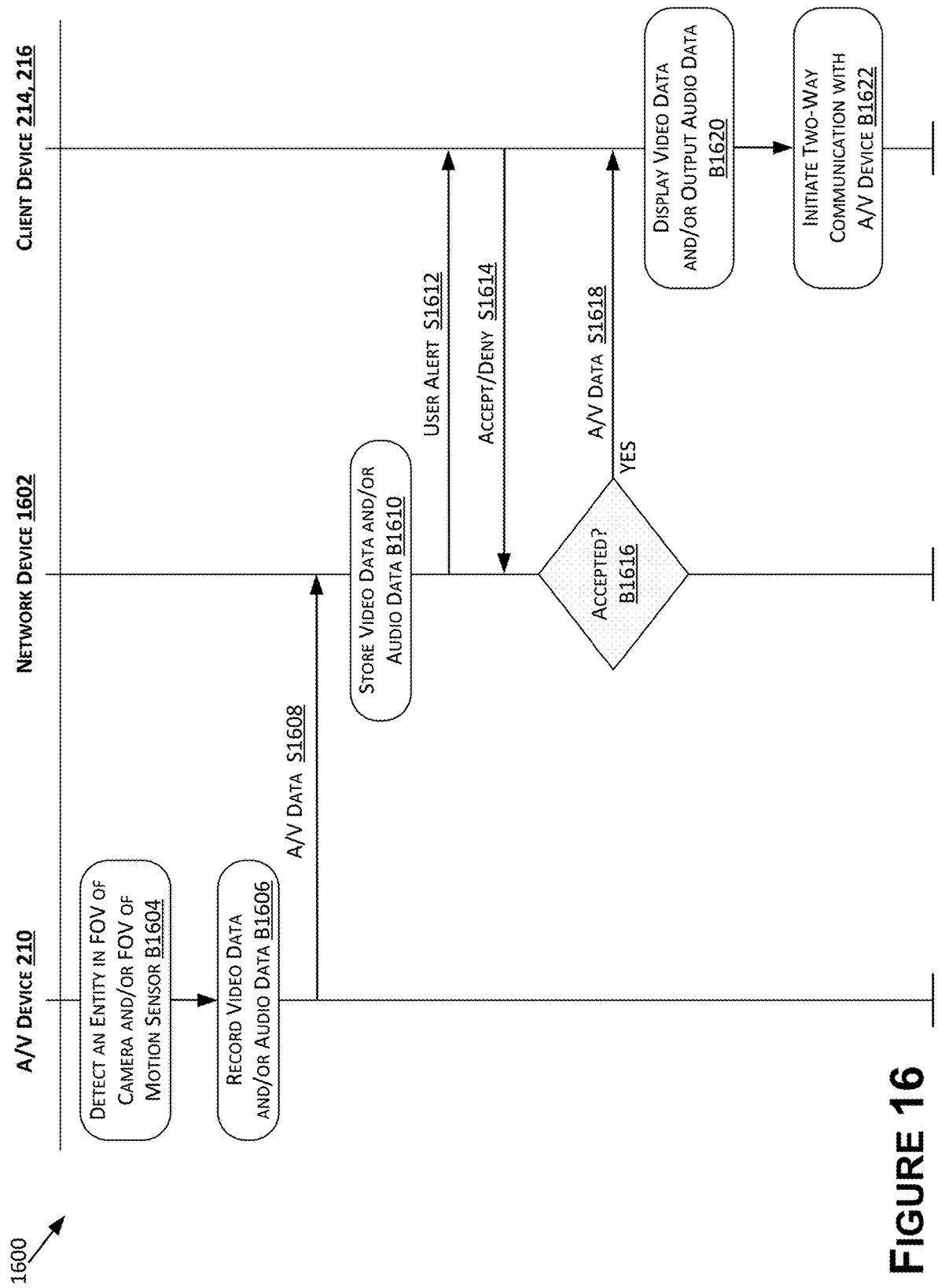
FIG. 16 is a signal diagram of a process for streaming and/or storing A/V content from an A/V recording and communication device, according to various aspects of the present disclosure.

FIG. 16 is a signal diagram of a process 1600 for streaming and storing A/V content from the A/V device 210 according to various aspects of the present disclosure. The network device 1602 may include one or more of the hub device 202, the VA device 208, and/or any of the components of the network(s) of servers/backend devices 220 (e.g., the backend server 224, the backend API 226, the storage devices 222, etc.).

The process 1600, at block B1604, includes detecting an object in a field of view of a camera and/or a field of view of a motion sensor. For example, the A/V device 210 may detect the presence of an object within a field of view of view of the motion sensor(s) 326 (e.g., a motion sensor field of view) and/or a field of view of the camera 314 (e.g., a camera field of view). To detect motion using the motion sensor(s) 326, the data type (e.g., voltage for PIR sensors) from the output signal of the motion sensor(s) 326 may be analyzed, by the processor(s) 310 of the A/V device 210, to determine whether the output signal is indicative of motion of an object that should prompt the recording of the image data 406 and/or audio data 408 at block B1606 and signal S1608. To detect motion using the camera 314, the processor(s) 310 of the A/V device 210 may analyze the image data 406 by performing, for example, a frame by frame comparison of a change in pixels, to determine whether the image data 406 is indicative of motion of an object that should prompt the recording and transmission of image data 406 and/or audio data 408 at block B1606 and signal S1608.

The process 1600, at block B1606, includes recording video data and/or audio data. For example, the processor(s) 310 of the A/V device 210 may cause the camera 314 to begin generating the image data 406 and/or the microphone(s) 328 to being recording the audio data 408.

The process 1600, at signal S1608, includes transmitting the video data and/or the audio data to a network device 1602. For example, the processor(s) 310 of the A/V device 210, using the network interface 312, may transmit the image data 406 and/or the audio data 408 to the network device 1602. In response, the network device 1602 may receive, by respective processor(s) and using respective network interface(s), the image data 406 and/or the audio data 408. In some embodiments, the image data 406 and/or the audio data 408 is transmitted to the hub device 202 and/or the VA device 208, and the hub device 202 and/or the VA device 208 may transmit (or forward) the image data 406 and/or the audio data 408 to one or more components of the network(s) of servers/backend devices 220. In either embodiment, the network device 1602 may transmit the image data 406 and/or the audio data 408 to a client device(s) 214, 216. In other embodiments, the image data 406 and/or the audio data 408 may be transmitted to the hub device 202 and/or the VA device 208, and the hub device 202 and/or the VA device 208 may transmit (or forward) the image data 406 and/or the audio data 408 to the client device(s) 214, 216. Still further, in some embodiments, the image data 406 and/or the audio data 408 may be transmitted directly to the client device(s) 214, 216 from the A/V device 210.

The process 1600, at block B1610, includes storing the video data and/or the audio data. For example, the network device 1602 may store the image data 406 and/or the audio data 408. The image data 406 and/or the audio data 408 may be stored for future access by the user(s) of the A/V device 210 (e.g., as Cloud storage). In some embodiments, the A/V device 210 may store the image data 406 and/or the audio data 408 locally (e.g., in the memory 402). In some embodiments, the image data 406 and/or the audio data 408 may not be stored, except during buffering, compression, and/or live (or near-live) streaming of the image data 406 and/or the audio data 408 to the client device(s) 214, 216. In such embodiments, at the conclusion of a motion event (e.g., when an object is no longer in the camera field of view and/or the motion sensor field of view), the video data and/or the audio data may be deleted from the network device 1602.

The process 1600, at signal S1612, includes transmitting a message to the client device. For example, the network device 1602 may transmit, by the respective processor(s) and using the respective network interface(s), a message 416 to the client device(s) 214, 216. In some embodiments, the message 416 may be generated and transmitted, by the processor(s) 310 and using the network interface 312, directly to the client device(s) 214, 216 from the A/V device 210. The message 416 may be a notification (e.g., a push notification, a message, (e.g., a short-message-service (SMS) message), an email, a phone call, a signal, and/or another type of message. The message 416 may be configured to provide a user of the client device(s) 214, 216 with an indication that an object is present at the A/V device 210. In some embodiments, the message 416 may be informative as to the type of motion detected and/or object present at the A/V device 210. For example, if a person, an animal, a parcel, or a vehicle is present, the message 416 may include an indication of such. As another example, if the person and/or animal detected are known to be dangerous and/or are acting suspicious (as determined using computer vision processing, image processing, behavioral analysis, third party source(s), etc.), the message 416 may include an indication of such.

The process 1600, at signal S1614, includes transmitting an acceptance or denial of the message. For example, the client device(s) 214, 216 may transmit, by the processor(s) 602 and using the network interface 610, an acceptance or denial of the message 416. In various embodiments, acceptance of the message 416 includes an acknowledgement of receipt of the message 416 from the client device(s) 214, 216. In yet other embodiments, the acceptance includes the user interacting with (e.g., selecting through a user interface a user interface element of a modal window displayed by a display device the client device(s) 214, 216) the message 416. Furthermore, denial of the message 416 may include a variety of different actions and/or information. In one example, a denial includes a failure of the client device(s) 214, 216 to provide a response to the message 416 within an interval of time. In yet another example, the denial includes the user interacting with the message 416 by at least selecting an "ignore" user interface element of a GUI 618 of the client device(s) 214, 216. In response, the hub device 202, the VA device 208, and/or one or more components of the network(s) of servers/backend devices 220 may receive, by the respective processors and using the respective network interfaces, the acceptance or denial of the message 416 from the client device(s) 214, 216.

The process 1600, at block B1616, includes determining whether the message was accepted or denied. For example, the network device 1602 may determine, by the respective processors, whether the message 416 was accepted or denied. In some embodiments, the processor(s) 310 of the A/V device 210, using the network interface 312, may determine whether the message 416 was accepted or denied (e.g., in embodiments where the A/V device 210 and the client device(s) 214, 216 communicate directly). When the message 416 is denied, the process 1600 may end, or another transmission type of the message may be generated (e.g., if a user denies a push notification, an SMS message may be transmitted). When the message 416 is accepted, the image data 406 and/or the audio data 408 may be transmitted to the client device(s) 214, 216 that accepted the message 416.

The process 1600, at signal S1618, includes transmitting the video data and/or the audio data to the client device(s) 214, 216. For example, network device 1602, by the respective processor(s) and using the respective network interface(s), may transmit the image data 406 and/or the audio data 408 to the client device(s) 214, 216. In response, the client device(s) 214, 216, by the processor(s) 602 and using the network interface 610, may receive the image data 406 and/or the audio data 408. In some embodiments, the image data 406 and/or the audio data 408 may be transmitted by the processor(s) 310 of the A/V device 210, using the network interface 312, directly to the client device(s) 214, 216.

The process 1600, at block B1620, includes displaying the video data and/or outputs the audio data. For example, the processor(s) of the client device(s) 214, 216 may cause display, on the display 616 of the client device(s) 214, 216, the image data 406 and/or may cause output, by the speaker(s) 608 of the client device(s) 214, 216, the audio data 408. In addition to displaying the image data 406 and/or outputting the audio data 408, a GUI 618 may be displayed on the client device(s) 214, 216 that may allow a user of the client device(s) 214, 216 to perform one more actions. The one or more actions may include outputting a siren, or alarm, by selecting a siren/alarm icon, changing camera settings (e.g., pan, tilt, zoom, brightness, contrast, etc.) by selecting one or more camera settings icons, activating one or more modes by selecting a mode activation icon (e.g., for activating a parcel protection mode for monitoring a package in the camera field of view), arming or disarming a security system by selecting an arm/disarm icon, unlocking a door by selecting a door lock icon, etc. In some embodiments, the GUI 618 may further include a talk icon for initiating a two-way communication session between the client device(s) 214, 216 and the A/V device 210, as described below with respect to block B1622.

The process 1600, at block B1622, includes initiating a two-way communication with the A/V device. For example, the processor(s) 602 of the client device(s) 214, 216, using the network interface 610, may initiate a two-way communication session with the A/V device 210. In response, the A/V device 210 and/or the network device 1602 may receive the two-way communication request from the client device(s) 214, 216. Once the two-way communication session is established, the voice/sound input at the client device(s) 214, 216, as captured by the microphone(s) 606 of the client device(s) 214, 216, may be transmitted as audio data to the A/V device 210 for output by the speaker(s) 330. Additionally, the voice/sound input at the A/V device 210, as captured by the microphone(s) 328 of the A/V device 210, may be transmitted as audio data 408 to the client device 214, 216 for output by the speaker(s) 608 of the client device(s) 214, 216.

Figure 17:
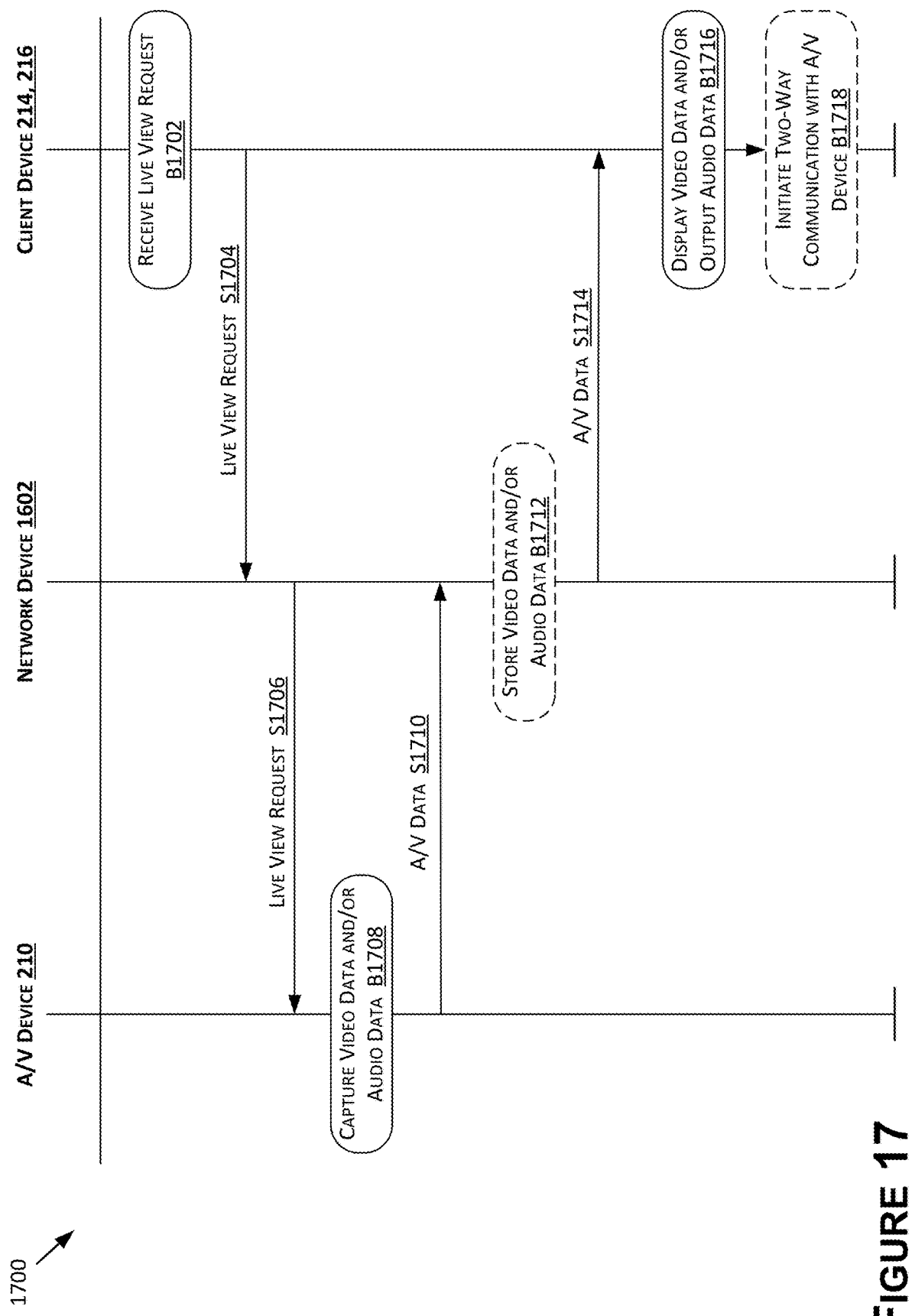
FIG. 17 is a signal diagram of a process for initiating a video-on-demand session for A/V content from an A/V recording and communication device, according to various aspects of the present disclosure.

FIG. 17 is a signal diagram of a process 1700 for initiating a video-on-demand session for A/V content from an A/V device 210 according to various aspects of the present disclosure. The network device 1702 may include one or more of the hub device 202, the VA device 208, and/or any of the components of the network(s) of servers/backend devices 220 (e.g., the backend server 224, the backend API 226, the storage devices 222, etc.).

The process 1700, at block B1702, includes receiving a live view request. For example, the processor(s) 702 of the client device 214, 216 may receive a live view request from a user of the client device 214, 216. The live view request may include an input to user interface (e.g., the display 716, such as within a GUI 718 on the display 716, one or more physical buttons of the client device 214, 216, etc.).

The process 1700, at signal S1704, includes transmitting a live view request. For example, the live request may be transmitted, by the processor(s) 702 and using a network interface 710 of the client device 214, 216, to the network device 1702. In response, network device 1702 may receive, by the respective processor(s) and using the respective network interface(s), the live view request. In some embodiments, the live view request may be transmitted directly to the A/V device 210 from the client device 214, 216.

The process 1700, at signal S1706, includes transmitting the live request. For example, network device 1702 may transmit (or forward), by the respective processor(s) and using the respective network interface(s), the live view request to the A/V device 210. In response, the processor(s) 310 of the A/V device 210, using the network interface 312, may receive the live view request.

The process 1700, at block B1708, includes capturing video data and/or audio data. For example, in response to receiving the live view request, the processor(s) 310 of the A/V device 210 may cause the camera 314 to record the image data 406 and/or the microphone(s) 328 to record the audio data 408.

The process 1700, at signal S1710, includes transmitting the video data and/or the audio data. This process may be similar to that of signal S1608 of the process 1600, described above.

The process 1700, at block B1712, includes storing the video data and/or the audio data. This process may be similar to that of block B1610 of the process 1600, described above.

The process 1700, at block S1714, includes transmitting the video data and/or the audio data to the client device. This process may be similar to that of signal S1618 of the process 1600, described above.

The process 1700, at block B1716, includes displaying the video data and/or outputs the audio data. This process may be similar to that of block B1620 of the process 1600, described above.

The process 1700, at block B1718, includes initiating two-way communication with the A/V device 210. This process may be similar to that of block B1622 of the process 1600, described above.

The processes described herein may a user to select various notifications, such as audio tones, for A/V devices 210 and/or for different setting(s) 420 of an A/V device 210. For example, the client device 214, 216 and/or network device(s) (e.g., the backend server(s) 224, the hub device 202, the VA device 208, etc.) may identify information associated with an A/V device 210, such setting(s) 420 and/or characteristic(s) 512 of the A/V device 210. The client device 214, 216 and/or the network device(s) may then use the information to select audio tones for a list 522 of audio tones. The client device 214, 216 may then display at least a portion of the list 522 to the user. While displaying the at least the portion of the list 522, the client device 214, 216 may receive input selecting one or more of the tones to be associated with the A/V device 210. Additionally, in some examples, the client device 214, 216 may receive input associating each of the one or more audio tones with a respective setting 420 of the A/V device 210. The client device and/or the network device(s) may then generate association(s) 524 between the one or more audio tones and the A/V device 210 and/or generate association(s) 524 between the one or more audio tones and the setting(s) 420.

The client device 214, 216 and/or the network device(s) may then use the association(S) 524 in order to notify the user when one of the A/V devices 210 detect objects, such as people. For example, the client device 214, 216 and/or the network device(s) may select the audio tone that is associated with the A/V device 210 and/or select the audio tone that is associated with a setting 420 of the A/V device 210. The client device 214, 216 may then output the audio tone, such that the user is notified that the A/V device 210 detected the object. Since the audio tone is associated with the A/V device 210 and/or the setting 420 of the A/V device 210, the user may be better notified about the type of event that is occurring at the property. As such, the user may be able to take any necessary actions based at least in part on the type of event, such as to protect the user's property, family, and/or pets if the type of event poses a risk of harm.

Figure 18:
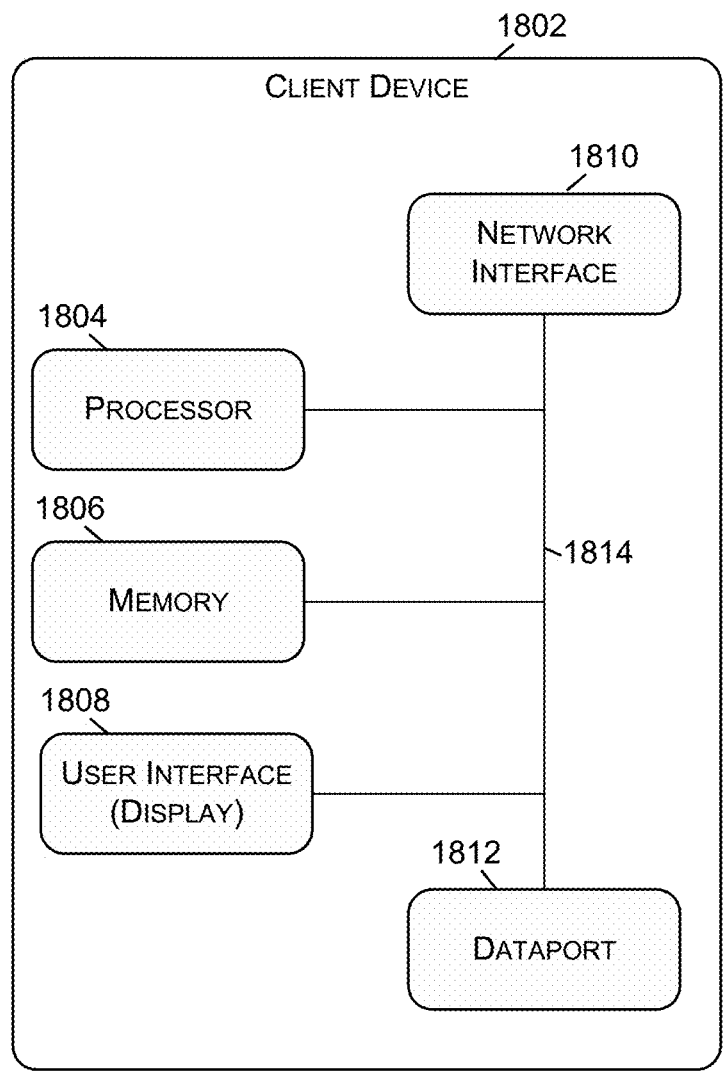
FIG. 18 is a functional block diagram of a client device on which the present embodiments may be implemented, according to various aspects of the present disclosure.

FIG. 18 is a functional block diagram of a client device 1802 on which the present embodiments may be implemented according to various aspects of the present disclosure. The client device(s) 214, 216 described with reference to FIG. 2 may include some or all of the components and/or functionality of the client device 1802. The client device 1802 may comprise, for example, a smartphone.

With reference to FIG. 18, the client device 1802 includes a processor 1804, a memory 1806, a user interface 1808, a network interface 1810, and a dataport 1812. These components are communicatively coupled together by an interconnect bus 1814. The processor 1804 may include any processor used in smartphones and/or portable computing devices, such as an ARM processor (a processor based at least in part on the RISC (reduced instruction set computer) architecture developed by Advanced RISC Machines (ARM).). In some embodiments, the processor 1804 may include one or more other processors, such as one or more conventional microprocessors, and/or one or more supplementary co-processors, such as math co-processors.

The memory 1806 may include both operating memory, such as random-access memory (RAM), as well as data storage, such as read-only memory (ROM), hard drives, flash memory, or any other suitable memory/storage element. The memory 1806 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 1804 and the memory 1806 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1804 may be connected to the memory 1806 via the dataport 1812.

The user interface 1808 may include any user interface or presentation elements suitable for a smartphone and/or a portable computing device, such as a keypad, a display screen, a touchscreen, a microphone, and a speaker. The network interface 1810 is configured to handle communication links between the client device 1802 and other, external devices or receivers, and to route incoming/outgoing data appropriately. For example, inbound data from the dataport 1812 may be routed through the network interface 1810 before being directed to the processor 1804, and outbound data from the processor 1804 may be routed through the network interface 1810 before being directed to the dataport 1812. The network interface 1810 may include one or more transceiver modules capable of transmitting and receiving data, and using, for example, one or more protocols and/or technologies, such as GSM, UMTS (3 GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1812 may be any type of connector used for physically interfacing with a smartphone and/or a portable computing device, such as a mini-USB port or an IPHONE®/IPOD® 30-pin connector or LIGHTNING® connector. In other embodiments, the dataport 1812 may include multiple communication channels for simultaneous communication with, for example, other processors, servers, and/or client terminals.

The memory 1806 may store instructions for communicating with other systems, such as a computer. The memory 1806 may store, for example, a program (e.g., computer program code) adapted to direct the processor 1804 in accordance with the present embodiments. The instructions also may include program elements, such as an operating system. While execution of sequences of instructions in the program causes the processor 1804 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 19:
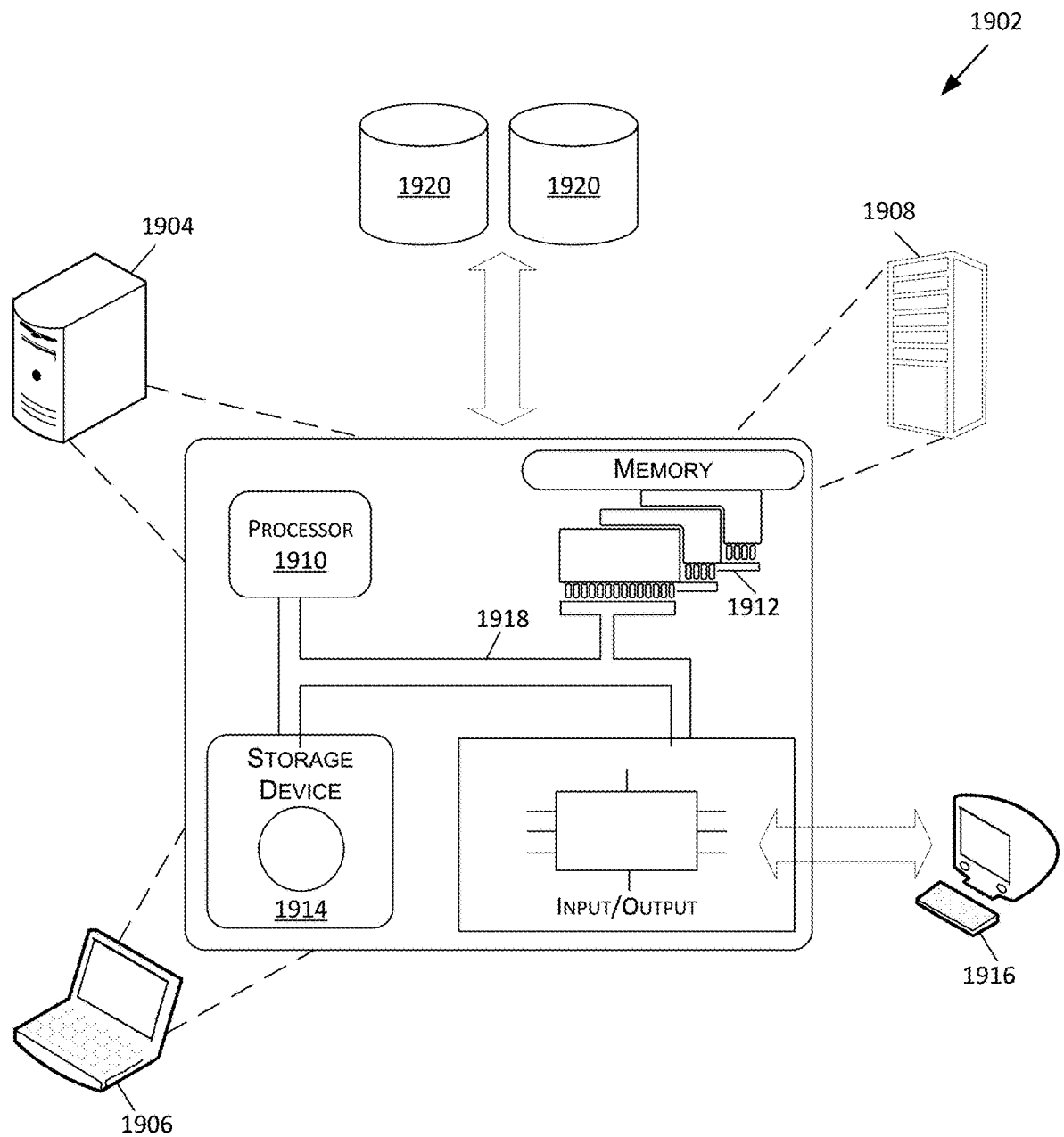
FIG. 19 is a functional block diagram of a general-purpose computing system on which the present embodiments may be implemented, according to various aspects of present disclosure.

FIG. 19 is a functional block diagram of a general-purpose computing system on which the present embodiments may be implemented according to various aspects of the present disclosure. The computer system 1902 may be embodied in at least one of a personal computer (also referred to as a desktop computer) 1904, a portable computer (also referred to as a laptop or notebook computer) 1906, and/or a server 1908 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1902 may execute at least some of the operations described above. The computer system 2102 may include at least one processor 1910, memory 1912, at least one storage device 1914, and input/output (I/O) devices 1916. Some or all of the components 1910, 19 12, 1914, 1916 may be interconnected via a system bus 1918. The processor 1910 may be single- or multi-threaded and may have one or more cores. The processor 1910 execute instructions, such as those stored in the memory 1912 and/or in the storage device 1914. Information may be received and output using one or more I/O devices 1916.

The memory 1912 may store information, and may be a computer-readable medium, such as volatile or non-volatile memory. The storage device(s) 1914 may provide storage for the system 2102 and, in some embodiments, may be a computer-readable medium. In various aspects, the storage device(s) 1914 may be a flash memory device, a hard disk device, an optical disk device, a tape device, or any other type of storage device.

The I/O devices 1916 may provide input/output operations for the system 1902. The I/O devices 1916 may include a keyboard, a pointing device, and/or a microphone. The I/O devices 1916 may further include a display unit for displaying graphical user interfaces, a speaker, and/or a printer. External data may be stored in one or more accessible external databases 1920.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

In a first aspect, a method comprises: receiving a first input representative of a first selection of an audio/video (A/V) device that is associated with a location; identifying information for populating an audio tone list associated with the A/V device, the identifying the information including: identifying a type of the A/V device; identifying a name of the A/V device; and identifying a setting, of the A/V device, for filtering objects; determining, based at least in part on the information, a first subset of a set of audio tones; populating the audio tone list with the first subset of the set of audio tones to generate a populated audio tone list; causing display of a graphical user interface (GUI) that includes a representation of the populated audio tone list; receiving a second input representative of a second selection of at least one audio tone of the populated audio tone list; based at least in part on the second selection of the at least one audio tone, associating the at least one audio tone with the A/V device; receiving a message including data representative of at least one of: motion detected by the A/V device; or an input to a button of the A/V device; and based at least in part on the data, outputting one of the at least one audio tone.

In an embodiment of the first aspect, wherein the at least one audio tone comprises a first audio tone of the populated audio tone list and a second audio tone of the populated audio tone list, and wherein the method further comprises: receiving a third input for associating the first audio tone with the motion detected by the A/V device; and receiving a fourth input for associating the second audio tone with the input to the button of the A/V device, wherein the associating the at least one audio tone with the A/V device comprises: associating the first audio tone with the motion detected by the A/V device; and associating the second audio tone with the input to the button of the A/V device.

In another embodiment of the first aspect, wherein the data is representative of the motion detected by the A/V device, and wherein the outputting of the one of the at least one audio tone comprises, based at least in part on the data, outputting the first audio tone.

In another embodiment of the first aspect, wherein the data is representative of the input to the button of the A/V device, and wherein the outputting of the one of the at least one audio tone comprises, based at least in part on the data, outputting the second audio tone.

In another embodiment of the first aspect, wherein the identifying the setting, of the A/V device, for filtering objects comprises identifying a motion zone from a plurality of motion zones, wherein the A/V device is configured to monitor the motion zone for motion.

In another embodiment of the first aspect, wherein the message includes data representing the motion detected by the A/V device, and wherein the outputting of the one of the at least one audio tone comprises outputting one or more words represented by the audio tone, the one or more words indicating that the A/V device detected motion within the motion zone.

In another embodiment of the first aspect, wherein the identifying the setting, of the A/V device, for filtering objects comprises identifying a type of object from a plurality of types of objects, wherein the A/V device is configured to monitor an area for the type of object.

In another embodiment of the first aspect, wherein the message includes data representing the motion detected by the A/V device, and wherein the outputting of the one of the at least one audio tone comprises outputting one or more words represented by the audio tone, the one or more words indicating that the A/V device detected the type of object in the area.

In another embodiment of the first aspect, wherein the outputting of the one of the at least one audio tone comprises outputting one or more words represented by the audio tone, the one or more words indicating at least one of: the name of the A/V device; the type of the A/V device; or the setting of the A/V device.

In another embodiment of the first aspect, wherein the identifying the type of the A/V device comprises determining that the A/V device is at least one of: a type of security camera; a type of light camera; or a type of video doorbell.

In another embodiment of the first aspect, the method further comprises: receiving a third input representative of a third selection of the type of the A/V device, wherein the identifying the type of the A/V device is based at least in part on the third input.

In another embodiment of the first aspect, the method further comprises: receiving, from at least one of a remote system or the A/V device, additional data representing the type of the A/V device, wherein the identifying the type of the A/V device is based at least in part on the additional data In another embodiment of the first aspect, the method further comprises: receiving a third input representative of a third selection of the name of the A/V device, wherein the identifying the name of the A/V device is based at least in part on the third input.

In another embodiment of the first aspect, the method further comprises: receiving a third input representative of a user-defined name of the A/V device, wherein the identifying the name of the A/V device is based at least in part on the third input.

In another embodiment of the first aspect, wherein the identifying the information further comprises identifying the location associated with the A/V device.

In a second aspect, a method comprises: receiving a first input representative of a first selection of an audio/video (A/V) device; identifying information for populating an audio tone list associated with the A/V device, the identifying the information including: identifying at least one of a type of the A/V device, a name of the A/V device, or a location associated with the A/V device; and identifying a setting of the A/V device; determining, based at least in part on the information, a subset of a set of audio tones; causing the subset of the set of audio tones to be added to the audio tone list; causing display of a graphical user interface (GUI) that includes a representation of at least a portion of the audio tone list; receiving a second input representative of a second selection of at least one audio tone of the audio tone list; based at least in part on the second selection, associating the at least one audio tone with the A/V device; receiving a message indicating that the A/V device detected an object; and based at least in part on the message, outputting one of the at least one audio tone.

In an embodiment of the second aspect, wherein the identifying the setting of the A/V device comprises identifying at least one of: a type of object associated with the A/V device; a motion zone associated with the A/V device; a type of event associated with the A/V device; or a time period associated with the A/V device.

In another embodiment of the second aspect, wherein the outputting the one of the at least one audio tone comprises outputting one or more words represented by the audio tone, the one or more indicating at least one of: the type of the A/V device; the name of the A/V device; the location of the A/V device; or the setting of the A/V device.

In another embodiment of the second aspect, wherein: the identifying the setting of the A/V device comprises identifying a first setting of the A/V device and a second setting of the A/V device; the at least one audio tone comprises a first audio tone and a second audio tone; the method further comprises: receiving a third input for associating the first audio tone with the first setting; and receiving a fourth input for associating the second audio tone with the second setting; and the associating the at least one audio tone with the A/V device comprises: associating the first audio tone with the first setting; and associating the second audio tone with the second setting.

In another embodiment of the second aspect, wherein the message indicates that the first setting for the A/V device is satisfied, and wherein the outputting of the one of the at least one audio tone comprises, based at least in part on the message, outputting the first audio tone.

In another embodiment of the second aspect, wherein the message indicates that the second setting has been satisfied, and wherein the outputting of the one of the at least one audio tone comprises, based at least in part on the data, outputting the second audio tone.

In another embodiment of the second aspect, wherein the first setting includes a first type of object, a first motion zone, a first type of event, or a first time period, and wherein the second setting includes a second type of object, a second motion zone, a second type of event, or a second time period.

In another embodiment of the second aspect, wherein the identifying the information for populating the audio tone list comprises: based at least in part on the first input, transmitting, to a remote system, first data indicating a request for the information; and receiving, from the remote system, second data representing the information.

In another embodiment of the second aspect, wherein the identifying the information for populating the audio tone list comprises receiving one or more inputs indicating the information.

In another embodiment of the second aspect, wherein the determining the subset of the set of audio tones comprises: transmitting, to a remote system, data representing the information; and receiving, from the remote system, data indicating the subset of the audio tones.

In another embodiment of the second aspect, wherein the determining the subset of the set of audio tones comprises: analyzing the set of audio tones using the information; based at least in part on the analyzing, identifying one or more audio tones from the set of audio tones that are related to the information; and determining that the subset of the set of audio tones includes the one or more audio tones.

In a third aspect, a method further comprising: determining a type of an audio/video (A/V) device; determining a name of the A/V device; determining at least one setting of the A/V device; based at least in part on at least one of the type, the name, or the at least one setting, determining at least a first audio tone and a second audio tone; generating a list that includes the first audio tone and the second audio tone; receiving an input indicating a selection the first audio tone; and associating at least the first audio tone with the A/V device.

In an embodiment of the third aspect, wherein: the at least one setting indicates that the A/V device is configured to monitor for motion and for input to a button of the A/V device; the method further comprises: receiving an additional input indicating an additional selection of the second audio tone; receiving a third input for associating the first audio tone with the motion detected by the A/V device; and receiving a fourth input for associating the second audio tone with the input to the button of the A/V device; wherein the associating the at least the first audio tone with the A/V device comprises: associating the first audio tone with the motion detected by the A/V device; and associating the second audio tone with the input to the button of the A/V device.

In another embodiment of the third aspect, the method further comprises: receiving data indicating that the A/V device detected the motion; and based at least in part on the data, outputting the first audio tone.

In another embodiment of the third aspect, the method further comprises: receiving data indicating that the A/V device received the input to the button; and based at least in part on the data, outputting the second audio tone.

In another embodiment of the third aspect, wherein: the at least one setting indicates a first motion zone and a second motion zone associated with the A/V device; and the method further comprises: receiving an additional input indicating an additional selection of the second audio tone; receiving a third input for associating the first audio tone with the first motion zone; and receiving a fourth input for associating the second audio tone with the second motion zone; and the associating the at least the first audio tone with the A/V device comprises: associating the first audio tone with the first motion zone; and associating the second audio tone with the second motion zone.

In another embodiment of the third aspect, the method further comprises: receiving data indicating that the A/V device detected an object within the first motion zone; and based at least in part on the data, outputting the first audio tone.

In another embodiment of the third aspect, the method further comprises: receiving data indicating that the A/V device detected an object within the second motion zone; and based at least in part on the data, outputting the second audio tone.

In another embodiment of the third aspect, wherein: the at least one setting indicates a first type of object and a second type of object associated with the A/V device; the method further comprises: receiving an additional input indicating an additional selection of the second audio tone; receiving a third input for associating the first audio tone with the first type of object; and receiving a fourth input for associating the second audio tone with the second type of object; and the associating the at least the first audio tone with the A/V device comprises: associating the first audio tone with the first type of object; and associating the second audio tone with the second type of object.

In another embodiment of the third aspect, the method further comprises: receiving data indicating that the A/V device detected the first type of object; and based at least in part on the data, outputting the first audio tone.

In another embodiment of the third aspect, the method further comprises: receiving data indicating that the A/V device detected the second type of object; and based at least in part on the data, outputting the second audio tone.

In another embodiment of the third aspect, wherein: the at least one setting indicates a first setting and a second setting associated with the A/V device; the method further comprises: receiving an additional input indicating an additional selection of the second audio tone; receiving a third input for associating the first audio tone with the first setting; and receiving a fourth input for associating the second audio tone with the second setting; and the associating the at least the first audio tone with the A/V device comprises: associating the first audio tone with the first setting; and associating the second audio tone with the second setting.

In another embodiment of the third aspect, the method further comprises: receiving data indicating that the A/V device detected an object; based at least in part on the data, determining that the first setting is satisfied; and outputting the first audio tone.

In another embodiment of the third aspect, the method further comprises: receiving data indicating that the A/V device detected an object; based at least in part on the data, determining that the second setting is satisfied; and outputting the second audio tone.

In another embodiment of the third aspect, wherein the first setting includes at least one of first type of object, a first motion zone, a first type of event, or a first time period, and the second setting includes at least one of a second type of object, a second motion zone, a second type of event, or a second time period In another embodiment of the third aspect, wherein the determining the at least one setting of the A/V device comprises determining at least one of: a type of object associated with the A/V device; a motion zone associated with the A/V device; a type of event associated with the A/V device; or a time period associated with the A/V device.

In another embodiment of the third aspect, wherein the determining the type of the A/V device comprises at least one of: receiving an additional input indicating the type of the A/V device; or receiving data from at least one of a remote system or the A/V device, the data indicating the type of the A/V device.

In a fourth aspect, a method comprises: receiving, from a client device associated with an audio/video (A/V) device, first data representative of an audio tone request for the A/V device; based at least in part on the audio tone request: determining a type of the A/V device; determining a name of the A/V device; and determining one or more settings of the A/V device; based at least in part on the type, the name, and the one or more settings, selecting, from a plurality of audio tones, at least a first audio tone and a second audio tone; populating an audio tone list with at least the first audio tone and the second audio tone to generate a populated audio tone list; transmitting, to the client device, second data representing the populated audio tone list; receiving, from the client device, third data representative of a selection of the first audio tone from the populated audio tone list; based at least in part on the selection of the first audio tone, transmitting, to at least one of the client device, a hub device, or a virtual assistant device, audio data representative of the first audio tone; receiving, from the A/V device, fourth data representative of at least one of: motion detected by the A/V device; or an input received at the A/V device; and based at least in part on the fourth data, transmitting, to at least one of the client device, the hub device, or the virtual assistant device, fifth data configured to cause the at least one of the client device, the hub device, or the virtual assistant device to output the first audio tone.

In an embodiment of the fourth aspect, the method further comprises: receiving, from the client device, sixth data representative of at least one of: the type of the A/V device; the name of the A/V device; or the one or more settings of the A/V device; wherein at least one of the determining the type of the A/V device, the determining the name of the A/V device, or the determining the one or more settings of the A/V device is based at least in part on the sixth data.

In another embodiment of the fourth aspect, wherein determining the type of the A/V device comprises determining that the A/V device comprises at least one of: a type of security camera; a type of light camera; or a type of video doorbell.

In another embodiment of the fourth aspect, the method further comprises: determining a location associated with the A/V device; wherein the selecting, from the plurality of audio tones, at least the first audio tone and the second audio tone is further based at least in part on the location associated with the A/V device.

In another embodiment of the fourth aspect, wherein the determining the location comprises at least one of: determining the location based at least in part on the name of the A/V device; or receiving sixth data from at least one of the client device or the A/V device, the sixth data indicating the location.

In another embodiment of the fourth aspect, wherein the determining the one or more settings of the A/V device comprises determining an object filtering setting of the A/V device, the object filtering setting indicating that the A/V device is configured to monitor an area for motion from a type of object.

In another embodiment of the fourth aspect, wherein based at least in part on the object filtering setting, the first audio tone represents content indicating that the A/V device detected the type of object in the area.

In another embodiment of the fourth aspect, wherein the determining the one or more settings of the A/V device comprises determining a motion zone from a plurality of motion zones, wherein the A/V device is to determine if motion is detected within the motion zone.

In another embodiment of the fourth aspect, wherein, based at least in part on the motion zone, the first audio tone comprises content indicating that the A/V device detected motion within the motion zone.

In another embodiment of the fourth aspect, the method further comprises: receiving, from the client device, sixth data representative of a selection of the second audio tone from the populated audio tone list; receiving, from the client device, seventh data for associating the first audio tone with the motion detected by the A/V device; receiving, from the client device, eighth data for associating the second audio tone with the input to the button of the A/V device; and transmitting, to at least one of the client device, the hub device, or the virtual assistant device, additional audio data representative of the second audio tone.

In another embodiment of the fourth aspect, wherein the fourth data is representative of the motion detected by the A/V device, and wherein the method further comprises determining, based at least in part on the fourth data, to cause the at least one of the client device, the hub device, or the virtual assistant device to output the first audio tone.

In another embodiment of the fourth aspect, the method further comprises: receiving, from the client device, sixth data representative of a selection of the second audio tone from the populated audio tone list; receiving, from the client device, seventh data for associating the first audio tone with the input to the button of the A/V device; receiving, from the client device, eighth data for associating the second audio tone with the motion detected by the A/V device; and transmitting, to at least one of the client device, the hub device, or the virtual assistant device, additional audio data representative of the second audio tone.

In another embodiment of the fourth aspect, wherein the fourth data is representative of the input received to the button of the A/V device, and wherein the method further comprises determining, based at least in part on the fourth data, to cause the at least one of the client device, the hub device, or the virtual assistant device to output the first audio tone.

In another embodiment of the fourth aspect, wherein the first audio tone comprises at least one of: one or more words indicating the type of A/V device; one or more words indicating the name of the A/V device; or one or more words associated with the one or more settings of the A/V device.

In a fifth aspect, one or more network devices comprise: a network interface; one or more processors; and one or more computer-readable media storing instructions that, when executed by the one or more processors, cause the one or more processors to perform operations comprising: receiving, using the network interface and from a client device associated with an audio/video (A/V) device, first data representative of an audio tone request for the A/V device; based at least in part on the audio tone request: determining a type of the A/V device; and determining one or more settings of the A/V device; based at least in part on the type and the one or more settings, selecting, from a plurality of audio tones, at least a first audio tone and a second audio tone; populating an audio tone list with at least the first audio tone and the second audio tone to generate a populated audio tone list; transmitting, using the network interface and to the client device, second data representing the populated audio tone list; receiving, using the network interface and from the client device, third data representative of a selection of at least the first audio tone from the populated audio tone list; based at least in part on the selection of the first audio tone, transmitting, using the network interface and to at least one of the client device or an electronic device, audio data representative of the first audio tone; receiving, using the network interface and from the A/V device, fourth data indicating that the A/V device detected an object; and transmitting, using the network interface and to at least one of the client device or the electronic device, fifth data configured to cause the at least one of the client device or the electronic device to output the first audio tone.

In an embodiment of the fifth aspect, wherein: the determining the one or more settings of the A/V device comprises determining a first setting of the A/V device and a second setting of the A/V device; the third data representative of the selection of the at least the first audio tone from the populated audio tone list comprises third data representative of a first selection of the first audio tone from the populated audio tone list and a second selection of the second audio tone from the populated audio tone list; and the computer-readable media stores further instructions that, when executed by the one or more processors, cause the one or more processors to perform operations comprising: receiving, using the network interface and from the client device, sixth data indicating a first association between the first audio tone and the first setting; receiving, using the network interface and from the client device, seventh data indicating a second association between the second audio tone and the second setting; and transmitting, using the network interface and to at least one of the client device or the electronic device, additional audio data representative of the second audio tone.

In another embodiment of the fifth aspect, the computer-readable media storing further instructions that, when executed by the one or more processors, cause the one or more processors to perform operations comprising: determining, based at least in part on the fourth data, that the first setting is satisfied, wherein the transmitting of the fifth data that is configured to cause the at least one of the client device or the electronic device to output the first audio tone is based at least in part on the first association and the first setting being satisfied.

In another embodiment of the fifth aspect, wherein the first setting includes at least one of a first type of object, a first motion zone, a first type of event, or a first time period, and wherein the second setting includes at least one of a second type of object, a second motion zone, a second type of event, or a second time period.

In another embodiment of the fifth aspect, the computer-readable media storing further instructions that, when executed by the one or more processors, cause the one or more processors to perform operations comprising: receiving, using the network interface, sixth data from the client device, the sixth data representative of at least one of: the type of the A/V device; or the one or more settings of the A/V device; wherein at least one of the determining the type of the A/V device or the determining the one or more settings of the A/V device is based at least in part on the sixth data.

In another embodiment of the fifth aspect, wherein the determining the type of the A/V device comprises determining that the A/V device comprises at least one of: a type of security camera; a type of light camera; or a type of video doorbell.

In another embodiment of the fifth aspect, the computer-readable media storing further instructions that, when executed by the one or more processors, cause the one or more processors to perform operations comprising: determining a location associated with the A/V device; wherein the selecting, from the plurality of audio tones, at least the first audio tone and the second audio tone is further based at least in part on the location associated with the A/V device.

In another embodiment of the fifth aspect, wherein the determining the location comprises at least one of: determining the location based at least in part on a name of the A/V device; or receiving sixth data from at least one of the client device or the A/V device, the sixth data indicating the location.

In another embodiment of the fifth aspect, wherein the determining the one or more settings of the A/V device comprises determining an object filtering setting of the A/V device, the object filtering setting indicating that the A/V device is configured to monitor an area for motion from a type of object.

In another embodiment of the fifth aspect, wherein based at least in part on the object filtering setting, the first audio tone represents content indicating that the A/V device detected the type of object in the area.

In another embodiment of the fifth aspect, wherein the determining the one or more settings of the A/V device comprises determining a motion zone from a plurality of motion zone, wherein the A/V device is to determine if motion is detected within the motion zone.

In another embodiment of the fifth aspect, wherein, based at least in part on the one or more settings, the first audio tone comprises content indicating that the A/V device detected motion within the motion zone.

In another embodiment of the fifth aspect, wherein the first audio tone comprises at least one of: one or more words indicating the type of A/V device; or one or more words indicating the one or more settings of the A/V device.

In a sixth aspect, a method comprises: determining at least one setting for an audio/video (A/V) device; based at least in part on the at least one setting, determining a plurality of audio tones; transmitting, to a client device, first data representative of a list of the plurality of audio tones; receiving, from the client device, second data for associating a first audio tone of the plurality of audio tones with a first criterion; receiving, from the client device, third data for associating a second audio tone of the plurality of audio tones with a second criterion; receiving, from the A/V device, fourth data; determining that the fourth data is representative of the first criterion; and based at least in part on the fourth data being representative of the first criterion, causing output of the first audio tone.

In an embodiment of the sixth aspect, wherein the first criterion is associated with the A/V device detecting a first type of object and the second criterion is associated with the A/V device detecting a second type of object, and wherein the determining that the fourth data is representative of the first criterion comprises determining that the fourth data indicates that the A/V device detected the first type of object.

In another embodiment of the sixth aspect, wherein the first criterion is associated with the A/V device detecting motion and the second criterion is associated with the A/V device receiving input, and wherein the determining that the fourth data is representative of the first criterion comprises determining that the fourth data indicates that the A/V device detected motion.

In another embodiment of the sixth aspect, wherein the first criterion is associated with the A/V device receiving input and the second criterion is associated with the A/V device detecting motion, and wherein the determining that the fourth data is representative of the first criterion comprises determining that the fourth data indicates that the A/V device received input.

In another embodiment of the sixth aspect, wherein the first criterion is associated with the A/V device detecting motion in a first motion zone and the second criterion is associated with the A/V device detecting motion in a second motion zone, and wherein the determining that the fourth data is representative of the first criterion comprises determining that the fourth data indicates that the A/V device detected motion in the first motion zone.

In another embodiment of the sixth aspect, wherein the first criterion is associated with a first setting of the at least one setting and the second criterion is associated with a second setting of the at least one setting, and wherein the determining that the fourth data is representative of the first criterion comprises determining that the fourth data indicates that the first setting is satisfied.

In another embodiment of the sixth aspect, wherein the first setting includes a first type of object, a first motion zone, a first type of event, or a first time period, and wherein the second setting includes a second type of object, a second motion zone, a second type of event, or a second time period.

In another embodiment of the sixth aspect, the method further comprises: determining at least one of a type of device associated with the A/V device or a name of the A/V device, wherein the determining the plurality of audio tones is further based at least in part on the at least one of the type of device associated with the A/V device or the name of the A/V device.

In another embodiment of the sixth aspect, wherein the causing the output of the first audio tone comprises transmitting, to the client device, fifth data that causes the client device to output the first audio content.

In another embodiment of the sixth aspect, wherein the causing the output of the first audio tone comprises transmitting, to an electronic device, fifth data that causes the electronic device to output the first audio content.

What is claimed is:

1. A method comprising:
   determining at least one setting for an electronic device;
   determining, based at least in part on the at least one setting, a plurality of audio tones;
   transmitting, to a client device, first data representing the plurality of audio tones;
   receiving, from the client device, second data for associating a first audio tone of the plurality of audio tones with a first criterion;
   receiving, from the client device, third data for associating a second audio tone of the plurality of audio tones with a second criterion;
   receiving, from the electronic device, fourth data representing the first criterion; and
   after receiving the fourth data representing the first criterion, sending, to the client device, fifth data associated with outputting the first audio tone.

2. The method as recited in claim 1, further comprising:
   receiving, from the electronic device, sixth data representing the second criterion; and
   after receiving the sixth data representing the second criterion, sending, to the client device, seventh data associated with outputting the second audio tone.

3. The method as recited in claim 1, wherein the first criterion is associated with the electronic device detecting a first type of object and the second criterion is associated with the electronic device detecting a second type of object, and wherein the method further comprises determining that the fourth data indicates that the electronic device detected the first type of object.

4. The method as recited in claim 1, wherein the first criterion is associated with the electronic device detecting motion and the second criterion is associated with the electronic device receiving input, and wherein the method further comprises determining that the fourth data indicates that the electronic device detected the motion.

5. The method as recited in claim 1, wherein the first criterion is associated with the electronic device receiving a tactile input and the second criterion is associated with the electronic device detecting motion, and wherein the method further comprises determining that the fourth data indicates that the electronic device received the input.

6. The method as recited in claim 1, wherein the first criterion is associated with the electronic device detecting motion in a first motion zone and the second criterion is associated with the electronic device detecting motion in a second motion zone, and wherein the method further comprises determining that the fourth data indicates that the electronic device detected motion in the first motion zone.

7. The method as recited in claim 1, wherein sending the fifth data associated with outputting the first audio tone comprises at least one of:
   sending, to the client device, data representing the first audio tone; or
   sending, to the client device, data representing a command to output the first audio tone.

8. One or more computing devices comprising:
   one or more network interfaces;
   one or more processors; and
   one or more non-transitory computer-readable media storing instructions that, when executed by the one or more processors, cause the one or more processors to perform operations comprising:
      determining at least a setting associated with an electronic device;
      determining at least a characteristic associated with the electronic device;
      determining, based at least in part on at least one of the setting or the characteristic, a first audio tone;
      determining, based at least in part on at least one of the setting or the characteristic, a second audio tone;
      sending, using the one or more network interfaces and to a client device, first data representing the first audio tone;
      sending, using the one or more network interfaces and to the client device, second data representing the second audio tone;
      receiving, using the one or more network interfaces and from the electronic device, third data representing a criterion associated with the first audio tone; and
      after receiving the third data representing the criterion, sending, using the one or more network interfaces and to the client device, fourth data associated with outputting the first audio tone.

9. The one or more computing devices as recited in claim 8, the one or more non-transitory computer-readable media storing further instructions that, when executed by the one or more processors, cause the one or more processors to perform further operations comprising:
   receiving, using the one or more network interfaces and from the client device, fifth data for associating the first audio tone with the criterion of the electronic device; and
   associating the first audio tone with the criterion.

10. The one or more computing devices as recited in claim 9, wherein the criterion is associated with at least one of:
    a type of object detected by the electronic device;
    motion detected by the electronic device;
    a tactile input received by the electronic device; or
    a motion zone located in a field of view of the electronic device.

11. The one or more computing devices as recited in claim 8, the one or more non-transitory computer-readable media storing further instructions that, when executed by the one or more processors, cause the one or more processors to perform further operations comprising:
    associating the first audio tone with the criterion of the electronic device.

12. The one or more computing devices as recited in claim 8, wherein the characteristic includes at least one of:
    a location of the electronic device;
    a type of the electronic device; or
    a name of the electronic device.

13. The one or more computing devices as recited in claim 8, wherein the setting is associated with at least one of:
    a type of object that the electronic device is configured to detect;
    a motion zone that the electronic device is configured to monitor;
    motion that the electronic device is configured to detect;
    a tactile input that the electronic device is configured to receive; or
    a time of day that the electronic device is configured to monitor for at least one of the motion or the input.

14. One or more computing devices comprising:
    one or more network interfaces;
    one or more processors; and
    one or more non-transitory computer-readable media storing instructions that, when executed by the one or more processors, cause the one or more processors to perform operations comprising:
        transmitting, using the one or more network interfaces, first data representing a plurality of audio tones;
        receiving, using the one or more network interfaces, second data for associating an audio tone of the plurality of audio tones with a criterion of an electronic device;
        associating the audio tone with the criterion;
        receiving, using the one or more network interfaces, third data generated by the electronic device;
        determining that the third data is associated with the criterion; and
        after determining that the third data is associated with the criterion, sending, using the one or more network interfaces and to a client device, fourth data associated with outputting the audio tone.

15. The one or more computing devices as recited in claim 14, the one or more non-transitory computer-readable media storing further instructions that, when executed by the one or more processors, cause the one or more processors to perform further operations comprising:
    determining at least one setting associated with the electronic device; and
    determining, based at least in part on the at least one setting, the plurality of audio tones.

16. The one or more computing devices as recited in claim 14, the one or more non-transitory computer-readable media storing further instructions that, when executed by the one or more processors, cause the one or more processors to perform further operations comprising:
    determining at least one characteristic associated with the electronic device; and
    determining, based at least in part on the at least one characteristic, the plurality of audio tones.

17. The one or more computing devices as recited in claim 14, wherein the criterion is associated with the electronic device detecting a type of object, and wherein determining that the third data is associated with the criterion comprises determining that the third data indicates that the electronic device detected the type of object.

18. The one or more computing devices as recited in claim 14, wherein the criterion is associated with the electronic device detecting motion, and wherein determining that the third data is associated with the criterion comprises determining that the third data indicates that the electronic device detected the motion.

19. The one or more computing devices as recited in claim 14, wherein the criterion is associated with the electronic device receiving a tactile input, and wherein determining that the third data is associated with the criterion comprises determining that the third data indicates that the electronic device received the tactile input.

20. The one or more computing devices as recited in claim 14, wherein sending the fourth data associated with outputting the audio tone comprises at least one of:
    sending, using the one or more network interfaces and to the client device, data representing the audio tone; or
    sending, using the one or more network interfaces and to the client device, data representing a command to output the first audio tone.

* * * * *